(12) United States Patent
Beaulieu et al.

(10) Patent No.: US 7,909,696 B2
(45) Date of Patent: *Mar. 22, 2011

(54) GAME INTERACTION IN 3-D GAMING ENVIRONMENTS

(75) Inventors: Nicole M. Beaulieu, Reno, NV (US); Steven G. LeMay, Reno, NV (US); Johnny Luigi Palchetti, Henderson, NV (US); Greg A. Schlottmann, Sparks, NV (US); Robert Breckner, Reno, NV (US); John Hostetler, Reno, NV (US)

(73) Assignee: IGT, Reno, NV (US)

( * ) Notice: Subject to any disclaimer, the term of this patent is extended or adjusted under 35 U.S.C. 154(b) by 1083 days.

This patent is subject to a terminal disclaimer.

(21) Appl. No.: 10/803,233

(22) Filed: Mar. 17, 2004

(65) Prior Publication Data
US 2005/0075167 A1   Apr. 7, 2005

(51) Int. Cl.
*G06F 17/00* (2006.01)
*G06F 19/00* (2006.01)

(52) U.S. Cl. ............... 463/32; 463/16; 463/17; 463/18; 463/19; 463/20; 463/30; 463/31; 463/33

(58) Field of Classification Search .............. 463/16–20, 463/30–33
See application file for complete search history.

(56) References Cited

U.S. PATENT DOCUMENTS

| | | | |
|---|---|---|---|
| 4,332,389 A | 6/1982 | Loyd, Jr. et al. | |
| 4,365,810 A | 12/1982 | Richardson | |
| 4,373,726 A | 2/1983 | Churchill et al. | |
| 4,455,025 A | 6/1984 | Itkis | |
| 4,572,509 A | 2/1986 | Sitrick | |
| 4,624,462 A | 11/1986 | Itkis | |
| 4,634,126 A | 1/1987 | Kimura | |
| 4,798,387 A | 1/1989 | Richardson | |
| 4,823,345 A | 4/1989 | Daniel et al. | |
| 4,848,771 A | 7/1989 | Richardson | |
| 4,856,787 A | 8/1989 | Itkis | |
| 4,885,703 A | 12/1989 | Deering | |
| 4,914,607 A | 4/1990 | Takanashi et al. | |

(Continued)

FOREIGN PATENT DOCUMENTS

AU   200179477 A1   5/2002

(Continued)

OTHER PUBLICATIONS

Carson G. S.: "Standards Pipeline The OpenGL Specification" Computer Graphics, ACM, US, vol. 31, No. 2, May 1997, pp. 17-18, XP000939297, ISSN: 097-8930.

(Continued)

*Primary Examiner* — Melba Bumgarner
*Assistant Examiner* — Milap Shah
(74) *Attorney, Agent, or Firm* — Weaver Austin Villeneuve & Sampson LLP

(57) ABSTRACT

A gaming machine is described having a gaming controller operable to control one or more games of chance played on the gaming machine. A memory stores 3-D data corresponding to a 3-D gaming environment. Gaming logic renders a plurality of images of the 3-D gaming environment for presentation on the machine's display. The images depict manipulation of one or more aspects of the 3-D gaming environment by a user. A user interface provides user input to facilitate the manipulation of the one or more aspects of the 3-D gaming environment by the user.

60 Claims, 19 Drawing Sheets

U.S. PATENT DOCUMENTS

| | | | |
|---|---|---|---|
| 4,986,543 A | 1/1991 | Heller | |
| 5,007,649 A | 4/1991 | Richardson | |
| 5,227,771 A | 7/1993 | Kerr et al. | |
| 5,242,163 A | 9/1993 | Fulton | |
| 5,255,352 A * | 10/1993 | Falk | 345/582 |
| 5,297,802 A | 3/1994 | Pocock et al. | |
| 5,303,388 A | 4/1994 | Kreitman et al. | |
| 5,339,390 A | 8/1994 | Robertson et al. | |
| 5,342,047 A | 8/1994 | Heidel et al. | |
| 5,351,970 A | 10/1994 | Fioretti | |
| 5,393,057 A | 2/1995 | Marnell, II | |
| 5,435,554 A | 7/1995 | Lipson | |
| 5,455,904 A | 10/1995 | Bouchet et al. | |
| 5,469,536 A | 11/1995 | Blank | |
| 5,485,197 A | 1/1996 | Hoarty | |
| 5,594,844 A | 1/1997 | Sakai et al. | |
| 5,604,852 A | 2/1997 | Watters et al. | |
| 5,608,850 A | 3/1997 | Robertson | |
| 5,621,906 A | 4/1997 | O'Neill et al. | |
| 5,639,088 A | 6/1997 | Schneider et al. | |
| 5,643,086 A | 7/1997 | Alcorn et al. | |
| 5,678,015 A | 10/1997 | Goh | |
| 5,689,628 A | 11/1997 | Robertson | |
| 5,729,673 A | 3/1998 | Cooper et al. | |
| 5,742,779 A | 4/1998 | Steele et al. | |
| 5,745,109 A | 4/1998 | Nakano et al. | |
| 5,755,621 A | 5/1998 | Marks et al. | |
| 5,766,074 A | 6/1998 | Cannon et al. | |
| 5,775,993 A | 7/1998 | Fentz et al. | |
| 5,788,573 A | 8/1998 | Baerlocher et al. | |
| 5,805,783 A | 9/1998 | Ellson et al. | |
| 5,807,172 A | 9/1998 | Piechowiak | |
| 5,833,540 A | 11/1998 | Miodunski et al. | |
| 5,836,819 A | 11/1998 | Ugawa | |
| 5,880,733 A | 3/1999 | Horvitz | |
| 5,903,271 A | 5/1999 | Bardon et al. | |
| 5,912,671 A | 6/1999 | Oka | |
| 5,934,672 A | 8/1999 | Sines et al. | |
| 5,941,772 A | 8/1999 | Paige | |
| 5,956,038 A | 9/1999 | Rekimoto | |
| 5,967,895 A | 10/1999 | Kellen | |
| 5,998,803 A | 12/1999 | Forrest et al. | |
| 6,002,403 A | 12/1999 | Sugiyama et al. | |
| 6,002,853 A | 12/1999 | De Hond | |
| 6,005,579 A * | 12/1999 | Sugiyama et al. | 715/855 |
| 6,009,458 A | 12/1999 | Hawkins et al. | |
| 6,012,984 A | 1/2000 | Roseman | |
| 6,014,142 A | 1/2000 | LaHood | |
| 6,023,371 A | 2/2000 | Onitsuka et al. | |
| 6,027,115 A | 2/2000 | Griswold et al. | |
| 6,029,973 A | 2/2000 | Takemoto | |
| 6,031,545 A | 2/2000 | Ellenby et al. | |
| 6,033,307 A | 3/2000 | Vancura | |
| 6,043,818 A | 3/2000 | Nakano et al. | |
| 6,050,895 A | 4/2000 | Luciano, Jr. et al. | |
| 6,057,856 A | 5/2000 | Miyashita et al. | |
| 6,062,978 A | 5/2000 | Martino et al. | |
| 6,080,063 A | 6/2000 | Khosla | |
| 6,089,976 A | 7/2000 | Schneider et al. | |
| 6,093,100 A | 7/2000 | Singer et al. | |
| 6,094,196 A | 7/2000 | Berry et al. | |
| 6,104,815 A | 8/2000 | Alcorn et al. | |
| 6,106,396 A | 8/2000 | Alcorn et al. | |
| 6,131,909 A | 10/2000 | Chilese | |
| 6,135,884 A | 10/2000 | Hedrick et al. | |
| 6,149,156 A | 11/2000 | Feola | |
| 6,149,522 A | 11/2000 | Alcorn et al. | |
| 6,159,095 A | 12/2000 | Frohm et al. | |
| 6,183,361 B1 | 2/2001 | Cummings et al. | |
| 6,203,009 B1 | 3/2001 | Sines et al. | |
| 6,203,428 B1 | 3/2001 | Giobbi et al. | |
| 6,206,782 B1 | 3/2001 | Walker et al. | |
| 6,220,593 B1 | 4/2001 | Pierce et al. | |
| 6,234,901 B1 | 5/2001 | Nagoshi et al. | |
| 6,254,483 B1 | 7/2001 | Acres | |
| 6,267,669 B1 | 7/2001 | Luciano, Jr. et al. | |
| 6,271,842 B1 | 8/2001 | Bardon et al. | |
| 6,280,325 B1 | 8/2001 | Fisk | |
| 6,287,201 B1 | 9/2001 | Hightower | |
| 6,315,666 B1 | 11/2001 | Mastera et al. | |
| 6,319,128 B1 | 11/2001 | Miyoshi et al. | |
| 6,331,146 B1 | 12/2001 | Miyamoto et al. | |
| 6,332,838 B1 * | 12/2001 | Yamagami | 463/9 |
| 6,342,892 B1 | 1/2002 | Van Hook et al. | |
| 6,346,956 B2 | 2/2002 | Matsuda | |
| 6,347,999 B1 | 2/2002 | Yuan | |
| 6,390,470 B1 | 5/2002 | Huang | |
| 6,398,218 B1 | 6/2002 | Vancura | |
| 6,409,602 B1 | 6/2002 | Wiltshire et al. | |
| 6,409,604 B1 | 6/2002 | Matsuno | |
| 6,413,162 B1 | 7/2002 | Baerlocher et al. | |
| 6,431,982 B2 | 8/2002 | Kobayashi | |
| 6,454,649 B1 | 9/2002 | Mattice et al. | |
| 6,458,032 B1 * | 10/2002 | Yamagami | 463/9 |
| 6,506,114 B1 | 1/2003 | Estes et al. | |
| 6,508,709 B1 | 1/2003 | Karmarkar | |
| 6,512,522 B1 | 1/2003 | Miller et al. | |
| 6,515,688 B1 | 2/2003 | Berry et al. | |
| 6,517,433 B2 | 2/2003 | Loose et al. | |
| 6,524,185 B2 | 2/2003 | Lind | |
| 6,533,273 B2 | 3/2003 | Cole et al. | |
| 6,537,150 B1 | 3/2003 | Luciano | |
| 6,542,168 B2 | 4/2003 | Negishi et al. | |
| 6,559,863 B1 | 5/2003 | Megiddo | |
| 6,569,017 B2 | 5/2003 | Enzminger et al. | |
| 6,570,587 B1 | 5/2003 | Efrat et al. | |
| 6,577,330 B1 | 6/2003 | Tsuda et al. | |
| 6,597,358 B2 | 7/2003 | Miller | |
| 6,597,380 B1 | 7/2003 | Wang et al. | |
| 6,626,760 B1 | 9/2003 | Miyamoto et al. | |
| 6,628,310 B1 | 9/2003 | Hiura et al. | |
| 6,641,478 B2 | 11/2003 | Sakai | |
| 6,645,070 B2 | 11/2003 | Lupo | |
| 6,656,040 B1 | 12/2003 | Brosnan et al. | |
| 6,656,044 B1 | 12/2003 | Lewis | |
| 6,661,426 B1 | 12/2003 | Jetha et al. | |
| 6,667,741 B1 | 12/2003 | Kataoka et al. | |
| 6,700,588 B1 | 3/2004 | MacInnis et al. | |
| 6,734,884 B1 | 5/2004 | Berry et al. | |
| 6,746,329 B1 | 6/2004 | Duhamel | |
| 6,760,050 B1 | 7/2004 | Nakagawa | |
| 6,769,982 B1 | 8/2004 | Brosnan | |
| 6,772,195 B1 | 8/2004 | Hatlelid et al. | |
| 6,802,776 B2 | 10/2004 | Lind et al. | |
| 6,811,482 B2 * | 11/2004 | Letovsky | 463/7 |
| 6,822,662 B1 | 11/2004 | Cook et al. | |
| 6,840,858 B2 | 1/2005 | Adams | |
| 6,847,162 B2 | 1/2005 | Duggal et al. | |
| 6,866,585 B2 * | 3/2005 | Muir | 463/31 |
| 6,887,157 B2 | 5/2005 | LeMay et al. | |
| 6,902,481 B2 | 6/2005 | Breckner et al. | |
| 6,922,815 B2 | 7/2005 | Rosen | |
| 6,938,218 B1 | 8/2005 | Rosen | |
| 6,942,571 B1 | 9/2005 | McAllister et al. | |
| 7,008,324 B1 | 3/2006 | Johnson et al. | |
| 7,009,611 B2 | 3/2006 | Di Lelle | |
| 7,034,825 B2 | 4/2006 | Stowe et al. | |
| 7,070,504 B2 | 7/2006 | Iwamoto | |
| 7,179,166 B1 | 2/2007 | Abbott | |
| 7,192,345 B2 * | 3/2007 | Muir et al. | 463/20 |
| 7,291,068 B2 | 11/2007 | Bryant et al. | |
| 7,318,774 B2 | 1/2008 | Bryant et al. | |
| 7,367,885 B2 | 5/2008 | Escalera et al. | |
| 7,400,322 B1 | 7/2008 | Urbach | |
| 7,465,230 B2 | 12/2008 | LeMay et al. | |
| 7,503,003 B2 | 3/2009 | Kamen et al. | |
| 7,503,006 B2 | 3/2009 | Danieli | |
| 7,572,186 B2 | 8/2009 | LeMay et al. | |
| 7,581,195 B2 | 8/2009 | Sciammarella et al. | |
| 2001/0054794 A1 | 12/2001 | Cole et al. | |
| 2002/0013170 A1 | 1/2002 | Miller | |
| 2002/0016201 A1 | 2/2002 | Bennett et al. | |
| 2002/0019253 A1 | 2/2002 | Reitzen et al. | |
| 2002/0105515 A1 | 8/2002 | Mochizuki | |
| 2002/0111208 A1 | 8/2002 | Marta | |
| 2002/0111212 A1 | 8/2002 | Muir | |
| 2002/0113369 A1 | 8/2002 | Weingardt | |

| | | | |
|---|---|---|---|
| 2002/0113820 | A1 | 8/2002 | Robinson et al. |
| 2002/0132661 | A1 | 9/2002 | Lind et al. |
| 2002/0175466 | A1 | 11/2002 | Loose et al. |
| 2003/0013517 | A1 | 1/2003 | Bennett et al. |
| 2003/0032479 | A1 | 2/2003 | LeMay et al. |
| 2003/0045345 | A1 | 3/2003 | Berman |
| 2003/0064781 | A1 | 4/2003 | Muir |
| 2003/0064801 | A1 | 4/2003 | Breckner et al. |
| 2003/0119581 | A1 | 6/2003 | Cannon et al. |
| 2003/0125101 | A1 | 7/2003 | Campo |
| 2004/0002380 | A1* | 1/2004 | Brosnan et al. .................. 463/32 |
| 2004/0029636 | A1 | 2/2004 | Wells |
| 2004/0048657 | A1 | 3/2004 | Gauselmann |
| 2004/0077402 | A1* | 4/2004 | Schlottmann .................... 463/20 |
| 2004/0077404 | A1 | 4/2004 | Schlottmann et al. |
| 2004/0092302 | A1 | 5/2004 | Gauselmann |
| 2004/0102244 | A1 | 5/2004 | Kryuchkov et al. |
| 2004/0102245 | A1 | 5/2004 | Escalera et al. |
| 2004/0198485 | A1* | 10/2004 | Loose et al. .................... 463/20 |
| 2004/0266515 | A1 | 12/2004 | Gauselmann |
| 2005/0001845 | A1 | 1/2005 | Noyle |
| 2005/0075167 | A1 | 4/2005 | Beaulieu et al. |
| 2005/0225559 | A1 | 10/2005 | Robertson et al. |
| 2005/0233798 | A1 | 10/2005 | Van Asdale |
| 2005/0233799 | A1 | 10/2005 | LeMay et al. |
| 2006/0025199 | A1 | 2/2006 | Harkins et al. |
| 2006/0229122 | A1 | 10/2006 | Macke |
| 2006/0287058 | A1 | 12/2006 | Resnick et al. |
| 2007/0155471 | A1 | 7/2007 | Powell et al. |
| 2007/0155472 | A1 | 7/2007 | Gail et al. |
| 2007/0155473 | A1 | 7/2007 | Powell et al. |
| 2007/0161423 | A1 | 7/2007 | Bienvenue et al. |
| 2008/0045331 | A1 | 2/2008 | LeMay et al. |
| 2008/0188303 | A1 | 8/2008 | Schlottmann et al. |
| 2008/0188304 | A1 | 8/2008 | Escalera et al. |
| 2008/0303746 | A1 | 12/2008 | Schlottmann et al. |
| 2009/0062001 | A1 | 3/2009 | LeMay et al. |

FOREIGN PATENT DOCUMENTS

| | | |
|---|---|---|
| AU | 20021014 A1 | 8/2002 |
| AU | 200210214 A1 | 8/2002 |
| AU | 200227720 | 2/2003 |
| AU | 2003237479 B2 | 1/2004 |
| AU | 2006203556 B2 | 9/2006 |
| CA | 2343870 | 10/2001 |
| EP | 0 475 581 | 3/1992 |
| EP | 0759315 | 2/1997 |
| EP | 0 830 881 | 3/1998 |
| EP | 2405107 | 2/2005 |
| EP | 2420294 | 5/2006 |
| GB | 2412282 | 9/2005 |
| GB | 2459628 | 11/2009 |
| GR | 62140 B | 8/1979 |
| JP | 2002-099926 (A) | 4/2002 |
| RU | 2 067 775 C1 | 10/1996 |
| RU | 2 168 192 C2 | 5/2001 |
| WO | 98/45004 | 10/1998 |
| WO | WO 02/32521 | 4/2002 |
| WO | WO 02/073501 | 9/2002 |
| WO | 2004/002591 | 1/2004 |
| WO | 2004/028650 | 4/2004 |
| WO | 2004/029893 | 4/2004 |
| WO | 2005/016473 | 2/2005 |
| WO | 2005/034054 | 4/2005 |
| WO | WO 2006/039324 | 4/2006 |
| WO | 2008/005278 | 1/2008 |
| WO | 2008/154433 | 12/2008 |

OTHER PUBLICATIONS

Mason Woo, Jackie Neider, Tom Davis, Dave Shreiner, OpenGL Program Guide: The Official Guide to Learning OpenGL, Introduction to OpenGL Chapter 1, Version 1.2, 3$^{rd}$ edition, OpenGL Architecture Review Board, Addison-Wesley Publishing, Co., 1999, ISBN: 0201604582.

PowerVR (PowerVR), 3D Graphical Processing, Nov. 14, 2000, © Power VR 2000.

M2 Presswire, Aristocrat Technologies to use PowerVR technology in casino video machines; Australian company leads market for video machine games of chance, Oct. 17, 2000, http://www.aristocrat.com.au/PR181000.htm, Copyright 2000 M2 Communications, Ltd. All Rights Reserved.

David Einstein, 3D Web Browsing On The Horizon, Nov. 27, 2000, http://www.forbes.com/2001/11/27/1127threed.html., Forbes.com.

Microsoft Press. Computer Dictionary Third Edition. Redmond, WA 1997. p. 406.

European Office Action dated Nov. 24, 2005 from related EP Application No. 03770604.1 4 pages.

U.S. Office Action dated Jun. 12, 2007 from related U.S. Appl. No. 10/674,884.

GameSpot Staff. "15 Most Influential Games of All Time" Gamespot [online], retrieved May 30, 2007]. Retrieved from the Internet <http://web.archive.org/web/20010618175937/http://gamespotcom/gamespot/features/pc/most_influential/p16.html>.

U.S. Office Action dated Feb. 12, 2007 from related U.S. Appl. No. 10/676,719.

Notice of Allowance dated Sep. 24, 2007 from related U.S. Appl. No. 10/676,719 and Allowed Claims.

European Office Action dated Jun. 29, 2007 from related EP Application No. 03773084.3 3 pages.

Russian Office Action dated Jul. 19, 2007 from related Russian Application No. 2005109160 9 pages.

Russian Office Action dated Jul. 19, 2007 from related Russian Application No. 2005109161 7 pages.

U.S. Office Action dated Dec. 10, 2007 from related U.S. Appl. No. 11/112,076 14 pages.

U.S. Office Action dated Dec. 12, 2007 from related U.S. Appl. No. 11/829,807 15 pages.

U.S. Office Action dated Feb. 20, 2008 from related U.S. Appl. No. 10/674,884 7 pages.

International Search Report and Written Opinion dated Feb. 12, 2008 from related PCT Application No. PCT/US2007/015015 15 pages.

Supplemental Information Disclosure Statement dated Jan. 28, 2004 from related U.S. Appl. No. 10/272,788 4 pages.

"3D Modelers are Running under Linux" LinuxFocus: vol. Nr 4, May 1998 http://mercury.chem.pitt.edu/~tiho/ LinuxFocus/English/May1998/index.html printed on Oct. 11, 2002.

Phillip Ross, "Hardware Review: 3Dfx Graphics Card" LinuxFocus vol. 2, pp. 1-7 http://mercury.chem.pittedu/~tiho/ LinuxFocus/English/January1998/artilce18.ht printed on Oct. 11, 2002.

"Learn How to Program 3D Graphics" LinuxFocus vol. NR 2, Jan. 1998 1-2 pages http://mercury.chem.pitt.edu/ ~tiho/LinuxFocus/English/January1998/index/html.

Miguel Angel Sepulveda, "OpenGL Programming: The 3D Scene" pp. 1-7 http://mercury.chem.pitt.edu/~tiho/ LinuxFocus/English/May1998/article46.html.

Miguel Angel Sepulveda, "What is OpenGL?" LinuxFocus vol. 2 pp. 1-5 http://mercury.chem.pitt.edu/~tiho/ LinuxFocus/English/January1998/article15.html printed on Oct. 11, 2002.

"TE 5 Graphics Accelerator Technology Preview" NEC Aug. 2001, 7 pages.

"A Primer form Mercury Research The Basics of 3D Graphics Technology" The Meter available at http://www.themeter.com/artilces/3DBasics.shtml printed on Jan. 31, 2003 pp. 1-2.

"The Basics of 3D: Tackling the Pipeline", The Meter, available at http://www.themeter.com/articles/3DBasics-2.shtml, printed on Jan. 31, 2003 pp. 1-2.

"The Basics of 3D: Balancing the Pipeline", The Meter, available at http://www.themeter.com/articles/3DBasics-3.shtml, printed on Jan. 31, 2003 pp. 1-2.

"The Basics of 3D: Adding Parallelism", The Meter, available at http://www.themeter.com/articles/3DBasics-4.shtml, printed on Jan. 31, 2003 pp. 1-2.

"The Basics of 3D: What's Next", The Meter, available at http://www.themeter.com/articles/3DBasics-5.shtml, printed on Jan. 31, 2003 p. 1.

"The Basics of 3D: Transform and Lighting", The Meter, available at http://www.themeter.com/articles/3DBasics-6.shtml, printed on Jan. 31, 2003 pp. 1-2.

"The Basics of 3D: The Next Generation", The Meter, available at http://www.themeter.com/articles/3DBasics-7.shtml, printed on Jan. 31, 2003 pp. 1-2.

Scott et al. "An Overview of the VISUALIZE fx Graphics Accelerator Hardware" Article 4 Hewlet Packard Company May 1998 HP Journal.
"Pattern Display Device," Patent Abstracts of Japan, Publication No. 2002-085624, published Mar. 26, 2002.
"Game Machine," Patent Abstracts of Japan, Publication No. 2001-252394, published Sep. 18, 2001.
"Game Machine," Patent Abstracts of Japan, Publication No. 2001-252393, pubilshed Sep. 18, 2001.
"Slot Machine," Patent Abstracts of Japan, Publication No. 2001-062032, published Mar. 13, 2001.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (29 pages).
Rose, "Nevada A.G. Finds Free Internet Gambling is Still Gambling", Mar. 2001, printed from http://rose.casinocitytimes.com/articles/974.html, pp. 1-4.
U.S. Office dated Feb. 8, 2005 from related U.S. Appl. No. 10/272,788, 11 pages.
U.S. Office dated May 25, 2005 from related U.S. Appl. No. 10/272,788, 14 pages.
U.S. Office dated Jun. 1, 2006 from related U.S. Appl. No. 10/272,788, 10 pages.
U.S. Office dated Oct. 26, 2006 from related U.S. Appl. No. 10/272,788, 8 pages.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (40 pages).
European Office Action dated Nov. 24, 2005 from related EP Application No. 03770604.1 4 pages.
U.S. Office Action dated Jun. 12, 2007 from related U.S. Appl. No. 10/674,884.
GameSpot Staff. "15 Most Influential Games of All Time" Gamespot [online], retrieved May 30, 2007]. Retrieved from the Internet <http://web.archive.org/web/20010618175937/http://gamespot.com/gamespot/features/pc/most_influential/p16.html>.
U.S. Office Action dated Feb. 12, 2007 from related U.S. Appl. No. 10/676,719.
Notice of Allowance dated Sep. 24, 2007 from related U.S. Appl. No. 10/676,719 and Allowed Claims.
European Office Action dated Jun. 29, 2007 from related EP Application No. 03773084.3 3 pages.
Russian Office Action dated Jul. 19, 2007 from related Russian Application No. 2005109160 9 pages.
Russian Office Action dated Jul. 19, 2007 from related Russian Application No. 2005109161 7 pages.
U.S. Office Action dated Dec. 10, 2007 from related U.S. Appl. No. 11/112,076 14 pages.
U.S. Office Action dated Dec. 12, 2007 from related U.S. Appl. No. 11/829,807 15 pages.
U.S. Office Action dated Feb. 20, 2008 from related U.S. Appl. No. 10/674,884 7 pages.
International Search Report and Written Opinion dated Feb. 12, 2008 from related PCT Application No. PCT/US2007/015015 15 pages.
Supplemental Information Disclosure Statement dated Jan. 28, 2004 from related U.S. Appl. No. 10/272,788 4 pages.
"3D Modelers Are Running under Linux" LinuxFocus: vol. Nr 4, May 1998 http://mercury.chem.pitt.edu/~tiho/LinuxFocus/English/May1998/index.html printed on Oct. 11, 2002.
Phillip Ross, "Hardware Review: 3Dfx Graphics Card" LinuxFocus vol. 2, pp. 1-7 http://mercury.chem.pitt.edu/~tiho/LinuxFocus/English/January1998/artilce18.ht printed on Oct. 11, 2002.
"Learn How to Program 3D Graphics" LinuxFocus vol. NR 2, Jan. 1998 1-2 pages http://mercury.chem.pitt.edu/~tiho/LinuxFocus/English/January1998/index/html.
Miguel Angel Sepulveda, "Open GL Programming: The 3D Scene" pp. 1-7 http://mercury.chem.pitt.edu/~tiho/LinuxFocus/English/May1998/article46.html.
Miguel Angel Sepulveda, "What is OpenGL?" LinuxFocus vol. 2 pp. 1-5 http://mercury.chem.pitt.edu/~tiho/LinuxFocus/English/January1998/article15.htm I printed on Oct. 11, 2002.

"TE 5 Graphics Accelerator Technology Preview" NEC Aug. 2001, 7 pages.
"A Primer form Mercury Research The Basics of 3D Graphics Technology" The Meter available at http://www.themeter.com/artilces/3DBasics.shtml printed on Jan. 31, 2003 pp. 1-2.
"The Basics of 3D: Tackling the Pipeline", The Meter, available at http://www.themeter.com/articles/3DBasics-2.shtml, printed on Jan. 31, 2003 pp. 1-2.
"The Basics of 3D: Balancing the Pipeline", The Meter, available at http://www.themeter.com/articles/3DBasics-3.shtml, printed on Jan. 31, 2003 pp. 1-2.
"The Basics of 3D: Adding Parallelism", The Meter, available at http://www.themeter.com/articles/3DBasics-4.shtml, printed on Jan. 31, 2003 pp. 1-2.
"The Basics of 3D: What's Next", The Meter, available at http://www.themeter.com/articles/3DBasics-5.shtml, printed on Jan. 31, 2003 p. 1.
"The Basics of 3D: Transform and Lighting", The Meter, available at http://www.themeter.com/articles/3DBasics-6.shtml, printed on Jan. 31, 2003 pp. 1-2.
"The Basics of 3D: The Next Generation", The Meter, available at http://www.themeter.com/articles/3DBasics-7.shtml, printed on Jan. 31, 2003 pp. 1-2.
Scott et al. "An Overview of the VISUALIZE fx Graphics Accelerator Hardware" Article 4 Hewlet Packard Company May 1998 HP Journal.
"Pattern Display Device," Patent Abstracts of Japan, Publication No. 2002-085624, published Mar. 26, 2002.
"Game Machine," Patent Abstracts of Japan, Publication No. 2001-252394, published Sep. 18, 2001.
"Game Machine," Patent Abstracts of Japan, Publication No. 2001-252393, published Sep. 18, 2001.
"Slot Machine," Patent Abstracts of Japan, Publication No. 2001-062032, published Mar. 13, 2001.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (29 pages).
Rose, "Nevada A.G. Finds Free Internet Gambling is Still Gambling", Mar. 2001, printed from http://rose.casinocitytimes.com/articles/974.html, pp. 1-4.
U.S. Office dated Feb. 8, 2005 from related U.S. Appl. No. 10/272,788, 11 pages.
U.S. Office dated May 25, 2005 from related U.S. Appl. No. 10/272,788, 14 pages.
U.S. Office dated Jun. 1, 2006 from related U.S. Appl. No. 10/272,788, 10 pages.
U.S. Office dated Oct. 26, 2006 from related U.S. Appl. No. 10/272,788, 8 pages.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (40 pages).
U.S. Office dated Feb. 22, 2007 from related U.S. Appl. No. 10/272,788, 9 pages.
Notice of Allowance and Allowed Claims dated Sep. 9, 2008 from U.S. Appl. No. 11/829,807.
Notice of Allowance and Allowed Claims dated Sep. 15, 2008 from U.S. Appl. No. 11/112,076.
Australian Office Action dated Jun. 26, 2008 from AU Application No. 2006203556.
Office Action dated Nov. 5, 2008 from U.S. Appl. No. 12/024,931.
Office Action dated Mar. 15, 2010 from U.S. Appl. No. 12/264,877.
Office Actiondated Dec. 31, 2009 from U.S. Appl. No. 12/024,931.
Final Office Action dated Jun. 9, 2009 from U.S. Appl. No. 12/024,931.
Australian Examination Report mailed Jun. 18, 2008 in Application No. 2003237479.
Australian Examination Report dated Feb. 6, 2009 from Application No. 2003279742.
Australian Examination Report dated Feb. 16, 2009 from Application No. 2003279092.

Australian Examination Report dated Mar. 12, 2010 from Application No. 2005201148.
British Examination Report dated May 14, 2009 from Application No. GB0505328.5.
British Examination Report dated Dec. 9, 2009 from Application No. GB0505328.5.
European Examination Report dated Jun. 3, 2009 from Application No. 07809991.8.
International Search Report dated Jun. 23, 2005 from related UK Application No. 0505328.5.
International Search Report dated Mar. 1, 2004 from related PCT Application No. PCT/US2003/031138.
International Search Report dated Mar. 19, 2004 from related PCT Application No. PCT/US2003/031158.
"PowerVR Technologies Debuts KYRO II SE Graphics Proecssor at CeBIT 2002", Tech/Zone, Mar. 13, 2002, available at http://www.techzone.pcvsconsole.com/news.php?tzd=1246.
International Search Report and Written Opinion dated Oct. 24, 2008 from related PCT Application No. PCT/US2008/066196.
International Preliminary Report on Patentability dated Dec. 7, 2009 from related PCT Application No. PCT/US2008/066196.
U.S. Office Action dated Jun. 13, 2003 issued in U.S. Appl. No. 09/927,901.
U.S. Final Office Action dated Dec. 22, 2003 issued in U.S. Appl. No. 09/927,901.
U.S. Examiner Interview Summary dated Mar. 16, 2004 issued in U.S. Appl. No. 09/927,901.
U.S. Office Action dated Jun. 21, 2004 issued in U.S. Appl. No. 09/927,901.
U.S. Examiner Interview Summary dated Jul. 27, 2004 issued in U.S. Appl. No. 09/927,901.
U.S. Notice of Allowance dated Dec. 16, 2004 issued in U.S. Appl. No. 09/927,901.
U.S. Notice of Allowance dated Aug. 16, 2010 issued in U.S. Appl. No. 12/264,877.
U.S. Office Action dated Aug. 18, 2010 issued in U.S. Appl. No. 11/481,666.
U.S. Office Action dated Jun. 17, 2005 issued in U.S. Appl. No. 10/187,343.
U.S. Final Office Action dated Jan. 30, 2007 issued in U.S. Appl. No. 10/187,343.
U.S. Office Action dated Jun. 27, 2007 issued in U.S. Appl. No. 10/187,343.
U.S. Office Action dated Aug. 21, 2008 issued in U.S. Appl. No. 10/187,343.
U.S. Office Action dated May 15, 2009 issued in U.S. Appl. No. 10/187,343.
U.S. Final Office Action dated May 10, 2010 issued in U.S. Appl. No. 10/187,343.
U.S. Notice of Allownace dated Aug. 6, 2010 issued in U.S. Appl. No. 10/187,343.
U.S. Action - Examiner's Answer re Brief on Appeal, dated Jun. 22, 2009 issued in U.S. Appl. No. 10/674,884.
U.S. Action - Examiner's Communication re Ids Considered dated Jul. 27, 2009 issued in U.S. Appl. No. 10/674,884.
U.S. Office Action dated May 18, 2010 issued in U.S. Appl. No. 12/101,921.
U.S. Office Action dated Aug. 25, 2010 issued in U.S. Appl. No. 11/759,825.
U.S. Notice of Non-Compliant Amendment (37 CFR 1.121) dated Aug. 11, 2010 issued in U.S. Appl. No. 12/024,931.
U.S. Notice of Allowance dated Sep. 20, 2010 issued in U.S. Appl. No. 12/024,931.
Australian Examiner's first report dated Nov. 21, 2005 issued in AU Patent Application No. 27720/02.
PCT International Preliminary Report on Patentability and Written Opinion dated Jan. 6, 2009 issued in PCT Application No. PCT/US2007/015015.
EP Examination Report dated Jun. 3, 2009 issued in Application No. 07 809 991.8 -2221.
EP Result of Consultation dated Sep. 1, 2009 issued in Application No. 07 809 991.8-2221.
PCT International Search Report dated Jan. 13, 2004 from related PCT Application No. PCT/US2003/018028.
British Examination Report dated Jun. 9, 2005 from UK Application No. 0427512.9, 2 pgs.
British Examination Report dated Nov. 7, 2006 from Application No. 0427512.9.
UK Combined Search and Examination Report under Sections 17 and 18(3) dated Mar. 15, 2006 issued in GB0600005.3, 5 pgs.
Australian Examiner's Report No. 2 dated Aug. 10, 2010 issued in Application No. 2005201148.
European Examination Report dated Dec. 15, 2005 issued in EP Application No. 03 773 084.3-2218.
England and Wales High Court (Patent Court) Decisions; Neutral Citation No. [2005] EWHC 2416 (Pat) Case No. CH/2005/APP/0232 http://www.bailii.org/we/cases/EWHC/Patents/2005/2416.html (5 pgs.).
Patents Act 1977: Examining for Patentability Article http://www.patent.gov.uk/patent/notices/practice/examforpat.htm (3 pgs.).
Scarne, John., Scarne on Cards, 1949, Crown Publishers, p. 243.
U.S. Notice of Allowance dated Nov. 1, 2010 issued in U.S. Appl. No. 12/264,877.
U.S. Notice of Allowance dated Nov. 30, 2010 issued in U.S. Appl. No. 10/187,343.
U.S. Office Action Final dated Oct. 29, 2010 issued in U.S. Appl. No. 12/101,921.
U.S. Notice of Allowance dated Nov. 15, 2010 issued in U.S. Appl. No. 12/024,931.

* cited by examiner

GAME INTERACTION IN 3-D GAMING ENVIRONMENTS

RELATED APPLICATION DATA

The present application claims priority under 35 U.S.C. 120 of U.S. patent application Ser. No. 09/927,901 for VIRTUAL CAMERAS AND 3-D GAMING ENVIRONMENTS IN A GAMING MACHINE filed on Aug. 9, 2001, and issued as U.S. Pat. No. 6,887,157 on May 3, 2005, the entire disclosure of which is incorporated herein by reference for all purposes.

BACKGROUND OF THE INVENTION

This invention relates to game presentation methods for gaming machines such as slot machines and video poker machines. More particularly, the present invention relates to apparatus and methods of for displaying game presentations derived from a 3-D gaming environment. Still more particularly, embodiments of the present invention relate to various techniques for enabling game players to interact with such a 3-D gaming environment.

As technology in the gaming industry progresses, the traditional mechanically driven reel slot machines are being replaced with electronic counterparts having CRT, LCD video displays or the like. These video/electronic gaming advancements enable the operation of more complex games, which would not otherwise be possible on mechanical-driven gaming machines. Gaming machines such as video slot machines and video poker machines are becoming increasingly popular. Part of the reason for their increased popularity is the nearly endless variety of games that can be implemented on gaming machines utilizing advanced electronic technology.

There are a wide variety of associated devices that can be connected to video gaming machines such as video slot machines and video poker machines. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the players interest in additional game play. Maintaining a game player's interest in game play, such as on a gaming machine or during other gaming activities, is an important consideration for an operator of a gaming establishment.

One method for maintaining a player's interest is to present multiple games at the same time during a game presentation. For instance, triple play poker in which a player plays three hands of poker during each game presentation has become very popular game implemented on a video gaming machine. Variants of triple play poker include game presentations where a hundred or more poker hands are played during each game presentation. The presentation of multiple games during a single game presentation may be extended to other types of games, such as video slot games.

One difficulty associated with presenting multiple games in a video game presentation is the screen resolution of the display on a gaming machine. A typical display resolution on a gaming machine is about 640 pixels by 480 pixels. As the number of games presented in a game presentation increases, the amount of detail may be limited by the screen resolution. For instance, for a hundred hand poker game where a hundred poker hands are displayed during each game presentation, each card must be drawn fairly small without much detail to accommodate all of the cards on a single display screen. The lack of detail and small card size may discourage some game players from playing such games.

Another method for maintaining a player's interest in playing a game on a gaming machine is to present an exciting game presentation that is shown on a display screen on the gaming machine. Many newer game systems use graphical generation schemes employing mass storage devices that utilize varied load times and stream-able media formats to generate an exciting game presentation. With these game systems, many game scenes are generated during the game play using complex renderings and video playback capabilities. Typically, however, for efficiency reasons, a player has little control over the game outcome presentation other than through game decisions they make during the play of the game.

In view of the above, it would be desirable to provide method and apparatus that allow detailed game presentations accommodating the simultaneous play of multiple games to be presented on a video gaming machine where the game presentation may also be controlled by a game player.

SUMMARY OF THE INVENTION

The present invention provides methods and apparatus which facilitate player interaction with various aspects of a 3-D gaming environment. According to some embodiments, the game player is allowed to interact with the 3-D gaming environment by, for example, changing the viewpoint perspective to effect navigation, or manipulating objects in the environment. According to some embodiments, the degrees of freedom with which the game player interacts with the multi-dimensional gaming environments enabled by the invention are controlled to allow the player to take full advantage of the variability provided while ensuring that a reasonable game playing throughput is maintained.

According to a specific embodiment, a gaming machine is provided having a gaming controller operable to control one or more games of chance played on the gaming machine. A memory is operable to store 3-D data corresponding to a 3-D gaming environment. Gaming logic is operable to render a plurality of images of the 3-D gaming environment for presentation on the machine's display. The images depict manipulation of one or more aspects of the 3-D gaming environment by a user. A user interface is operable to provide user input to facilitate the manipulation of the one or more aspects of the 3-D gaming environment by the user.

According to another specific embodiment of the invention, a method is provided for facilitating manipulation of at least some aspects of a 3-D gaming environment presented on a display of a gaming machine which is operable to facilitate play of one or more games of chance. According to this embodiment, a plurality of images of the 3-D gaming environment are rendered for presentation on the display. The images depict manipulation of the one or more aspects of the 3-D gaming environment by a user using a user interface.

According to yet another specific embodiment of the invention, a gaming machine is provided having a gaming controller operable to control a plurality of games of chance played on the gaming machine, and to generate a plurality of outcomes corresponding to the games of chance. A memory is operable to store 3-D data corresponding to a 3-D gaming environment. Gaming logic is operable to render a plurality of images of the 3-D gaming environment for presentation on the machine's display. Each of the images depicts fewer than all of the plurality of outcomes. Successive ones of the images facilitate navigation among all of the outcomes.

According to still another specific embodiment of the invention, a method is provided for presenting a plurality of outcomes of a plurality of games of chance on a display of a gaming machine. According to this embodiment, a plurality of images of a 3-D gaming environment are rendered for presentation on the display. Each of the images depicts fewer than all of the plurality of outcomes. Successive ones of the images facilitate navigation among all of the outcomes within the 3-D gaming environment.

These and other features of the present invention will be presented in more detail in the following detailed description of the invention and the associated figures.

DESCRIPTION OF THE PREFERRED EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known features or process operations have not been described in detail in order not to unnecessarily obscure the present invention.

Figure 1:
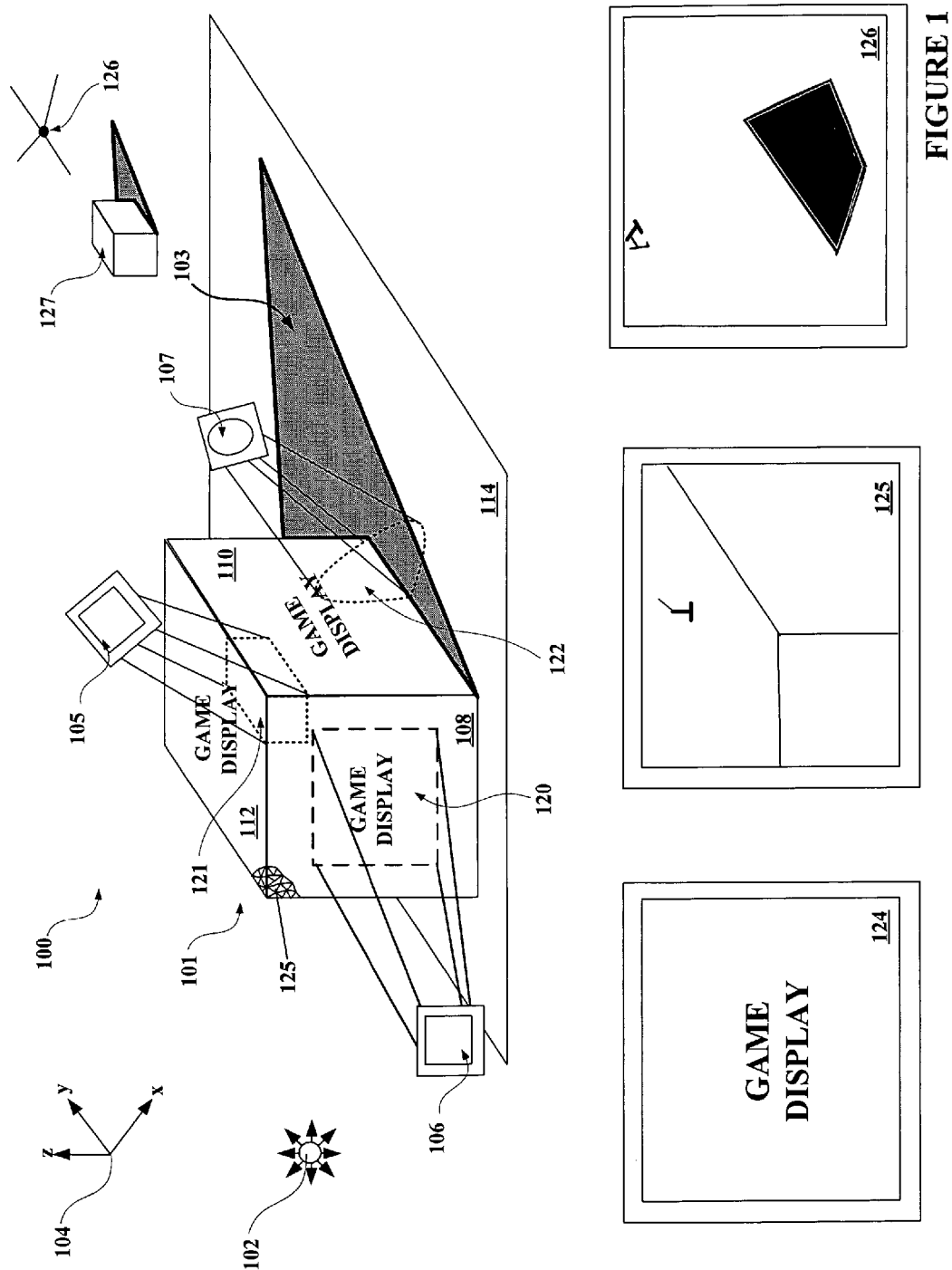
FIG. 1 is a perspective drawing of a 3-D virtual gaming environment implemented on a gaming machine for one embodiment of this invention.

FIG. 1 is a perspective drawing of a 3-D virtual gaming environment 100 implemented on a gaming machine for one embodiment of this invention. The 3-D virtual gaming environment may be used by the master gaming controller on the gaming machine to present a game of chance. The game of chance played on the gaming machine may include: 1) a wager selected by a player playing a game on the gaming machine, 2) an initiation of the game of chance on the gaming machine by the player, 3) a determination of an outcome for the game of chance by the gaming machine and 4) a presentation on the gaming machine of the game outcome to the player. In the present invention, the 3-D gaming environment may be used to present a game outcome to the player, describe operating functions of the gaming machine and provide an interface for obtaining gaming information and services. Apparatus and methods implementing these features are described with respect to FIGS. 1-12.

To utilize a virtual 3-D gaming environment for a game presentation or other gaming activities on a gaming machine, a 2-D view of the virtual 3-D gaming environment is rendered. The 2-D view captures some portion of the surfaces modeled in the virtual 3-D gaming environment. The captured surfaces define a 3-D object in the 3-D gaming environment. The captured surfaces in 2-D view are defined in the 3-dimensional coordinates of the virtual 3-D gaming environment and converted to a 2-dimensional coordinate system during the capturing process. As part of a game presentation, the 2-D view may be presented as a video frame on a display screen on the gaming machine. In some ways, the two-dimensional view is analogous to a photograph of a physical 3-D environment taken by a camera where the photograph captures a portion of the physical 3-D surfaces existing in the physical 3-D environment. However, the photograph from a camera is not strictly analogous to a 2-D view rendered from a virtual 3-D gaming environment because many graphical manipulation techniques may be applied in a virtual 3-D gaming environment that are not available with an actual camera.

In the present invention, the 2-D view is generated from a viewpoint within the virtual 3-D gaming environment. The viewpoint is a main factor in determining what surfaces of the 3-D gaming environment defining a 3-D object are captured in the 2-D view. Since information about the 3-D gaming environment is stored on the gaming machine, the viewpoint may be altered to generate new 2-D views of objects within the 3-D gaming environment. For instance, in one frame, a 2-D view of an object modeled in the 3-D gaming environment, such as a front side of a building (e.g. the viewpoint captures the front side of a building), may be generated using a first viewpoint. In another frame, a 2-D view of the same object may be generated from another viewpoint (e.g. the backside of the building).

A disadvantage of current gaming machines is that the 2-D views used as video frames in game presentations are only rendered from 2-D objects and information about the multi-dimensional nature of the objects rendered in the 2-D views, such as the viewpoint used to generate the 2-D view, are not stored on the gaming machine. Historically, due to the regulatory environment of the gaming industry, gaming software used to present a game of chance has been designed to "run in place" on an EPROM installed on the gaming machine. Using an EPROM, it was not feasible to store large amounts of game data relating to a complicated 3-D model. Thus, only 2-D object information used to render the 2-D view was stored on the gaming machine.

However, 2-D games rendered on gaming machines have also become more sophisticated and often employ complex animations. When complicated animations are used in a 2-D system, such as playing movies on a 2-D object, a 3-D system can actually can save memory because more types of animation can be used with a 3-D system versus a 2-D system without resorting to using movies which are memory intensive. In a 2-D system without using movies, the animation properties that may be used are simple two-dimensional movement and color cycling using color palettes which provide a limited visual appeal.

When only 2-D information about a 3-D object is available, it is not possible to generate new 2-D views from different viewpoints of the 3-D object. For instance, when a picture of a playing card is rendered on current gaming machines, 3-D information, such as the thickness of the card is not stored. Thus, it is not possible to generate a 2-D view of the playing card from an edge-on viewpoint, because the thickness of the card is not known. As another example, frames from a movie may be used as part of a game presentation on a gaming machine. Each frame of the movie represents a 2-D view from a viewpoint of a camera used to film each frame. If the frame included a picture of a building viewed from the front (e.g., the viewpoint captures the front of the building), it is not possible to generate a new 2-D view of the back of the building using because information regarding the back of the building is not known.

One advantage of the present invention is the potential game playing area used to present a game of chance modeled in a 3-D gaming environment is greater than the potential game playing area of a 2-D gaming environment. For instance, a game of chance may be presented on each of the six sides of a cube modeled in a virtual gaming environment. To play the game chance, 2-D views of the cube from different viewpoints in the 3-D gaming environment may be rendered in real-time and presented to the player. As described below, in some embodiments, the player may even select the viewpoint in the 3-D gaming environment used to generate the 2-D view.

On current gaming machine, the cube would be rendered as a 2-D object generated from the 3-D cube as seen from a particular viewpoint. The particular viewpoint is selected when the game is developed and only 2-D information about the cube as viewed from the selected viewpoint would be stored on an EPROM on the gaming machine. Thus, a game of chance could be presented on the sides of the cube rendered from the 2-D object that was generated from the selected viewpoint of the 3-D cube and stored on the EPROM. However, unless additional 2-D objects were generated from different viewpoints, it is not possible to present a game of chance on the sides of the cube not visible from the selected viewpoint because the 2-D object does not store information regarding the sides of the cube not visible from the selected viewpoint. Further, even if multiple 2-D objects were generated, it is difficult and time consuming to generate enough 2-D objects to allow smooth transitions between viewpoints captured by the 2-D objects. It is also difficult to a scale a 2-D object, either smaller or larger, without introducing distortion effects.

Distortion is also generated when scaling 3-D objects. However, it is easier to deal with using specialized 3-D graphics cards because the card applies a bilinear filtering process to the texels at render time. Without special hardware, such as a 3-D graphics card, it would be difficult to correct for distortion in real-time.

Finally, in a typical 2-D gaming system, due to the limited flexibility of 2D, outcomes for a game of chance rendered in 2D and displayed on a gaming machine have to be quantified and pre-rendered i.e. canned animations. Due to the flexibility of a 3-D gaming system the outcomes can be determined through user input giving an unlimited number of animations in response to the players input. By not having to make a series of pre-canned animations but instead determining the animation in response to the players input saves many bytes in storage space requirements. In following figures, details of methods and apparatus used to present a game of chance generated from a 3-D gaming environment are described.

Returning to FIG. 1, the 3-D gaming environment 100 includes three objects: 1) a rectangular box 101 on top of, 2) a plane 114 and 3) a second box 126. The box 101, box 127 and plane 114 are defined in a 3-dimensional rectangular coordinate space 104. Typically, surfaces of the objects in the gaming environment are defined using a plurality of surface elements. The surface elements may comprise different shapes, such as different types of polygons that are well known in the 3-D graphical arts. For example, the objects in the present information may be defined in a manner to be compatible with one or more graphics standards such as Open Graphics Library (OpenGL). Information on OpenGL may be found at www.opengl.org.

In one embodiment, the objects in the gaming environment 100 may be defined by a plurality of triangular elements. As an example, a plurality of triangular surface elements 125 are used to define a portion of the surface 108 and the surface face 112. In another embodiment, the objects in the gaming environment 100, such as box 101 and box 126, may be defined by a plurality of rectangular elements. In yet another embodiment, a combination of different types of polygons, such as triangles and rectangles may be used to describe the different objects in the gaming environment 100. By using an appropriate number of surface elements, such as triangular elements, objects may be made to look round, spherical, tubular or embody any number of combinations of curved surfaces.

Triangles are by far the most popular polygon used to define 3-D objects because they are the easiest to deal with. In order to represent a solid object, a polygon of at least three sides is required (e.g. triangle). However, OpenGL supports Quads, points, lines, triangle strips and quad strips and polygons with any number of points. In addition, 3-D models can be represented by a variety of 3-D curves such as NURBs and Bezier Patches.

Each of the surface elements comprising the 3-D virtual gaming environment may be described in a rectangular coordinate system or another appropriate coordinate system, such as spherical coordinates or polar coordinates, as dictated by the application. The 3-D virtual gaming environments of the present invention are not limited to the shapes and elements shown in FIG. 1 (see FIGS. 2, 3 and 4) or the coordinate system used in FIG. 1 which are shown for illustrative purposes only. Details of 3-D graphical rendering methods that may be used with the present invention are described in "OpenGL Reference Manual: The Official Reference Document to Open GL, Version 1.2," $3^{rd}$ edition, by Dave Shreiner (editor), OpenGL Architecture Review Board, Addison-Wesley Publishing, Co., 1999, ISBN: 0201657651 and "OpenGL Program Guide: The Official Guide to Learning OpenGL, Version 1.2," $3^{rd}$ edition, by Mason Woo, Jackie Neider, Tom Davis, Dave Shreiner, OpenGL Architecture Review Board, Addison-Wesley Publishing, Co., 1999, ISBN: 0201604582, which are incorporated herein in their entirety and for all purposes.

Surface textures may be applied to each of the surface elements, such as elements 125, defining the surfaces in the virtual gaming environment 100. The surface textures may allow the 3-D gaming environment to appear more "real" when it is viewed on a display screen on the gaming machine. As an example, colors, textures and reflectance's may be applied to each of the surface elements defining the various objects in the 3-D gaming environment. Millions of different colors may be used to add a realistic "feel" to a given gaming environment. Textures that may be applied include smoothness or surface irregularities such as bumps, craters, lines, bump maps, light maps, reflectance maps and refractance maps or other patterns that may be rendered on each element. The textures may be applied as mathematical models stored as "texture maps" on the gaming machine.

In one embodiment, the "texture map" may be an animated texture. For instance, frames of a movie or another animation may be projected onto a 3-D object in the 3-D gaming environment. These animated textures may be captured in 2-D views presented in video frames on the gaming machine. Multiple animated textures may be used at the same time. Thus, for example, a first movie may be projected onto a first surface in the 3-D gaming environment and a second movie may be projected onto a second surface in the 3-D gaming environment where both movies may be viewed simultaneously.

Material properties of a 3-D surface may describe how the surface reacts to light. These surface properties may include such things as a) a material's ability to absorb different wavelengths of light, b) a material's ability to reflect different wavelengths of light (reflectance), c) a material's ability to emit certain wavelengths of light such as the tail lights on a car and d) a material's ability to transmit certain wavelengths of light. As an example, reflectance refers to how much light each element reflects. Depending on the reflectance of a surface element other items in the gaming environment may be reflected fuzzily, sharply or not at all. Combinations of color, texture and reflectance may be used to impart an illusion of a particular quality to an object, such as hard, soft, warm or cold.

Some shading methods that are commonly used with 3-D graphics to add texture that may be applied to the present invention include gourand shading and phong shading. Gourand and phong shading are methods used to hide an object's limited geometry by interpolating between two surfaces with different normals. Further, using Alpha Blending, pixels may be blended together to make an object appear transparent i.e. the object transmits light.

Virtual light sources, such as 102, may be used in the gaming environment to add the appearance of shading and shadows. Shading and shadows are used to add weight and solidity to the rendering of a virtual object. For example, to add solidity to the rectangular box 101, light rays emitted from light source 102 are used to generate a shadow 103 around the rectangular box 101. In one method, ray tracing is used to plot paths of imaginary light rays emitted from an imaginary light source such as 102. These light rays may impact and may reflect off various surfaces affecting the colors assigned to each surface element. In some gaming environments, multiple light sources may be used where the number of lights and the intensity of each light source change with time. Typically, in real time 3D, the light sources do not generate shadows and it is up to the programmer to add shadows manually. As stated earlier, however, the light sources produce shading on objects.

Perspective, which is used to convey the illusion of distance, may be applied to the gaming environment 100 by defining a vanishing point, such as 126. Typically, a single point perspective is used where all of the objects in the scene are rendered to appear as though they will eventually converge at a single point in the distance, e.g. the vanishing point. However, multiple point perspectives may also be employed in 3-D gaming environments of the present invention. Perspective allows objects in the gaming environment appear behind one another. For instance, box 101 and box 127 may be the same size. However, box 127 is made to appear smaller, and hence farther away, to a viewer because it is closer to the vanishing point 126. A 3-D gaming environment may or may not provide perspective correction. Perspective correction is accomplished by transforming points towards the center of the 2-D view screen. The farther away an object is from the viewpoint in 3-D gaming environment, the more it will be transformed into the center of screen.

The present invention is not limited to perspective views or multiple perspective views of the 3-D gaming environment. An orthographic view may be used where 3-D objects rendered in a 2-D view always appear the same size no matter how far away they are in the 3-D gaming environment. The orthographic view is what you would see as a shadow cast from a light source that is infinitely far away (so that the light rays are parallel), while the perspective view comes from a light source that are finitely far away, so that the light rays are diverging. In the present invention, combinations of both perspective and orthographic views may be used. For instance, an orthographic view of a text message may be layered on top of a perspective view of the 3-D gaming environment.

Related to perspective is "depth of field". The depth of field describes an effect where objects that appear closer to a viewer are more in focus and objects that are farther away appear out of focus. Depth of field may be applied renderings of the various objects in the gaming environment 100.

Another effect that may be applied to renderings of objects in the gaming environment is "anti-aliasing". Anti-aliasing is used to make lines which are digitally generated as a number of straight segments appear more smooth when rendered on a display screen on the gaming machine. Because the 2D display only takes finite pixel positions, stair stepping occurs on any limes that are not straight up and down, straight across (left and right) or at 45 degrees on the display screen. Stair stepping produces a visually unappealing effect, thus, pixels are added to stair-stepped lines to make this effect less dramatic.

Objects in the gaming environment 101 may be appear to be static or dynamic. For instance, the coordinates of box 127 may change with time while the coordinates of box 101 and plane 114 remain fixed. Thus, when rendered on a display screen on a gaming machine, the box 127 may appear to move in the gaming environment 101 relative to the box 101. Many dynamic effects are possible. For instance, box 127 may appear to rotate while remaining in a fixed position or may rotate while also translating to generate an effect of bouncing or tumbling. Further, in the gaming environment, objects may appear to collide with one another. For instance, box 127 may appear to collide with box 101 altering the trajectory of box 127 in the gaming environment. Many digital rendering effects may be applied to the gaming environment of the present invention. The effects described above have been provided for illustrative purposes only.

Standard alpha-numeric text and symbols may be applied to one or more surface elements in the gaming environment 101 to display gaming information to a game player. The alpha-numeric text and symbols may be applied to various surfaces in the gaming environment to generate a plurality of game displays that may be used as part of game outcome presentations viewed on the gaming machine. For instance, game displays may be rendered on each of the 6 six surface faces of box 101 or box 127 and a plurality of game displays may also be rendered on planar surface 114. In the present invention, game displays may be rendered across one or more surfaces of any polyhedron or other object defined in the gaming environment.

The rendered text and symbols allow game outcome presentations to be generated for different games of chance. For instance, a card hand for a poker game or black jack game may be rendered on each of the faces of box 101 such as surfaces 108, 110 and 112. As another example, keno numbers or bingo numbers may be rendered on different faces of boxes 101 and 127. Further, slot displays and pachinko displays for slot and pachinko game outcome presentations may be rendered on different faces of boxes 101 and 127.

Many different combinations of games of chance may be rendered in the gaming environment 100. For instance, a slot display may be rendered on face 108 of box 101, a black jack game display may be rendered on face 110, poker game display may be rendered on face 112, a keno game display may be rendered on a face on the box 101 opposite face 108, a pachinko game display may be rendered on a face on the box 101 opposite 110 and a bingo game display may be rendered on a face on the box 101 opposite face 112. A different combination of game displays may be rendered on the surfaces of box 127. Other games of chance that may be used in the present invention include but are not limited to dice games (e.g. craps), baccarat and roulette.

In the present invention, games of chance are used to denote gaming activities where a game player has made a wager on the outcome of the game of chance. Depending on the game outcome for the game of chance initiated by the player, the wager may be multiplied. The game outcome may proceed solely according to chance, i.e. without any input by the game player or the game player may affect the game outcome according to one or more decisions. For instance, in a video poker game, the game outcome may be determined according to cards held or discarded by the game player. While in a slot game, the game outcome, i.e. the final position of the slot reels, is randomly determined by the gaming machine.

The combinations of games described above may be rendered at the same time in the 3-D gaming environment. A player may play one or more games in a sequential manner. For instance, a player may select one or more games, make a wager for the one or more games and then initiate the one or more games and view game outcome presentations for the one or more games. A player may also play one or more games in a parallel manner. For instance, a player may select one or more games, make a wager for the one or more games, initiate the one or more games. Before the game outcome presentations have been completed for the one or more selected games, the player may select one or more new games, make a wager for the one or more new games and initiate the one or more new games. Details of a parallel game methodology are described in co-pending U.S. application Ser. No. 09/553,437, filed on Apr. 19, 2000, by Brosnan et al. and entitled "Parallel Games on a Gaming Device," which is incorporated in its entirety and for all purposes.

The rendered text and symbols in a game display are not necessarily planar may be rendered in multiple in dimensions in the gaming environment 100. For example, rendered cards may have a finite thickness or raised symbols. The cards may be dealt by hands that are defined as 3 dimensional object models in the 3-D gaming environment 100 and move as the cards are dealt. As another example, a slot display may be rendered as multidimensional reels with symbols (see FIG. 2) that may rotate in the gaming environment 100.

A game display for a game outcome presentation may be rendered on a particular surface and may change with time in response to various player inputs. For example, in a poker game, a player may discard and hold various cards while they are playing the game. Thus, the cards in the hand change as the game outcome is rendered in the 3-D gaming environment and some cards (e.g. discarded cards) may appear to leave the gaming environment. As another example, reels on a slot display rendered in the gaming environment may begin to spin in the gaming environment in response to a player pulling a lever or depressing an input button on the physical gaming machine.

Other game features and gaming information may also be rendered in the gaming environment 100. For example, bonus games, promotions, advertising and attraction graphics may also be rendered in the gaming environment. For instance, a casino's logo or a player's face may be rendered in the gaming environment. These additional game features may be integrated into a game outcome presentation on the gaming machine or other operational modes of the gaming machine such as an attract mode.

In another embodiment of the present invention, a virtual person, e.g. a 3-D dimensional model of a portion (e.g., face, hands, face, head and torso, etc.) or all of a human being may be rendered in the 3-D gaming environment. The virtual person may be animated. For the instance, by adjusting parameters of the 3-D dimensional model of the virtual person in a sequence, the virtual person may appear to speak or gesture. The virtual person may be used to explain gaming instructions to a game player or may be used as a component in a game presentation. The virtual person may appear to respond or interact with a user according to inputs into the gaming machine made by the user. For instance, a player may ask the virtual person a particular question via an input mechanism on the gaming machine such as microphone on a gaming machine equipped with voice recognition software. Next, the virtual person may appear to speak a response to the question input by the user. Animated 3-D models for other objects, such as animals or fictional characters, may also be used in the 3-D gaming environment.

After the gaming environment is defined in 3-dimensions, to display a portion of the 3-D gaming environment on a display screen on the gaming machine, a "photograph" of a portion of the gaming environment is generated. The photograph is a 2-dimensional rendering of a portion of the 3-dimensional gaming environment. Transformations between 3-D coordinate systems and 2-D coordinate systems are well known in the graphical arts. The photograph may be taken from a virtual "camera" positioned at a location inside the gaming environment 100. A sequence of photographs taken by the virtual camera in the gaming environment may be considered analogous to filming a movie.

A "photograph" displayed on the display screen of a gaming machine may also a composite of many different photographs. For instance, a composite photograph may be generated from portions of a first photograph generated using an orthographic view and portions of a second photograph generated using a perspective view. The portions of the photographs comprising the composite photograph may be placed on top of one another to provide "layered" effects, may be displayed in a side by side manner to produce a "collage" or combinations thereof.

In another embodiment of the present invention, a photograph may be a blended combination of two different photographs. Using an interpolation scheme of some type, two photographs may be blended in a sequence of photographs to provide a morphing effect where the first photograph appears to morph into a second photograph. For instance, a slot game may appear to morph into a poker game.

Operating parameters of the virtual camera, such as its position at a particular time, are used to define a 3-D surface in the gaming environment, which is projected on to a 2-D surface to produce the photograph. The 3-D surface may comprise portions a number of 3-D objects in the 3-D gaming environment. The 3-D surface may also be considered a 3-D object. Thus, a photograph is a 2-D image derived from 3-D coordinates of objects in the 3-D gaming environment. The virtual camera may represent gaming logic stored on the gaming machine necessary to render a portion of the 3-D gaming environment 100 to a 2-D image displayed on the gaming machine. The photograph is converted into a video frame, comprising a number of pixels, which may be viewed on a display screen on the gaming machine.

The transformation performed by the virtual camera allowing a portion of the virtual gaming environment to be viewed one or more display screens on the gaming machine may be a function of a number of variables. The size of lens in the virtual gaming environment, the position of the lens, a virtual distance between the lens and the photograph, the size of the photograph, the perspective and a depth variable assigned to each object are some of the variables that may be incorporated into a transformation by the virtual camera that renders a photograph of the virtual gaming environment. The resolution of the display screen on the gaming machine may govern the size of a photograph in the virtual camera. A typical display screen may allow a resolution of 800 by 600 color pixels although higher or lower resolution screens may be used. A "lens size" on the virtual camera defines a window into the virtual gaming environment. The window is sometimes referred to as a viewport. The size and position of the lens determines what portion of the virtual gaming environment 100 the virtual camera views.

After the photograph of the virtual gaming environment has been generated, other effects, such as static and dynamic anti-aliasing, may be applied to the photograph to generate a frame displayed on one or more displays located on the gaming machine. Typically, the mathematical and logical operations, which are encoded in gaming software logic, necessary to perform a particular transformation and generate a video frame may be executed by video cards and graphics cards located on the gaming machine and specifically designed to perform these operations. The graphics cards usually include graphical processing units (GPUs). However, the transformation operations may also be performed by one or more general purpose CPUs located on the gaming machine or combinations of GPUs and CPUs.

In general, the 2D/3D video graphics accelerators or coprocessors, often referred to as graphics processing units (GPUs), are located on or connected to the master gaming controller and are used to perform graphical operations. The solutions described are most commonly found as video cards. The graphical electronics may be incorporated directly onto the processor board (e.g. the master gaming controller) of the gaming machine, and even tightly integrated within other very large scale integrated chip solutions. The integration methods are often cost saving measures commonly used to reduce the costs associated with mass production. For instance, video cards, such as the Vivid!XS from VideoLogic Systems (VideoLogic Systems is a division of Imagination Technologies Group plc, England) may used to perform the graphical operations described in the present invention. As another example, video cards from Nvidia Corporation (Santa Clara, Calif.) may be employed. In one embodiment, the video card may be a multi-headed 3-D video card, such as a Matrox G450 (Matrox Graphics Inc., Dorval, Quebec, Canada). Multi-headed video cards let a single graphics card power two displays simultaneously or render two images simultaneously on the same display.

When displaying photographs from a virtual camera in a 3-D gaming environment, a single image from the camera may be divided among a plurality of display devices. For instance, four display screens may be used to display one quarter of a single image. The video feeds for each of the plurality of display devices may be provided from a single video card. Multi-headed video cards let a single graphics card (or graphics subsystem) display output on two or more displays simultaneously. This may be multiple output rendering for each display or one rendering over multiple displays, or variation of both. For example, when a multi-headed video card is used, a first head on the multi-headed video card may be used to render an image from a first virtual camera in a 3-D gaming environment and a second head on the multi-head video card may be used to render a second image from a second virtual camera in a 3-D gaming environment. The rendered first and second images from the first head and the second head may be displayed simultaneously on the same display or the first image may be displayed on a first display and the second image may be displayed on a second display.

Returning to FIG. 1, three lenses, 105, 106 and 107 used in a virtual camera are shown positioned at three locations in the virtual gaming environment. Each lens views a different portion of the gaming environment. The size and shape of the lens may vary which changes a portion of the virtual gaming environment captured by the lens. For instance, lenses 105 and 106 are rectangular shaped while lens 107 is ovular shaped.

Lens 106 is positioned to view the "game display" for a game outcome presentation rendered on surface 108. The portion of the gaming environment captured by lens 106 is a six-sided shape 120. As described above, the game display may contain the presentation of a particular game played on the gaming machine, such as a hand of cards for a poker game. After applying an appropriate transformation, a photograph 124 of the portion of the virtual gaming environment 100 in volume 120 is generated by the virtual camera with lens 106.

Using differing terminology common within the 3D graphics community, the lenses 105, 106 and 107 may be described as a camera. Each camera has the ability to have different settings. A scene in the 3-D gaming environment is shot from the camera's viewpoint. A different scene is captured from each camera. Thus, the scene is rendered from the camera to produce and image.

The photograph 124 generated from the virtual camera with lens 106 may be viewed on one or more display screens on the gaming machine. For instance, photograph 124 may be viewed on a main display on the gaming machine and a secondary display on the gaming machine. In another embodiment, a portion of photograph 124 may be displayed on the main display and a portion of the photograph may be displayed simultaneously on a secondary display. In yet another embodiment, a portion of photograph 124 may be displayed on a first gaming machine while a portion of photograph 124 may be displayed simultaneously on a second gaming machine.

Lens 105 of a virtual camera is positioned to view volume 121 in the virtual gaming environment 100. The volume 121 intersects three faces, 108, 110 and 112, of box 101. After applying an appropriate transformation, a photograph 125 of the portion of the virtual gaming environment 101 in volume 121 is rendered by the virtual camera with lens 105 which may be displayed on one of the display screens on a gaming machine.

Lens 107 of a virtual camera is positioned to view volume 122 in the virtual gaming environment 100. The ovular shape of the lens produces a rounded volume 122 similar to a light from a flashlight. The volume 122 intersects a portion of face 110 and a portion of plane 114 including a portion of the shadow 103. After applying an appropriate transformation, a photograph 126 of the portion of the virtual gaming environment 101 in volume 122 is rendered by the virtual camera with lens 107 which may be displayed on one or more of the display screens on a gaming machine. For instance, a gaming machine may include a main display, a secondary display, a display for a player tracking unit and a remote display screen in communication with the gaming machine via a network of some type. Any of these display screens may display photographs rendered from the 3-D gaming environment.

A sequence of photographs generated from one or more virtual cameras in the gaming environment 101 may be used to present a game outcome presentation on the gaming machine or present other gaming machine features. The sequence of photographs may appear akin to movie or film when viewed by the player. For instance, a 3-D model of a virtual person may appear to speak. Typically, a refresh rate for a display screen on a gaming machine is on the order of 60 HZ or higher and new photographs from virtual cameras in the gaming environment may be generated as the game is played to match the refresh rate.

The sequence of photographs from the one or more virtual cameras in the gaming environment may be generated from at least one virtual camera with a position and lens angle that varies with time. For instance, lens 106 may represent the position of a virtual camera at time, $t_1$, lens 105 may represent the position of the virtual camera at time, $t_2$, and lens 107 may represent the position of the virtual camera at time $t_3$. Photographs generated at these three positions by the virtual camera may be incorporated into a sequence of photographs displayed on a display screen.

The position of the virtual camera may change continuously between the positions at times $t_1$, $t_2$, $t_3$ generating a sequence of photographs that appears to pan through the virtual gaming environment. Between the positions at times $t_1$, $t_2$, $t_3$, the rate the virtual camera is moved may be increased or decreased. Further, the virtual camera may move non-continuously. For instance, a first photograph in a sequence of photographs displayed on a display screen may be generated from the virtual camera using the position of lens 106. The next photograph in the sequence of photographs may be generated from the virtual camera using the position of lens 105. A third photograph in the sequence of photographs may be generated from the virtual camera using the position of lens 107. In general, the virtual camera in the gaming environment 101 may move continuously, non-continuously and combinations thereof.

In a game presentation, a plurality of virtual cameras, with time varying positions, in a plurality of virtual gaming environments may be used. The camera and environment information as a function of time may be stored on the gaming machine and may be accessed when a particular scene for a game event in a game outcome presentation is needed such that the scene may be rendered in "real-time". A scene may be defined by the positions of one or more virtual cameras in one or more gaming environments as a function of time. The scenes may be modularized, i.e. a library of scenes may be generated, so that they may be incorporated into different games. For instance, a scene of a button being depressed may be incorporated into any game using this type of sequence.

A sequence of photographs generated from a first virtual camera in a first virtual gaming environment may be displayed simultaneously with a sequence of photographs generated from a second virtual camera in a second virtual gaming environment. For instance, the first sequence of photographs and second sequence and second sequence of photographs may be displayed on a split screen or may be displayed on different screens. In addition, the first virtual camera in a first virtual gaming environment and the second virtual camera may be located in a second virtual gaming environment different from the first virtual gaming environment. Also, the first virtual gaming environment and the second virtual gaming environment may be in the same gaming environment. Further, a single virtual camera may jump between different gaming environments, such as between a game play environment to a bonus game environment. The transition between the gaming environments may also appear to be smooth (e.g. the camera may pan from one environment in a continuous manner).

In some embodiments, a player may select from among one or more virtual gaming environments to be used in a game play on a gaming machine. For instance, a first gaming environment may involve a city-scape, such as New York, while a second gaming environment may involve a city-scape, such as Paris. During a game play on a gaming machine, a player may be able to select New York or Paris as a city-scape for the virtual gaming environment used during game play. The different game environments and different scenes generated from the environments may be stored in a memory on the gaming machine as a library of some type.

Figure 5:
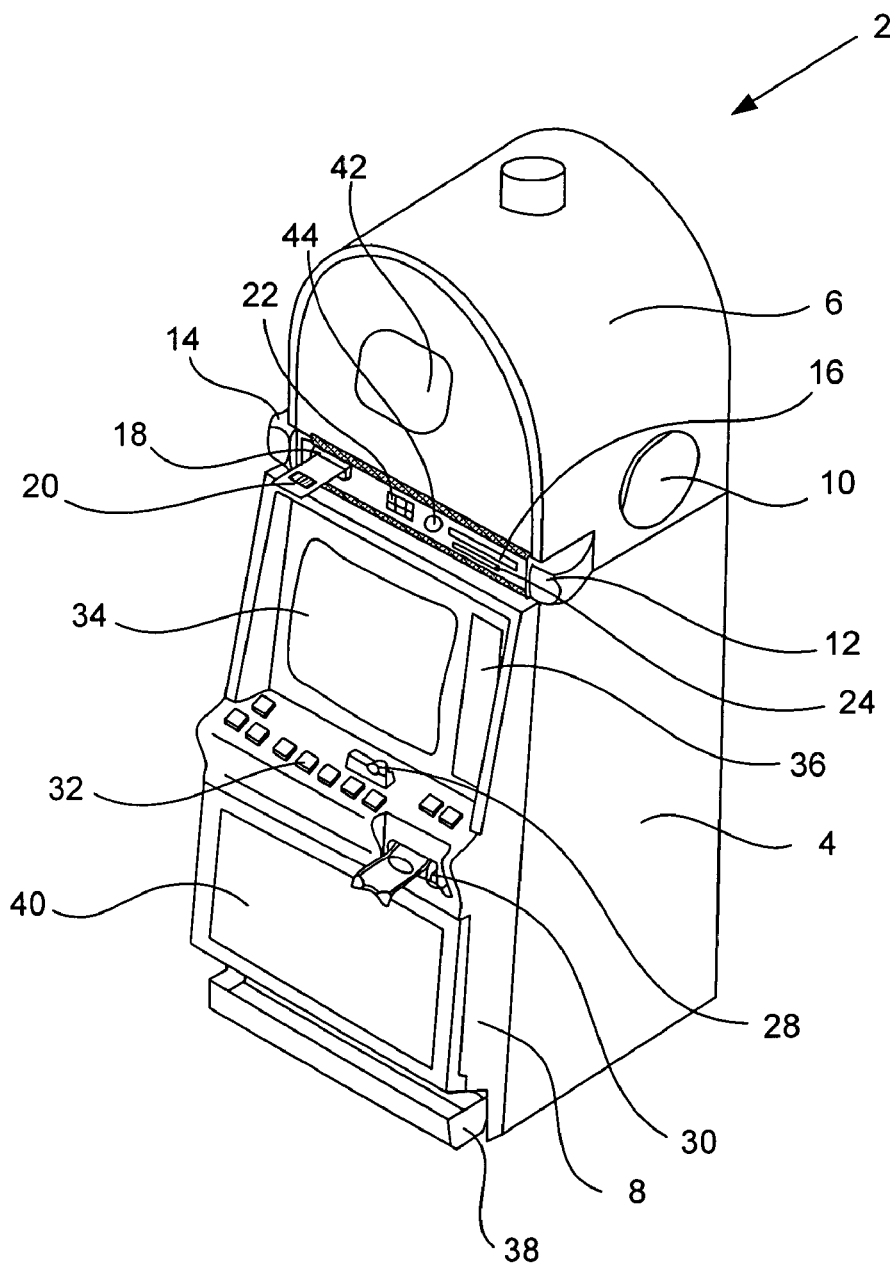
FIG. 5 is a is a perspective drawing of a gaming machine.

In particular embodiments, while using the gaming machine, a player may be able to control the position of the virtual camera using an input mechanism on the gaming machine (see FIG. 5). For instance, a player may be able to move the position of lens 106 closer to the surface 108 in the gaming environment 108 which generates the appearance of zooming or the object may be moved closer to the camera. For multiple hand card games, a player may be able to zoom-in on a particular hand to "expand on demand" the hand increasing the visibility of the hand. For instance, a player may use an input mechanism to "scroll" the camera and view larger portions. As another example, the player may be able maneuver a virtual camera through the gaming environment or select a scene in the gaming environment. An opportunity to move the virtual camera may be triggered by certain game events such as a bonus game event on the gaming machine or the movement of the camera may be scripted (e.g. pre-determined) as part of the game playing sequence. For example, as part of the play of a bonus game event, a player may be able to choose from a number of doors leading to different rooms with treasure chests. When the player enters of one of the rooms, the chest is opened and their bonus award is revealed.

With the present invention, some advantages of generating a 3-D gaming environment that may be rendered in real-time to a display screen are as follows. First, it allows a player to be presented and possibly control a complex game outcome presentation in real-time. Thus, the game outcome presentation may be varied from game to game in a manner determined by the player. Traditional game outcome presentations have been modeled in 2-D and little control has been given to the player. Thus, traditional game outcome presentations do not vary much from game to game. Second, screen resolution issues associated with presenting a large number of games simultaneously on a single screen may be avoided by modeling the games in 3-D gaming environment.

At any given time during a game presentation viewed on a display screen on the gaming machine, only a portion of the plurality of the games modeled in the 3-D gaming environment may be visible to the player. Thus, a game play in a 3-D gaming environment may be greater than a game play in a 2-D gaming environment because a game of chance may be presented on surfaces modeled in the 3-D gaming environment that may be hidden from view. In a 2-D gaming environment, there is not any hidden surfaces i.e. "what you see" is "what you get." Since the viewpoint in the 3-D model may be varied, the player or gaming machine may zoom-in on one or more games of interest, some of which may be hidden in a current 2-D view, and select a desirable resolution level. Thus, all of the games or game components do not have to be rendered on a single screen simultaneously.

Figure 2:
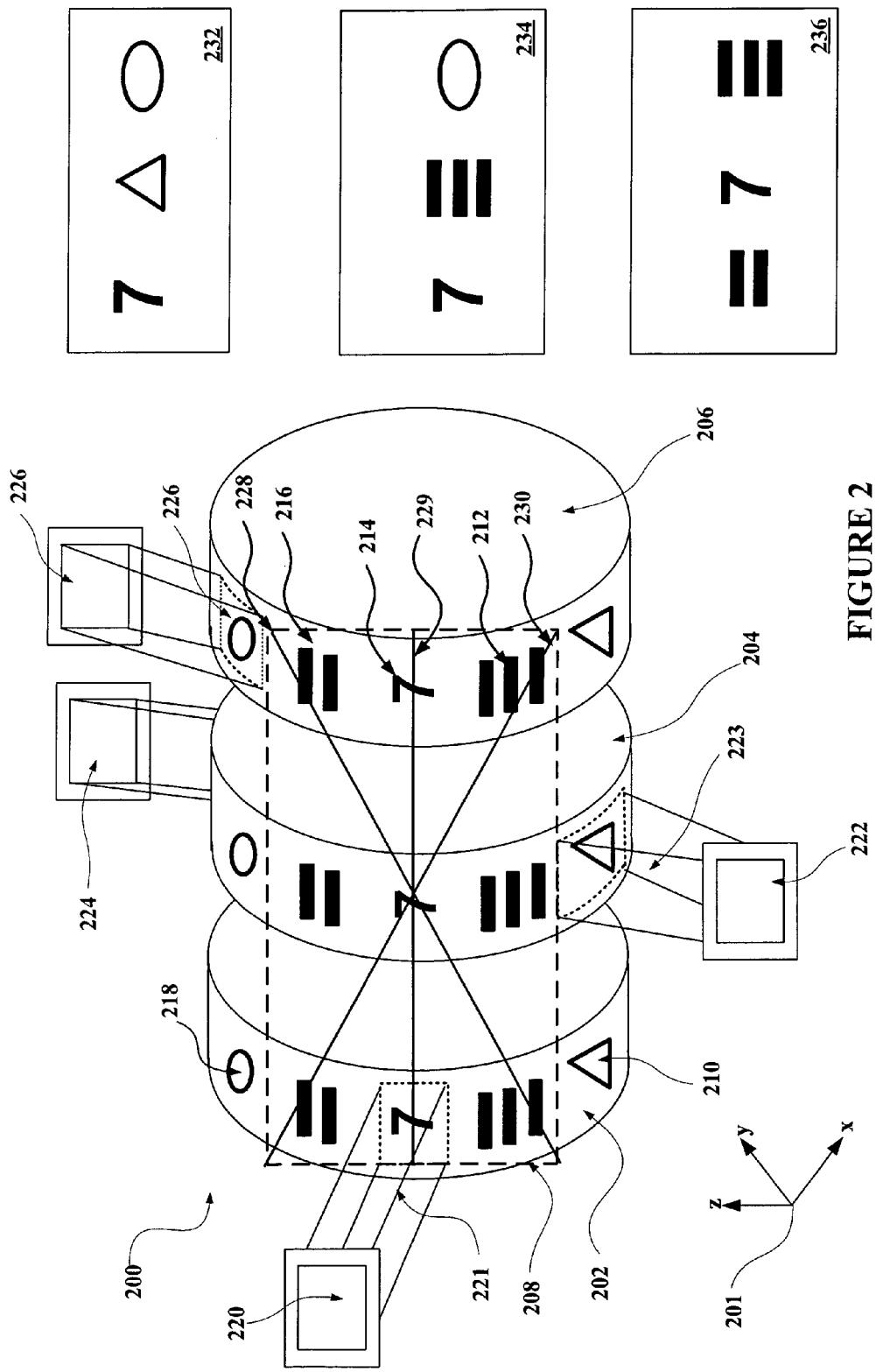
FIG. 2 is a is a perspective drawing of virtual slot reels in a 3-D virtual gaming environment implemented on a gaming machine for one embodiment of this invention.

FIG. 2 is a is a perspective drawing of three virtual slot reels, 202, 204 and 206 in a 3-D virtual gaming environment 200 implemented on a gaming machine for one embodiment of this invention. The three slot reels are modeled as cylinder portions in coordinate space 201. The reels appear to be hanging space. Different symbols are rendered on each reel including a triangle 210, a triple bar 212, a "seven" 214, double bar 216 and an oval 218. Other symbols (not shown) may be rendered on the backs of the reels. In a virtual 3-D slot gaming environment, such as 200, a size of the reels, a number of reels, a number of symbols on the reels and types of symbols on the reels may be varied. Also, background scenery (not shown) may be also varied in the environment.

A window 208 is rendered over the reels, 202, 204 and 206, to illustrate a number of symbols that may be visible on a mechanical slot display. At most, nine symbols, e.g. the three double bars, three sevens and three triple bars may be viewed on the mechanical slot display. When multiple symbols are viewed by the player, the multiple symbols may be used to generate multiple paylines that may be wagered on during game play.

When reels on a gaming machine stop after a wager has been received and a game has been initiated, a combination of symbols along a payline may be compared to winning combinations of symbols to determine an award for the game. For instance, three paylines 228, 229 and 230 are shown. Three "sevens" symbols are along payline 229. A triple bar, a seven and a double bar are shown along paylines 228 and 230. Often triple seven combination is used as a winning combination on slot games. The number of paylines increases the betting opportunities for a given game and multiple payline games are desired by some players. In some slot games, only a single line of symbols may be viewed, such as the three sevens, and a player may bet on only a single payline.

For a game outcome presentation, the slot reels 202, 204 and 206 may each begin to rotate and move in the virtual gaming environment. In the virtual space 200, the reels may rotate in different directions, translate, rotate around different axis, shrink in size or grow in size as the reels are not limited by the constraints of actual mechanical slot reels. During the game outcome presentation, a virtual camera, which may vary its position as a function of time, may film a sequence (e.g., generate a number of photographs in a sequence) that are displayed on a display screen on the gaming machine and that capture the motion of the reels.

A number of virtual cameras may be positioned in the virtual gaming environment 200 to capture one or more symbols on the slot reels. For instance, lens 220 of a virtual camera captures the "7" symbol on reel 202 in volume 221 of the virtual gaming environment 200. Lens 222 of a virtual camera captures the "triangle" symbol on reel 204 in volume 223 of the virtual gaming environment. Lens 224 of a virtual camera captures a "triple bar" symbol (not shown) on reel 204 of the virtual gaming environment. Finally, Lens 226 of a virtual camera captures the "oval" symbol on reel 206 in volume 226 of the virtual gaming environment. However, a single virtual camera may also be used to capture multiple symbols such as a line of symbols across multiple reels.

The symbols captured from the virtual cameras using lens 220, 222, 224 and 226 may be used to create various paylines that may be used for wagering. For example, the symbols captured from lens 220, 222 and 226 are used to generate a first combination of symbols 232 which may be wagered on during game play. The symbols captured from lens 220, 224 and 226 are used to generate a second combination of symbols 234 which may wagered on during game play. Finally, virtual cameras may be positioned along payline 230 to capture the combination of symbols 236.

In the present invention, the number of paylines that may be implemented is quite large. For instance, for three virtual reels with 25 symbols on each reel, $25^3$ paylines may be utilized. In one embodiment, to aid in the display of a large amount of gaming information generated in one virtual gaming environment, gaming information generated in a first gaming environment may be transferred to a second gaming environment. For example, gaming information regarding combinations of symbols along a plurality of paylines generated in gaming environment 200 may be transferred to a second gaming environment with virtual cameras for rendering it to a display viewed by a player.

In another embodiment, the slot reels 202, 204, 206 may appear translucent or semi-transparent such that symbols on the back of the reel may be visible from the front. Paylines, that may be wagered on by a player, may be rendered in "virtual space" to connect symbols on the front of a reel to a symbol on the back of the reel. For instance, a payline may be rendered from the front of reel 202 to the back of reel 204 and to the front of reel 206.

Figure 3:
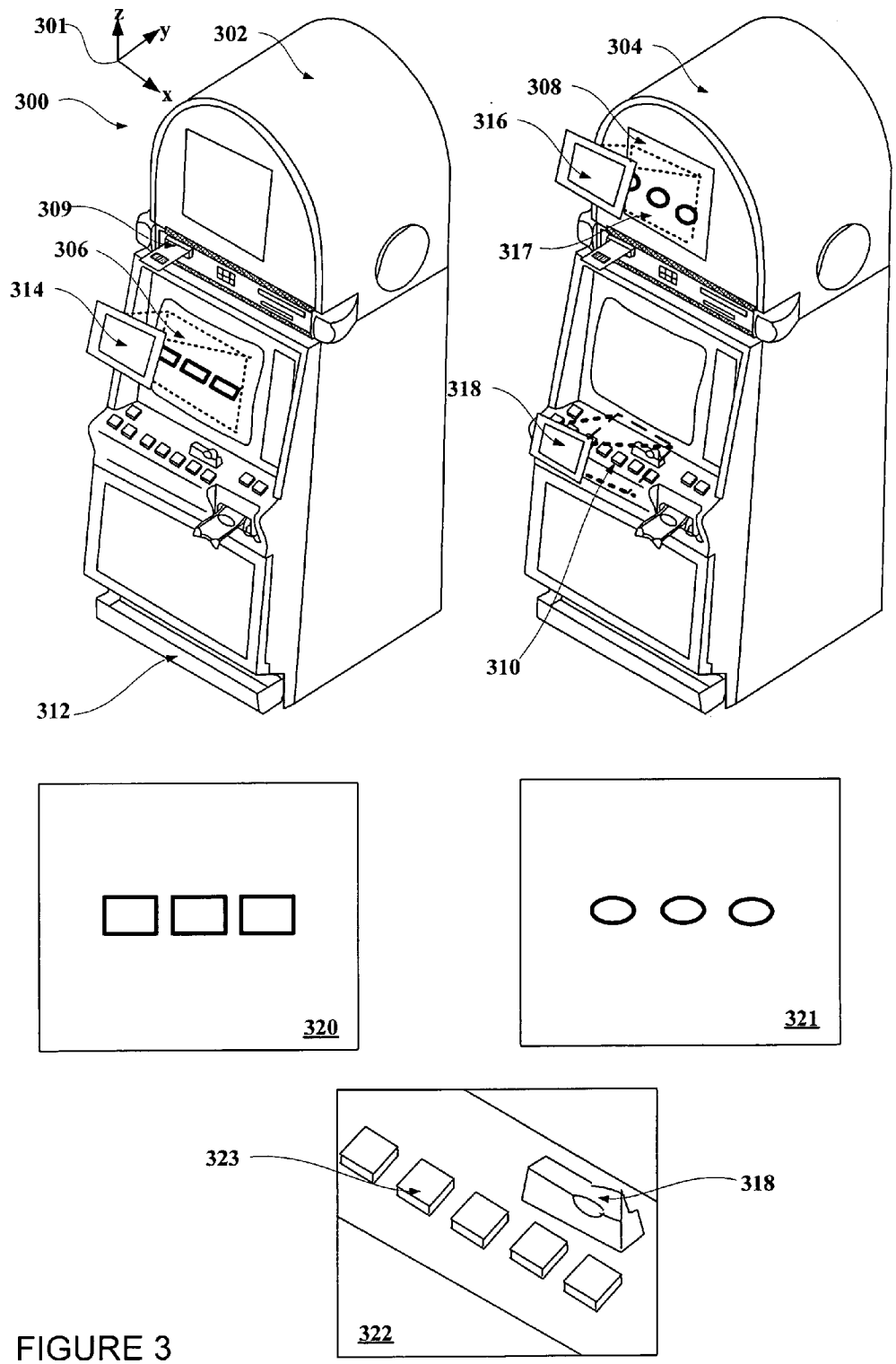
FIG. 3 is a is a perspective drawing of two gaming machines in a 3-D virtual gaming environment implemented on a gaming machine for one embodiment of this invention.

FIG. 3 is a is a perspective drawing of two gaming machines in a 3-D virtual gaming environment 300 implemented on a gaming machine for one embodiment of this invention. In the gaming environment 300, two gaming machines 302 and 304 with components, such as a main display 306, a secondary display, input buttons 310, a coin hopper 312 and a coin acceptor 318 are modeled in coordinate space 301. Other features of the gaming machines are described with respect to FIG. 5.

Three "photographs" 320, 321 and 322 from virtual cameras with lenses 314, 316 and 318 are shown. Photograph 320 shows a slot game display on the virtual gaming machine 302 and photograph 321 shows a bonus game display on the virtual gaming machine 304. Both photographs may be displayed on an actual display on the physical gaming machine. During a game outcome presentation, a virtual camera with lens 314 may show a game outcome on virtual main display 306 on gaming machine 302 and then when a bonus game is triggered the position of the virtual camera may be continuously moved to the position of 316 to capture the bonus game display on virtual secondary display 308 on gaming machine 304. When a player wins an award, the virtual camera may move to a position over virtual hopper 312 and virtual coins may be added to the hopper to simulate a win.

In another embodiment of the present invention, each gaming machine 302 and 304 may show a different game on its virtual main display. A player may be able to move a virtual camera in gaming environment 300 using input buttons on the real gaming machine to select either the game displayed on gaming machine 302 or the game displayed on gaming machine 304 for a game play. In another example, the player may be able to select both gaming machines 302 and 304 for simultaneous game play and make a single wager or separate wagers for the games played on each machine. The game player may then operate the virtual camera to examine the game outcome for each game such as zoom-in on one of the displays on gaming machine 302 or 304.

The gaming machines may be modeled from CAD/CAM drawings of actual gaming machines or other modeling formats. In one embodiment of the present invention, the physical gaming machine on which a game is played may be modeled as a virtual gaming machine in a virtual gaming environment such as 300. The virtual gaming machine in the virtual environment may be used to demonstrate various operating and maintenance features for the real gaming machine. For example, when a player needs to press an input button to play a game, a virtual input button 323 being depressed (see photograph 322) modeled from the physical gaming machine may be shown on the display screen of the gaming machine to aid the player. As another example, a player may be shown how to correctly insert a player tracking card into a card reader on the gaming machine using the virtual gaming machine. In yet another example, the player may be shown how to perform an electronics funds transfer, how to view an alternate video presentation or how to view other entertainment content available on the gaming machine. In another embodiment, a player may be required to use an electronic key with a gaming device connected to the gaming machine. For example, an electronic key may be used to gain access a particular function on the gaming machine. The electronic key may be compatible with one or more communication protocols used by the gaming device such as but not limited to wire communication protocols like USB, serial, parallel, Firewire and wireless communication protocols like IrDA, IEEE 802.11a, IEEE 802.11b and Bluetooth.

Various maintenance procedures may be modeled in the virtual gaming environment which may be used to aid a person performing a maintenance operation on the gaming machine. A virtual 3-D maintenance manual may be stored on the gaming machine or on a remote host accessible to the gaming machine. For instance, a procedure for adding paper to printer on the gaming machine may be modeled in a 3-D virtual gaming environment. When a casino service person changes the paper in the printer, a 3-D simulation of the procedure using a virtual model of gaming machine 302 with printer 309 may be rendered on the display screen of the actual gaming machine to aid the service person.

Figure 4:
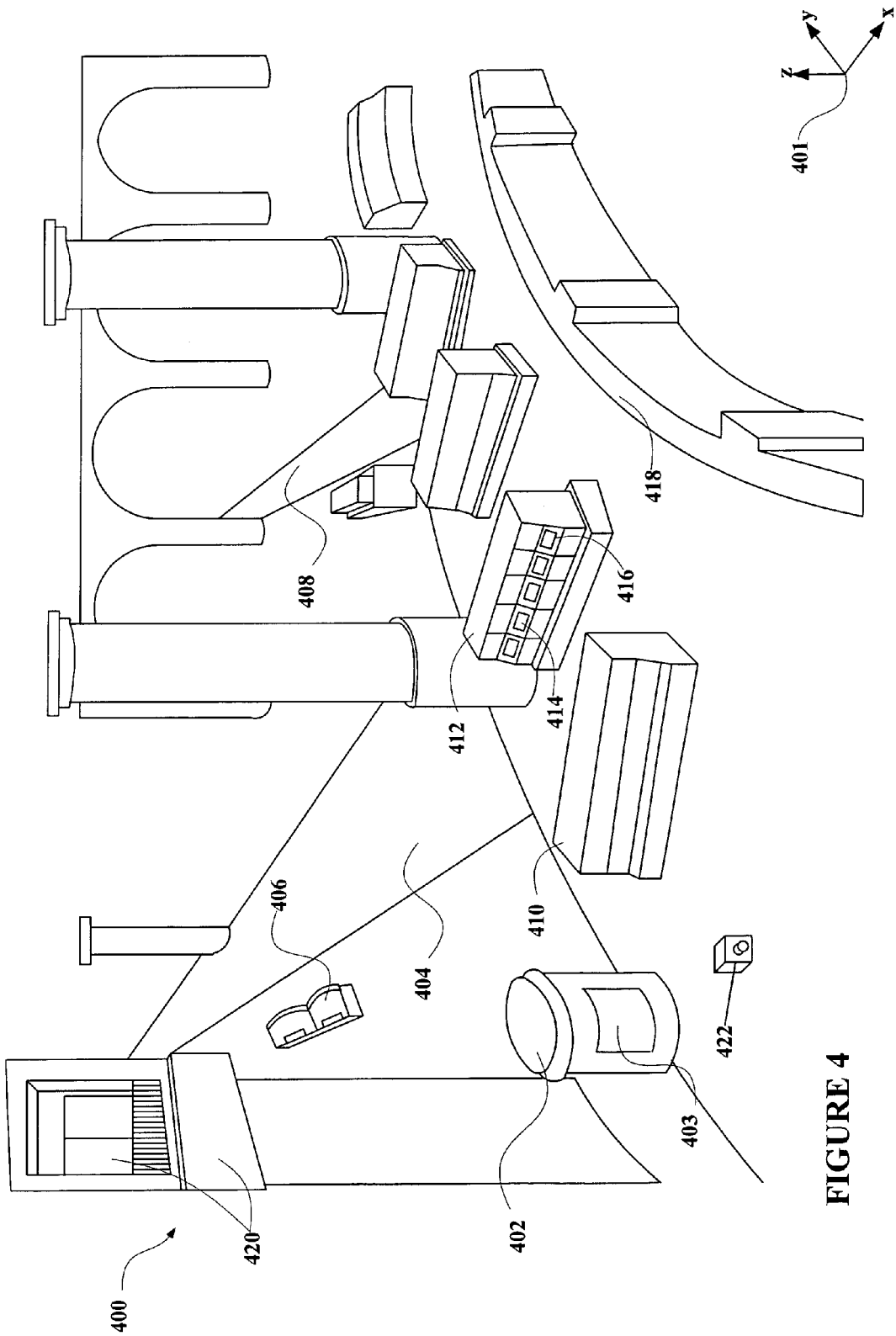
FIG. 4 is a is a perspective drawing of a virtual casino in a 3-D virtual gaming environment implemented on a gaming machine for one embodiment of this invention.

FIG. 4 is a is a perspective drawing of a virtual casino in a 3-D virtual gaming environment 400 implemented on a gaming machine for one embodiment of this invention. The virtual casino may be an actual model of the casino where the game is being played. The virtual casino is modeled with banks of gaming machines, such as 410 and 412, architectural features, such as window and balcony 420 and wall 418, gaming tables 406, walkways, such as 404 and 408, a casino kiosk 402 with a kiosk display 403, pillars and arches. The virtual casino is modeled in coordinate system 401.

The virtual casino may be used by the player to select various games to play on the physical gaming machine by operating a virtual camera 422 in the 3-D gaming environment 400. For instance, the player may be able to position the virtual camera to select between games played on gaming machines 414 and 416 or a table game played at table 406. The player or gaming program may move the camera 422 to follow path 404 or 408 to enter a different room as part of a game presentation. For example, a player may be shown a "treasure" or secret room as part of bonus game on the gaming machine. The treasure room may correspond to a theme consistent with the theme of the casino.

When the actual casino where the gaming machine is located is modeled in the gaming machine, a player may use the virtual casino to explore and locate various casino features such as restaurants and shops or locate another game player in the casino. Also, the virtual casino may also be used to give the player directions. As another example, the virtual casino may be used to locate other player and perhaps initiate a conversation with another player (e.g. instance messaging). Further, the virtual casino may be used by the player as an interface to obtain gaming information and casino services. For instance, the player may go to the virtual kiosk 403 to obtain information about their player tracking account, to redeem a prize or make dinner/entertainment reservations. As another example, a player may go to a virtual bar or a virtual café to order a drink or a snack.

Turning to FIG. 5, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, plasma/LED display or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor.

Typically, after a player has initiated a game on the gaming machine, the main display monitor 34 and the second display monitor 42 visually display a game presentation, including one or more bonus games, controlled by a master gaming controller (not shown). The bonus game may be included as a supplement to the primary game outcome presentation on the gaming machine 2. The video component of the game presentation consists of a sequence of frames refreshed at a sufficient rate on at least one of the displays, 34 and 42, such that it appears as a continuous presentation to the player playing the game on the gaming machine. Each frame rendered in 2-D on display 34 and/or 42 may correspond to a virtual camera view in a 3-D virtual gaming environment stored in a memory device on gaming machine 2.

One or more video frames of the sequence of frames used in the game presentation may be captured and stored in a memory device located on the gaming machine. The one or more frames may be used to provide a game history of activities that have occurred on the gaming machine 2. Details of frame capture for game history applications are provided co-pending U.S. application Ser. No. 09/689,498, filed on Oct. 11, 2000 by LeMay, et al., entitled, "Frame Buffer Capture of Actual Game Play," which is incorporated herein in its entirety and for all purposes.

Returning to the gaming machine in FIG. 5, the information panel 36 may be a back-lit, silk screened glass panel with lettering to indicate general game information including, for example, the denomination of bills accepted by the gaming machine (e.g. $1, $20, and $100). The bill validator 30, player-input switches 32, video display monitor 34, and information panel are devices used to play a game on the game machine 2. The devices are controlled by the master gaming controller, which is located inside the main cabinet 4 of the machine 2.

In the example, shown in FIG. 5, the top box 6 houses a number of devices, which may be used to input player tracking information or other player identification information into the gaming machine 2, including the bill validator 30 which may read bar-coded tickets 20, a key pad 22, a florescent display 16, and a camera 44, and a card reader 24 for entering a magnetic striped cards or smart cards. The camera 44 may be used to generate player images that are integrated into a virtual gaming environment implemented on the gaming machine. The key pad 22, the fluorescent display 16 and the card reader 24 may be used to enter and display player tracking information. In addition, other input devices besides those described above may be used to enter player identification information including a finger print recording device or a retina scanner. Methods and apparatus for capturing a player's image to a video frame is described in co-pending U.S. patent application Ser. No. 09/689,498, by LeMay et al. filed on Oct. 11, 2000 and titled "Frame Buffer Capture of Actual Game Play" is incorporated herein in its entirety and for all purposes.

In addition to the devices described above, the top box 6 may contain different or additional devices than those shown in the FIG. 5. For example, the top box may contain a bonus wheel or a back-lit silk screened panel which may be used to add bonus features to the game being played on the gaming machine. During a game, these devices are controlled and powered, in part, by the master gaming controller circuitry (not shown) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Returning to the example of FIG. 5, when a user selects a gaming machine 2, he or she inserts cash through the coin acceptor 28 or bill validator 30. Additionally, the bill validator may accept a printed ticket voucher, which may be accepted by the bill validator 30 as an indicia of credit. Once cash or credit has been accepted by the gaming machine, it may be used to play a game on the gaming machine. Typically, the player may use all or part of the cash entered or credit into the gaming machine to make a wager on a game play. During the course of a game, a player may be required to make a number of decisions which affect the outcome of the game. For example, a player may vary his or her wager, select a prize, or make game-time decisions which affect the game play. These choices may be selected using the player-input switches 32, the main video display screen 34 or using some other device which enables a player to input information into the gaming machine including a key pad, a touch screen, a mouse, a joy stick, a microphone and a track ball.

In some embodiments, to change the format of a game outcome presentation on the gaming machine or to utilize different gaming machine functions, the player may use an input device on the gaming machine to control a virtual camera in a virtual gaming environment implemented on the gaming machine. For instance, a player may use the virtual camera to "zoom in" or "expand on demand" a portion of the virtual gaming environment such as one poker hand of a hundred poker hands displayed on display screen 34. In another example, the game player may alter the game outcome presentation, such as the view or perspective of the game outcome presentation, by controlling the virtual camera. In yet another example, the player may be able to select a type of game for game play on the gaming machine, select a gaming environment in which a game is played, receive casino information or obtain various casino services, such as dinner reservations and entertainment reservations, by navigating through a virtual casino implemented on the gaming machine. The virtual casino may correspond to the actual casino where the gaming machine is located. Thus, the virtual casino may be used to give the player directions to other portions of the casino.

In other embodiments of the present invention, CAD/CAM models of the gaming machine 2 may be used to generate a virtual 3-D model of the gaming machine. The virtual 3-D model may be used to visually demonstrate various operating features of the gaming machine 2. For instance, when a player tracking card is inserted incorrectly in the card reader 24, the virtual 3-D model of the gaming machine may be used to display a visual sequence of the card being removed from the card reader 24, flipped over and correctly inserted into the card reader 24. In another example, a visual sequence showing a player inputting an input code on the key pad 22 may be used to prompt and show the player how to enter the information. In another example, when the gaming machine 2 is expecting an input from the player using one of the player input switches 32, the virtual 3-D model of the gaming machine may be used to display a visual sequence of the correct button on the gaming machine being depressed. In yet another example, the manner in which a bill or ticket is inserted into the bill validator may be shown to the player using a sequence of photographs generated from the 3-D model.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. The ability of a player to control a virtual camera in a virtual gaming environment to change the game outcome presentation may also add to the excitement of the game. After the player has completed a game, the player may receive game tokens from the coin tray 38 or the ticket 20 from the printer 18, which may be used for further games or to redeem a prize.

Figure 6:
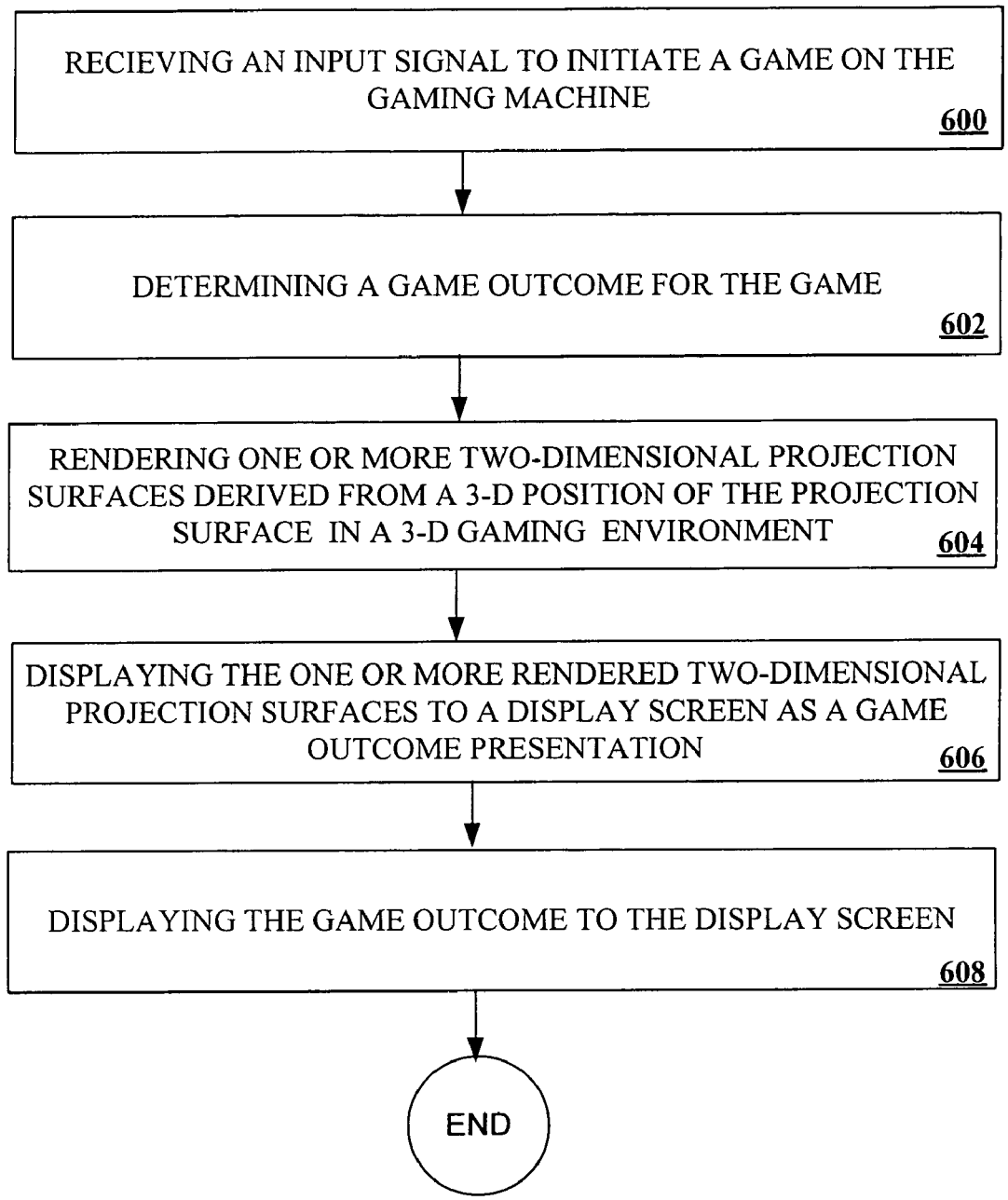
FIG. 6 is a flow chart depicting a method for generating a game outcome presentation using a 3-D virtual gaming environment.

FIG. 6 is a flow chart depicting a method for generating a game outcome presentation from a virtual gaming environment. In 600, after receiving a wager for one or more games played on a gaming machine, an input signal is received on the gaming machine to initiate a game of chance. The input signal may be input by a player using a various input devices available on the gaming machine, such as input buttons and a touch screen. In 602, one or more game outcomes are determined for the one or more games initiated by the game player. Typically, a game outcome is determined by generating one or more random numbers and comparing the numbers with a paytable stored on the gaming machine.

In 603, based upon the one or more game outcomes determined in 602, one or more game displays is rendered in a 3-D virtual game environment in the gaming machine. In 604, at least one virtual camera in the 3-D gaming environment is used to render a sequence of 2-D projection surfaces (e.g. images) derived from three-dimensional coordinates of surfaces in the 3-D gaming environment. As described with reference to FIG. 2, the position of the virtual camera may vary with time. In 606, the sequence of rendered 2-D projection surfaces is displayed to one or more game display screens on the gaming machine as part of a game outcome presentation or a bonus game presentation. In 608, the game outcome (e.g. an amount awarded for one or more games) is displayed to the display screen. The method described above is not limited to game outcome presentations. Other types of gaming information such as attract mode presentations, maintenance operation information, game operation information and casino information may be generated in a 3-D virtual gaming environment and displayed to a display screen on the gaming machine. Further, transition screens that allow a smooth transition between different gaming presentations may also be generated and displayed on the display screen. For instance, a transition screen may be generated to for a display a smooth transition between a game outcome presentation and a bonus game.

Figure 7:
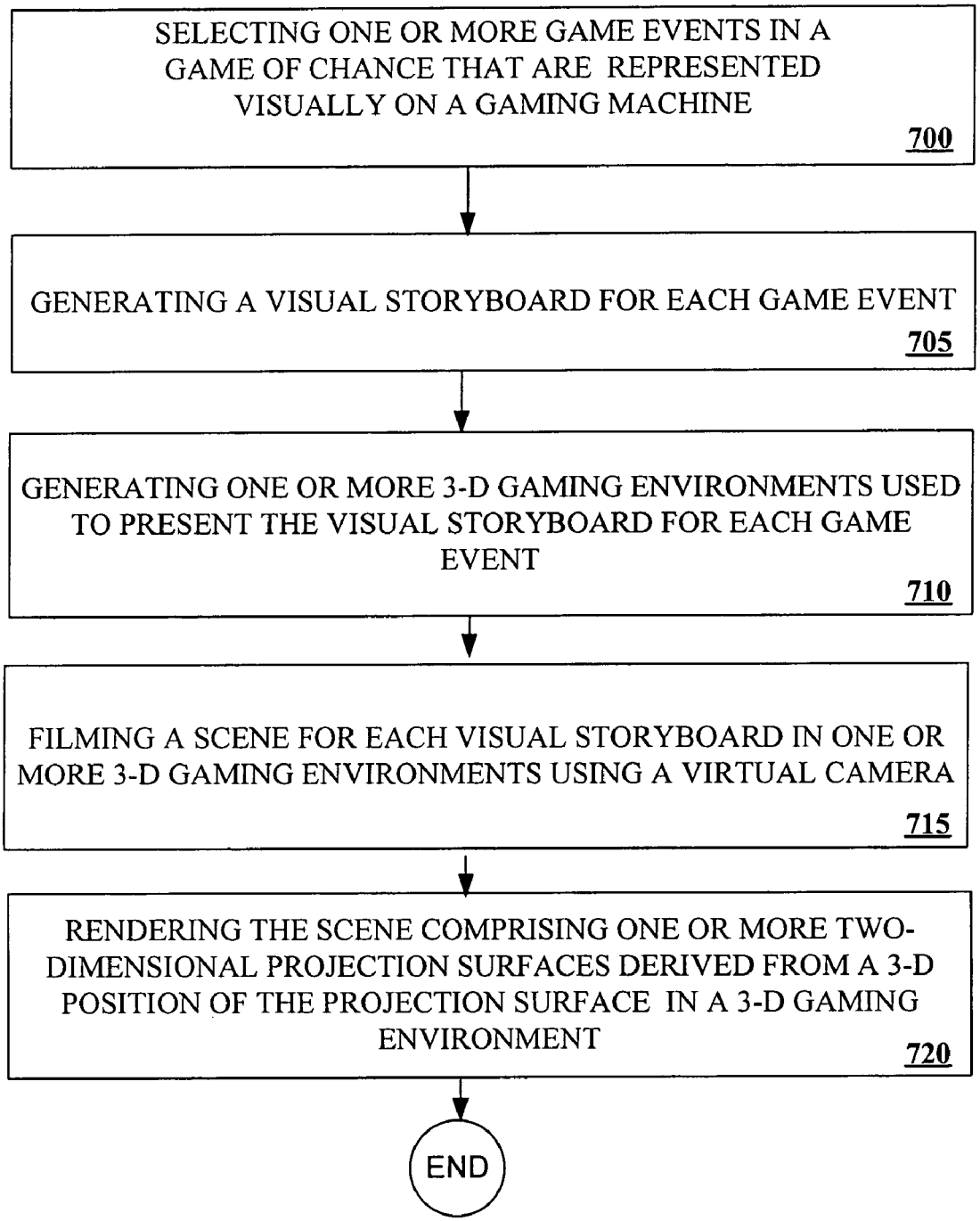
FIG. 7 is a flow chart depicting a method for generating a game of chance using a virtual gaming environment.

FIG. 7 is a flow chart depicting a method for generating a game using a 3-D virtual gaming environment. In 700, game events that comprise a game of chance played on the gaming machine and are represented visually are selected. In 705, a 3-D visual storyboard describing a scene in one or more virtual gaming environments is generated for each game event. The scene information may include virtual camera positions as a function of time in one or more gaming environments. For instance, a story board for cards being dealt in a card game may describe a pair of 3-D hands dealing the card over a gaming table with a virtual camera positioned directly above the gaming table looking down at the hands. In 710, a scene corresponding to the 3-D visual storyboard for each game event is generated in one or more 3-D virtual gaming environments. In 715, a scene corresponding to the visual storyboard for each game event is "filmed" in the one or more 3-D gaming environment. Filming each game event in the 3-D gaming environment comprises selecting a sequence of virtual camera positions and angles in the one or more 3-D gaming environments. In some embodiments, a player may control the position of the virtual camera in some manner. In 720, a sequence of 2-D projection surfaces (e.g. virtual camera images) derived from three-dimensional coordinates of surfaces in the 3-D gaming environment are rendered to a display screen on the gaming machine.

In the present invention, multiple "photographs" may be simultaneously generated from multiple virtual cameras located in one or more 3-D gaming environments on a gaming machine. The photographs may be displayed on one or more display screens available on the gaming machine. In addition, virtual cameras may be located in virtual 3-D gaming environments located on remote gaming devices, such as remote servers or other gaming machines, in communication with the local gaming machine. For instance, a plurality of linked gaming machines may "share" a 3-D gaming environment and players on each of the plurality of gaming machines may be able to see activities of other players in the "shared" 3-D gaming environment and possible interact with other players in the shared 3-D gaming environment. For instance game players may be able to play games against other game players or play games with other game players. The gaming machines may be linked via a local area network, a wide area network, the Internet, private intranets and virtual private intranets.

A plurality of photographs from virtual cameras in one or more 3-D gaming environments may be arranged as a number of smaller game windows on a display screen on the gaming machine. For example, the display screen may be divided into four equally sized game windows. As another example, a smaller game window may be generated within a larger game window on the display screen like picture-in-picture on a Television. The multiple game windows may contain photographs generated from 3-D virtual gaming environments both local and remote to the gaming machine. In addition, the multiple game windows may contain information from other sources. For instance, the game windows may each contain entertainment content such as an advertisement, news, stock quotes, electronic mail, a web page, a message service, a locator service or a hotel/casino service, a movie, a musical selection, a casino promotion and a broadcast event. Further, the windows may contain traditional casino games generated from 2-D objects.

Figure 8:
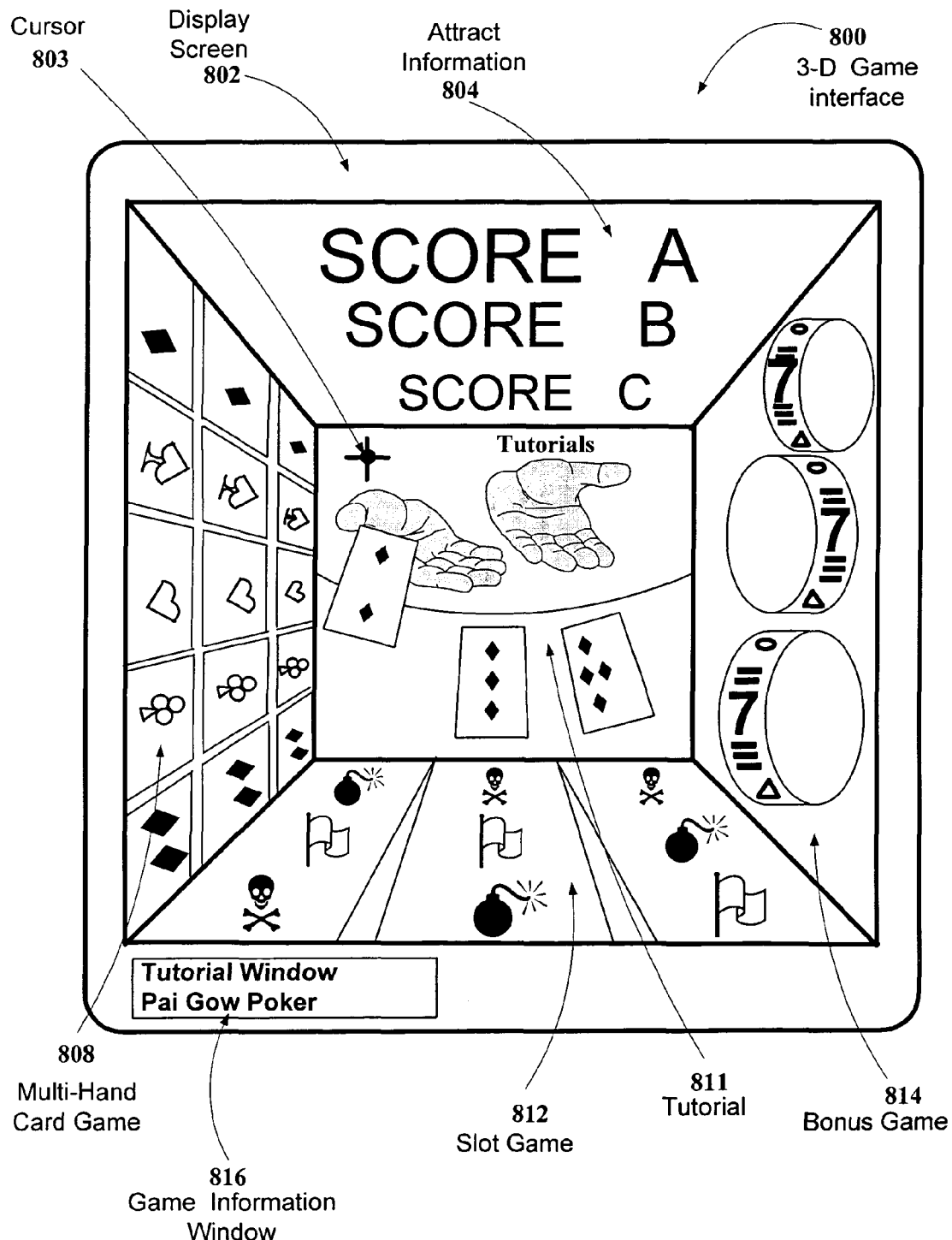
FIGS. 8 and 9 are perspective drawings of a 3-D interface for a gaming machine.
Figure 9:
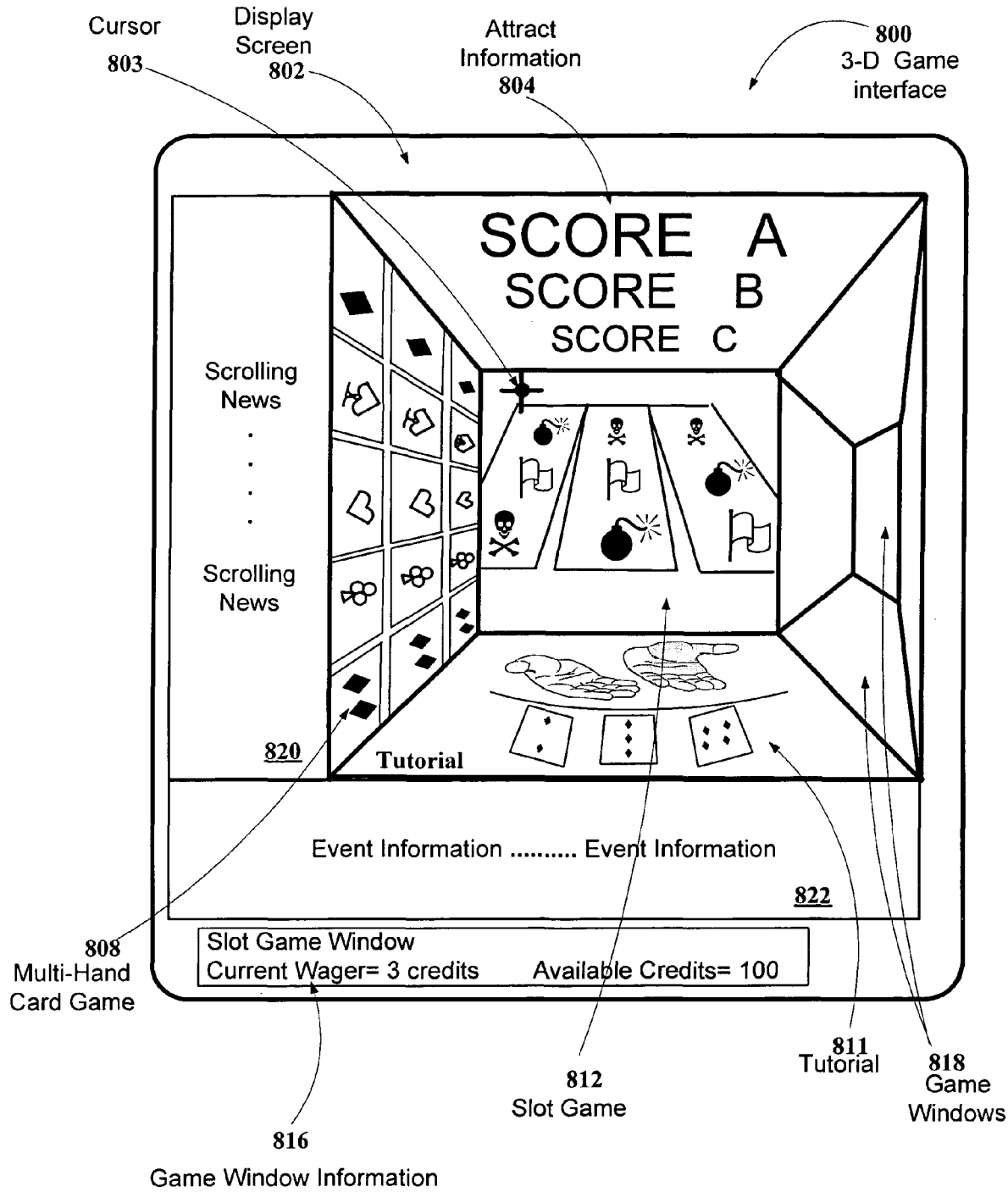

The present invention is not limited to windows arranged in an essentially planar manner on the display screen, i.e. rectangular windows arranged side by or over-layered on top of one another. A 3-D interface may be employed where the game windows are arranged in 3-D geometric pattern. In one embodiment, the 3-D interface may be a virtual 3-D gaming environment used to organize gaming information for viewing by a game player. FIGS. 8 and 9 are perspective drawings of a 3-D interface 800 for a gaining machine for one embodiment of the present invention.

In FIG. 8, six 3-D game windows are arranged on a display screen 802. Five of the 3-D game windows, 804, 808, 811, 812 and 814 are arranged in a cubic manner and one game window, 816, is displayed on a surface essentially parallel to the display screen. The cubic arrangement of the windows may be generated by rendering an open box in a 3-D virtual gaming environment. The five sides of the box are each used as a game window. Next, the game information shown in each of the five 3-D game windows are rendered to the 5 sides of the box. Then, a virtual camera positioned directly above the box may be used to render the photograph displayed on the display screen 802. With this approach any of the methods described above with regard to manipulating a virtual camera in a virtual camera in a 3-D gaming environment may be applied to the 3-D interface 800.

In FIG. 8, game window 804 is used to display attract information, game window 814 is used to display a bonus slot reel game, game window 812 is used to display a slot game, game window 808 is used to display a multi-hand card game and game window 811 is used to display a gaming tutorial. The displaying of information in the 3-D interface 800 may involve multiple transformations and rendering in different game environments. For instance, the multi-hand card game may be rendered in a first gaming environment. Then, a virtual camera in the first gaming environment may be used to generate a photograph showing a portion of the multi-hand card game (e.g. 3-D to 2-D transformation). Then, the photograph may be rendered in the game window 808 in the 3-D interface virtual environment (2-D to 2-D transformation). Next, a virtual camera in the 3-D interface environment may be used to render a photograph including game window 808 which is displayed on at least one display screen on the gaming machine (3-D to 2-D transformation). Game information may also be directly rendered into game windows in the 3-D interface virtual environment. For instance, the attract information in game window 804 may be directly rendered in the 3-D interface virtual environment.

The information in each of the windows is mapped to a particular side of the cube in the 3-D interface gaming environment. In one embodiment, a user of the 3-D interface may be able manipulate the mapping of the game windows. For example, a user may be able to exchange the position of various game windows such as exchanging the position of windows 811 and window 812 (see FIG. 9). When the game windows are exchanged, the 3-D interface may appear to rotate or move in some manner and other game windows may appear on the display screen while other windows may move off of the display screen. As another example, when the mapping is changed, the game windows may be re-rendered with the game information in each of the windows swapped.

Game window 816 is used to convey game window information about active game windows on the display screen 802. An "active game window" is a game window that may be operated actively by a user of the gaming machine. The user may use an input mechanism on the gaming machine such as a touch screen or mouse with cursor 803 to select a window for activation. In FIG. 8, the active game window is 811 which is being used to present a tutorial for playing a card game. Game 816 indicates that the tutorial is for "Pai gow poker." The user may move a cursor over different game windows in the 3-D game interface to obtain information about each game window. For instance, when the cursor 803 is moved from game window 811 to game window 812, the information in the game information window 816 may change to indicate that game window 812 is a slot game.

In one embodiment, the game windows may contain shared information. For instance, the multi-hand card game window 808 may be a shared game where each of the three card hands is played by a different player and the players are competing against one another. Therefore, the game window 808 may be used to participate in a card game tournament but also engage in other activities while watching the activities occurring in the game tournament. As another example, two players may be able to compete in a game of checkers. In another example, the bonus game 814 window may display a bonus game that is triggered by the activities of multiple players linked together on different gaming machines. Further, the bonus game may be visible to each of the players participating in the bonus game.

The players playing the shared game may be participating via different gaming machines. To share the game, the gaming machines may be linked via a local area network, a wide area network or combinations thereof. A remote gaming device in communication with a group of gaming machines, such as game sharing server or a tournament game server, may also be used to enable game sharing between groups of gaming machines.

Updates of game windows may occur in a simultaneous manner. Thus, while a game player is using a first game window, information in other game windows may be updated. For instance, while the game player is watching the tutorial in game window 811 updates of the multi-hand card game window 808, such as cards being dealt, may be occurring. As another example, a live video feed such as sporting event may be viewed in one of the game windows. As the live video feed is continually updated, the game player may play a game of chance in one of the other game windows.

In another embodiment, the multi-hand card game in the multi-hand card game window 808 may be a multi-hand poker game. The multi-hand poker game may be rendered in a 3-D multi-hand poker hand gaming environment. The number of hands rendered may range from 1 to a very large number of hands (e.g. millions) However, a thousand poker hands may be a practical upper limit. In this game, the player may select the number of hands to be played by betting. The player may select coins (wager amount) per hand and increment the bet until the player reaches the desired number of hands or all the hands available for betting (e.g. the maximum number) have been selected. The maximum number of hands available for betting may be some reasonable limit, such as 1000. The maximum number of hands can be set in the gaming machine such is in the game configuration or paytable configuration.

In one embodiment of the multi-hand poker game generated in a 3-D gaming environment, the player initiates a game and a first hand consisting of five cards is dealt with the types of cards showing (e.g. face card or number card as well as a suit). The remaining hands are dealt showing only card backs. When the player holds a card, the other hands show the same hold cards, When a player unholds, the other hands unhold. When the player selects redraw, the hands all start drawing the new cards from unique decks (with the original hold cards removed from all of them). To display the game, a virtual camera could fly over each of hands as they are being rendered to generate an effect similar to the text at the beginning of star wars (e.g. the hands appear to be scrolling up the screen in "space", shrinking and disappearing into the horizon as the hands move farther away. Once the virtual camera reaches the last hand, it can reset to the main hand i.e., the original dealt hand, which now has its own unique rendered cards. The user could also manually control the camera to review the cards, or start playing again. In addition, the cards could be displayed in multiple game windows of the 3-D interface 800.

In FIG. 9, another embodiment of the 3-D interface 800 is shown. The cubic arrangement of the windows has been reduced in size in the display screen 802 as compared to FIG. 8. An important advantage of the present invention is the ability to scale objects (either larger or smaller) and then render objects in the virtual gaming environment with proper perspective. When 2-D objects are scaled by any significant amount, the scaling can distort the rendered objects reducing the quality of any graphics presentation using the scaled 2-D object.

On the display screen 802 in FIG. 9, the mapping of the game windows has been changed as compared to FIG. 8. The tutorial game window 811 has been exchanged with the slot game window 812. The slot game window has become the "active" window as indicated by the cursor 803. The game information window indicates that the player has wagered 3 credits on the slot game shown in the slot game window 812 and has 100 credits available for game play.

The bonus game window 814 in FIG. 8 has been replaced with 5 additional game windows 818 arranged in a cubic pattern. These game windows may be selected by a user and rotated into view to replace game windows 804, 808, 811 and 812. The present invention is not limited to the arrangement of game windows as shown in FIGS. 8 and 9 which are presented for illustrative purposes only. A 3-D game interface environment may be generated that uses nearly an unlimited variety of game window arrangements. For example, the game windows may be arranged on any combination of different polyhedron surfaces. Some game windows may be rendered on curved game surfaces and the colors of different game windows may vary to aid a user in identifying various features of the 3-D game interface. For instance, the active game window may be displayed with a green border.

Two additional game windows, 820 and 822 around game windows, 804, 806, 808, 811, 812 and 818. Game window 820 displays scrolling news while game window 822 displays casino event information. Game windows 820 and 822 may be used to display button menus, game service menus, entertainment content and any other type of information that may be displayed in any other game window. In one embodiment, game windows 820 and 822 may be displayed and then removed. When the game windows, 820 and 822, are removed the other game windows in the screen may be enlarged to fill the space occupied by game windows 820 and 822. The shrinking and enlarging of the windows may be initiated by a player playing the game or may be triggered by game events occurring during game play on the gaming machine.

Figure 10:
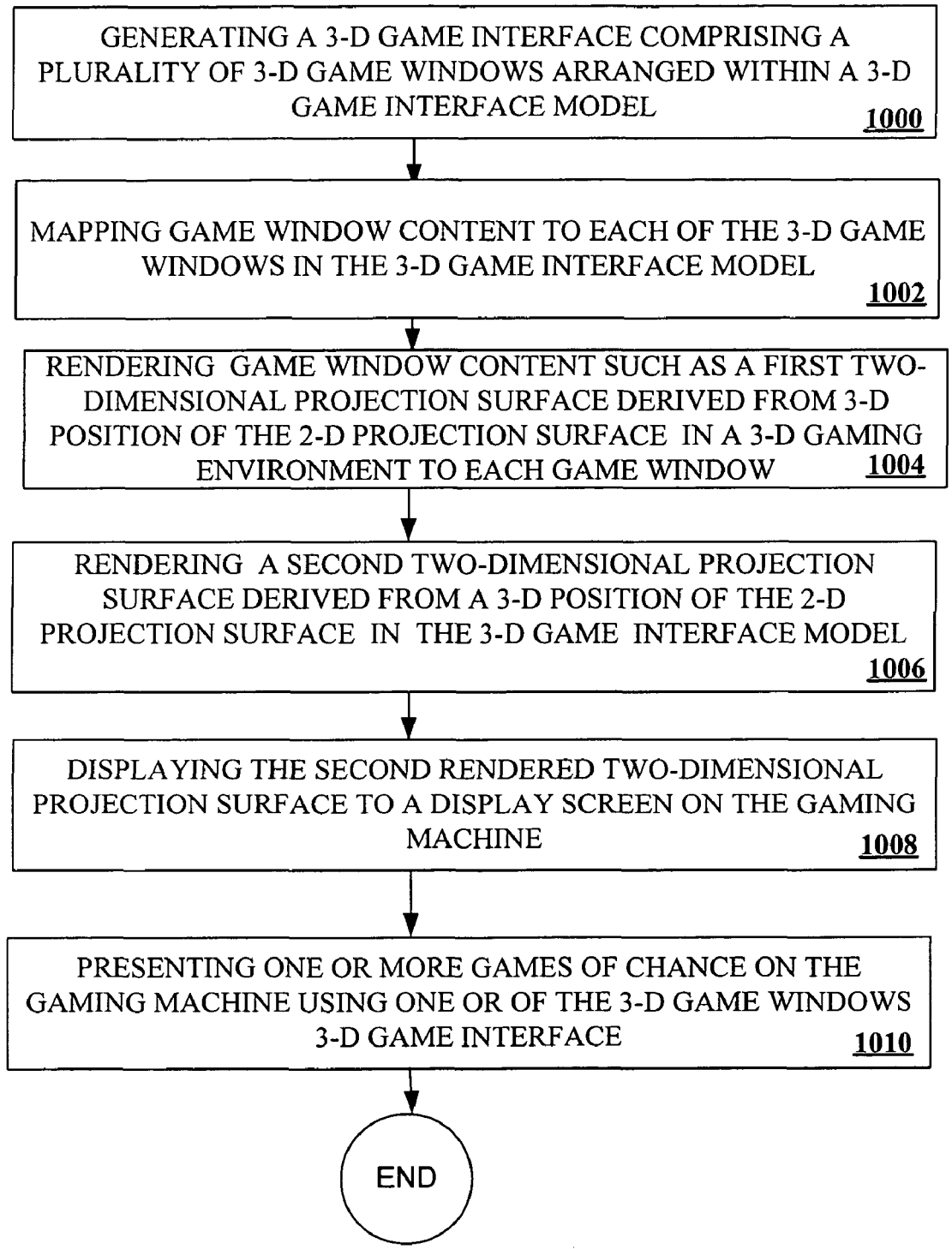
FIG. 10 is a flow chart depicting a method of playing a game on a gaming machine using a 3-D interface.

FIG. 10 is a flow chart depicting a method of playing a game on a gaming machine using a 3-D interface. In 1000, a 3-D game interface is generated. The 3-D game interface comprises a plurality of game windows arranged within a 3-D game interface model or environment as described with respect to FIGS. 8 and 9. In 1002, game window content is mapped to each of the 3-D game windows in the 3-D game interface model. The game window content may be a game of chance, bonus game, entertainment content as previously described, or even a blank window. The game window content map may be used to allow the contents in each of the game windows to be redistributed in different game windows to create a new game window content map. For example, as described above, the content in two game windows may be swapped.

In 1004, the game window content in each game window is rendered to the game window. In one embodiment, a first two-dimensional projection surface (e.g., an image from a virtual camera) derived from a 3-D coordinates of a first surface in a 3-D gaming environment may be rendered to one or more of the game windows in 3-D game interface model. In 1006, a virtual camera in the 3-D game interface model may be used to render a second two-dimensional projection surface derived from a 3-D coordinates of a second surface in the 3-D game interface model. In 1006, the rendered second two-dimensional projection surface may be displayed to at least one display screen on the gaming machine. In 1010, one or more games of chance may be presented on the gaming machine using one or more of the 3-D game windows in the 3-D game interfaces. As previously described, multiple games of chance presented in multiple game windows may be played in a sequential or parallel manner.

Figure 11:
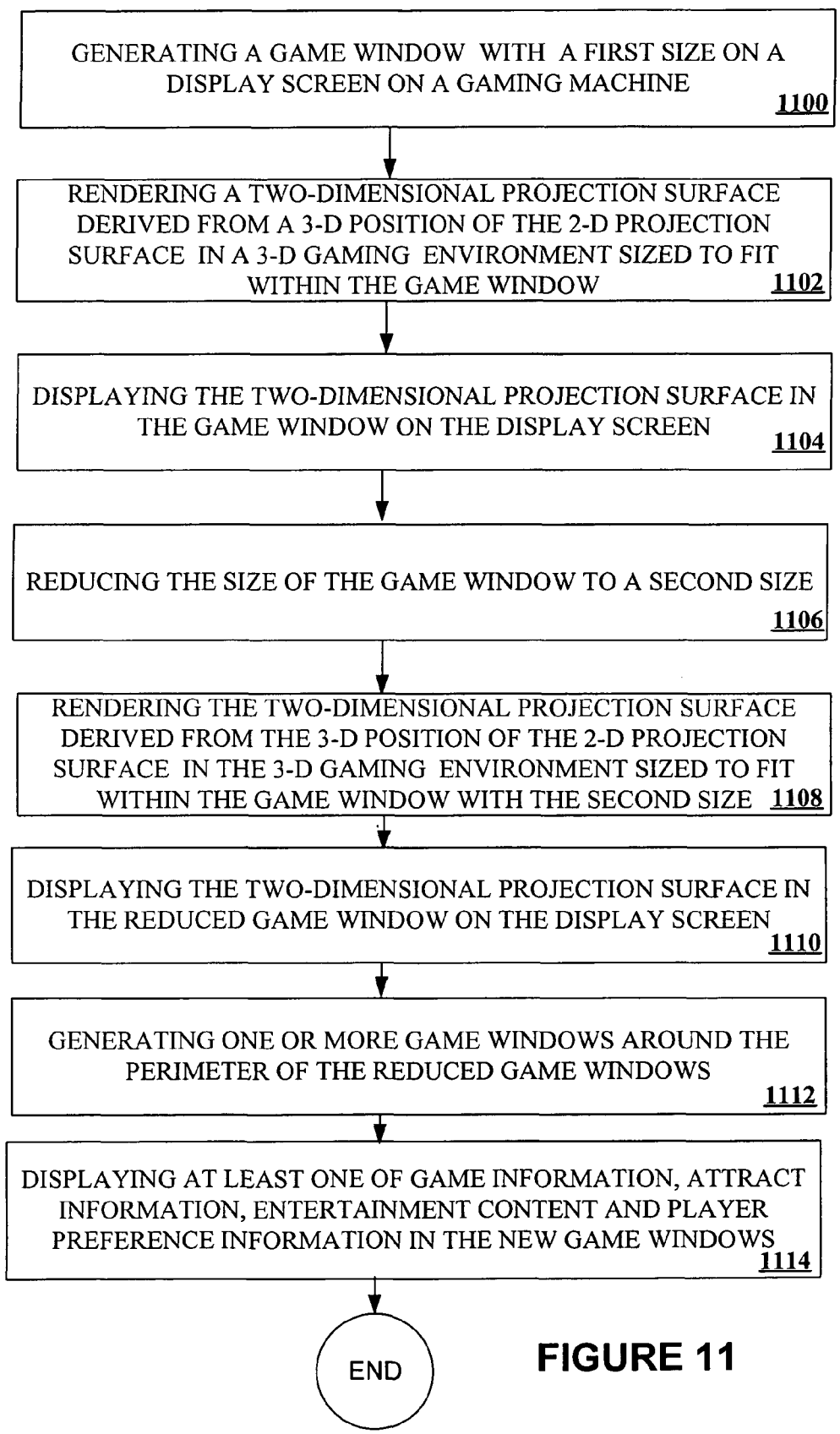
FIG. 11 is a flow chart depicting a method of displaying game information on a gaming machine.

FIG. 11 is a flow chart depicting a method of displaying game information on a gaming machine. In 1100, a first game window with a first size is generated on a display screen on the gaming machine. The first game window may be part of a 3-D game interface comprising multiple game windows as described with respect to FIGS. 8, 9 and 10. In 1102, a first two dimensional projection surface derived from 3-D coordinates a surface in a 3-D gaming environment (e.g., an image from a virtual camera in the 3-D gaming environment), is rendered to fit within the size of the first game window. In 1104, the rendered first two-dimensional projection surface is displayed in the first game window on the display screen.

In 1106, the first game window is reduced to a second size. In 1108, the same game window content is rendered to fit within the reduced first game window. The game window content of the first game window may be held constant during a game window size transition but may be later varied after the transition of the game window to the new size. Therefore, a second projection surface derived from the same 3-D coordinates of the surface in the 3-D gaming environment as in 1102 is rendered accounting for the new window size. In 1111, the second two-dimensional projection surface is displayed in the reduced first game window on the gaming machine.

To account for a change in game window size, the rendering may involve adjusting the parameters of a transformation performed by a virtual camera in the 3-D gaming environment to produce a "photograph" that fits in the window. This transformation may be performed while the 3-D coordinates of a captured surface in the 3-D gaming environment remain constant. In addition, the transition between the first game window size and the second game window size may be gradual. Thus, the first game window may be rendered in a series of sizes going from the first size to the second size where the 3-D coordinates of the captured surface in the 3-D gaming environment remain constant but the "photograph" from the virtual camera is rendered to fit in each of the window sizes generated during the transisition. The method is not limited to reducing the size of game windows and may also be applied to increasing the size of game windows.

In 1112, one or more new game windows may be generated in the display space created by the reduction in size of the first game window. In 1114, information such as but not limited to game information, attract information, entertainment content, player preference information and gaming machine operational information may be displayed in the new game windows. In one embodiment, the new game windows may be removed and the first game window may be returned to its original size.

An input location on a display screen of a gaming machine is often an important parameter for operating a gaming machine. The input location on the display screen may be used to determine whether an input button modeled on the display screen has been activated. The input location on a display screen may be determined from a cursor location on the display screen or an input to a touch screen on top of the display screen. The cursor may be moved by a mouse, touch pad or joystick on the gaming machine. Then, an input location of the cursor may be specified by using an input mechanism on the gaming machine. For instance, a user may hit an "enter button" on a mouse or a joy-stick.

In traditional gaming machines, the position of input buttons or input surfaces modeled on a display screen on the gaming machine are fixed. As described above, input buttons that may be used with a touch screen or a screen cursor and screen cursor controller may be modeled in a 3-D gaming environment. In the present invention, the position of these buttons on the display screen may vary as a function of time. For instance, the position of an input button or input surface modeled in a 3-D gaming environment may change on the display screen when a position of a virtual camera in the 3-D gaming environment is changed or an object in the 3-D gaming environment is moved. The position of the input buttons may change as a result of user input into the gaming machines or some other game event. For instance, the position of the button on the display screen may be change or an area occupied by the input button on the display screen may change as a view of the input button is changed. Thus, methods are needed to account for a change of position or size of an input button modeled on the display screen to determine when an input button has been activated. A few methods of accounting for input buttons with variable positions and sizes are described as follows with respect to FIGS. 12A-12F and FIGS. 13.

Figure 12A:
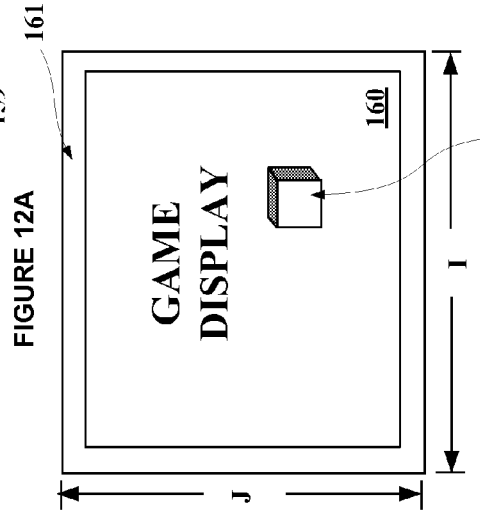
FIGS. 12A-12F are perspective drawings of screen input interfaces modeled in a 3-D gaming environment on a gaming machine.
Figure 12B:
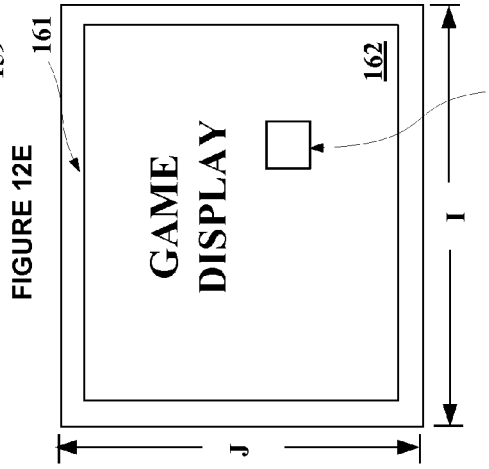

FIGS. 12A-12F are perspective drawings of screen input interfaces modeled in a 3-D gaming environment on a gaming machine. In FIG. 12A, a game display 158 is on a surface 156 comprising a plurality of elements 152 modeled in a 3-D gaming environment with coordinate system 150. A 3-D dimensional input button 159 is also modeled in the game display 158. A virtual camera 154 is positioned in the game environment and used to render a photograph of the game display 158 with the input button 159. In FIG. 12B, the rendered photograph 160 is displayed in game window 161 which may be displayed on a portion of a display screen on a gaming machine. The game window 161 has dimensions I by J which may correspond to a pixel length and a pixel width on the gaming machine. The game window 161 may be divided up into a 2-D grid of pixel locations. The input button 159 occupies a certain number of pixels on the game window 161.

Figure 12D:
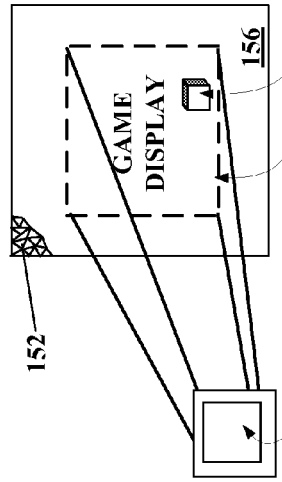
Figure 12C:
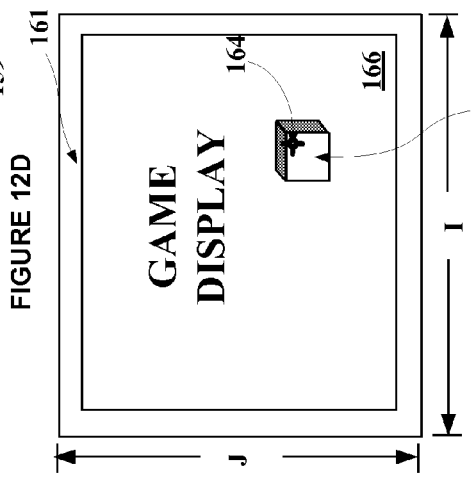

In FIG. 12C, a screen input is detected at the screen location specified by the cross hairs 164. The screen input may be generated by a touch screen or some other input device on the gaming machine. In one embodiment of the present invention, the 2-D coordinates of the screen location and knowledge of the transformation used to render the 2-D view from the 3-D virtual gaming environment on the display screen may be used to generate a line in the 3-D gaming environment.

In FIG. 12D, an "input line" 165 is generated in the 3-D gaming environment from the 2-D coordinates of the screen location at 164 and a transformation used to render the 2-D view 166 in the game window 161 in FIG. 12C. The coordinates of the "input line" are checked to determine whether the input line intersects with an input button modeled in the 3-D gaming environment. In FIG. 12D, the line 165 intersects with input button 159. When the "collision" is detected, the gaming machine may determine whether the input button is "active." When the input button is active, the gaming machine may implement a gaming event specified by the input button. For instance, the gaming event may be to initiate a game on the gaming machine. When the input button is not active, the gaming machine may ignore the collision. When a non-rectangular coordinate system is used to model the 3-D gaming environment, the input line may not be straight and may be a curved line. Often the input line is referred to a as a ray and determining whether a collision has occurred is referred to as casting a ray.

Figure 12E:
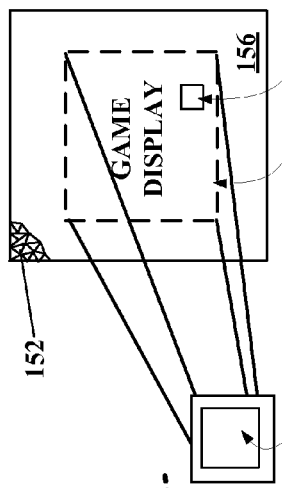
Figure 12F:
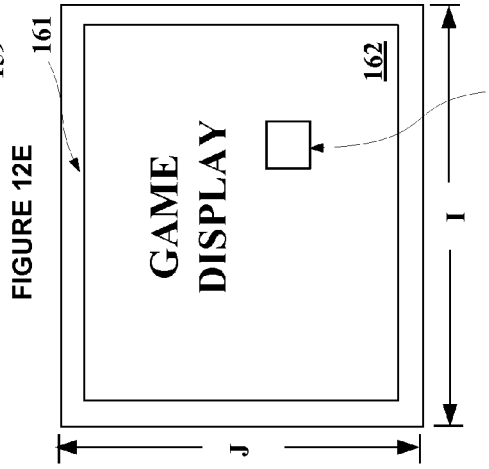

After a collision has been detected on an "active" input button, the input button may be animated in some manner. For instance, the input button may be shown sinking into a surface from which it protrudes as if it were physically depressed. In FIG. 12E, the input button 159 is shown in a depressed position in the 3-D gaming environment. In FIG. 12F, the depressed button is rendered in a photograph 162 shown in the game window 161.

Figure 13:
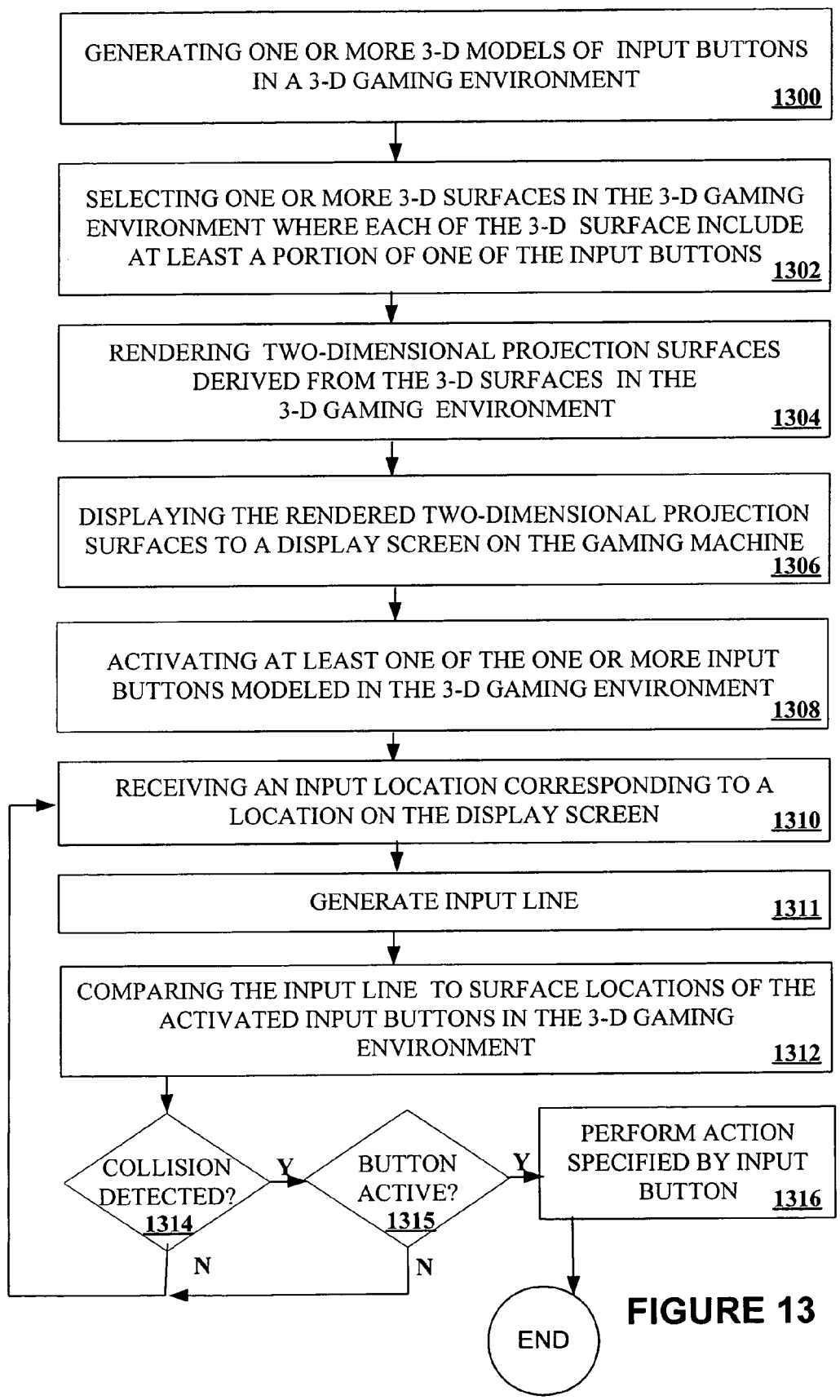
FIG. 13 is a flow chart depicting a method of detecting input button collisions for input buttons modeled in a 3-D gaming environment on a gaming machine.

FIG. 13 is a flow chart depicting a method of detecting input button collisions for input buttons modeled in a 3-D gaming environment on a gaming machine. In 1300, one or more 3-D models of input buttons are generated in a 3-D gaming environment. In 1302, a 3-D surface in the 3-D gaming environment is selected that includes at least portion of one or more input buttons modeled in the 3-D gaming environment. In 1304, a two-dimensional projection surface is rendered from the selected 3-D surface in the gaming environment. As noted above, the 3-D surface may be considered a 3-D object and a 2-D projection surface may be considered a 2-D image. In 1306, the rendered two-dimensional projection surface is displayed to at least one display surface on a gaming machine.

In 1308, at least one or the one or more input buttons modeled in the 3-D gaming environment are activated. In 1310, an input location corresponding to a 2-D coordinate on a display screen is received. In 1311, an input line is generated in the 3-D gaming environment based on the coordinate transformation used to render the two-dimensional projection surface in 1304. In 1312, the input line is compared to 3-D surface locations in the 3-D gaming environment.

In 1314, when a collision between the input line and an input buttons in the 3-D gaming environment are not detected, the screen input is ignored by the gaming machine. In 1315, when a collision between the input line and an input button has been detected, the gaming machine determines whether the input button is active. When the input button is not active, the screen input is ignored by the gaming machine. In 1316, when the input button is active, the gaming machine may execute the action specified by the input button. For instance, a game of chance may be initiated on the gaming machine.

Game player interaction with objects in a 3-D gaming environment implemented according to the invention may be facilitated with considerable realism, thereby enhancing the player's experience. When a player selects an object in a 3-D gaming environment, the object may be rendered and sound effects played to create the impression that the object has actually been touched. The affected objects may rotate, flip, scale, change colors, and disappear in response to a player's "touch." For example, when a game player selects a button or an icon, the object can be rendered such that it appears to have been pressed into the screen and then released. Sound effects corresponding to the action can also be provided to make the experience more realistic. In another example, the player may select a wheel (e.g., a roulette wheel) causing it to spin.

According to various embodiments of the invention, objects may also be rendered in a 3-D gaming environment to create the impression that the game player is actually picking the objects up and moving them around. In some cases, such objects may be constantly visible within the environment. In others, such as games where the player must find and collect objects, some navigation may be required. The objects can be rendered to simulate physical characteristics (e.g., elasticity or rigidity). Characteristics of the environment may also be provided to create realistic visual effects, e.g., fog, smoke, fire, water, gravity, etc.

The sound effects provided in the 3-D gaming environments of the invention may also improve the realism of the experience in a number of ways. For example, the sound corresponding to a particular action may be manipulated to simulate different points of origin. Thus, the manipulation of an object on the left hand side of the screen could be accompanied by a sound effect which gives the impression that the sound is originating from a point to the left of the game player. Similarly, the sound corresponding to an object on the distant horizon may be generated to simulate a distant point of origin, i.e., it sounds far away. Sound effects may also be delivered to create a sense of motion. Other natural sound properties (e.g., the Doppler effect) can also be employed to provide enhanced realism.

As discussed above, allowing the game player to control the perspective of the virtual camera and thereby navigate within the 3-D gaming environment offers many advantages with respect to making the gaming experience more interesting. However, unlimited navigation within a 3-D gaming environment may not necessarily be desirable in all cases. That is, if the degrees of freedom with which the game player may alter the virtual camera position and perspective have no limits except the outer boundaries of the 3-D environment, the game player may end up spending too much time in portions of the environment which are uninteresting or irrelevant to game play. This, in turn, could have an adverse impact on the player's experience as well as game throughput. In addition, allowing too many degrees of freedom may make navigation through the environment difficult to learn, thus discouraging many players from using such gaming machines.

Therefore, according to various specific embodiments of the invention, the degrees of freedom with which the game player may navigate in a 3-D gaming environment are constrained to strike a balance between enhancement of the player's experience and game throughput. Various ones of these embodiments will now be described with reference to some of the previous and the remaining figures. It should be noted that the following descriptions will not discuss many of the details of the rendering of the 3-D gaming environment on a 2-D display in order to avoid obscuring the more important features of the invention. It will be understood, however, that these renderings may be achieved as described herein above.

As discussed above with reference to FIG. 4, an example of a 3-D gaming environment which may be presented on the display of a gaming machine is a virtual casino. Also as discussed above, navigation through the virtual casino may be facilitated by changing the viewpoint(s) of one or more virtual cameras within the environment. However, if the virtual casino is a representation of the actual casino in which the actual gaming machine is located, it may be desirable to put some limits on the degrees of freedom with which the game player may manipulate a particular virtual camera. That is, an actual casino may be a large and complex facility with a wide variety of services. Allowing the game player to navigate throughout the virtual equivalent of the facility without constraints would likely result in the inefficient acquisition of the available services and a corresponding slow down in game play. This could be cause for frustration on the game player's part and is obviously undesirable from the gaming establishment's point of view.

Therefore, according to a specific embodiment of the invention, the degrees of freedom with which the game player is allowed to navigate in the virtual casino are constrained. As will be understood, this may be accomplished in a variety of ways which may depend, for example, on the particular coordinate space in which the 3-D environment is implemented, the current context of the environment or game being played, or a variety of other factors. In the following example, a 3-D Cartesian coordinate space is employed. However, it will be understood that other coordinate space types, e.g., polar or spherical, may be employed.

Figure 14:
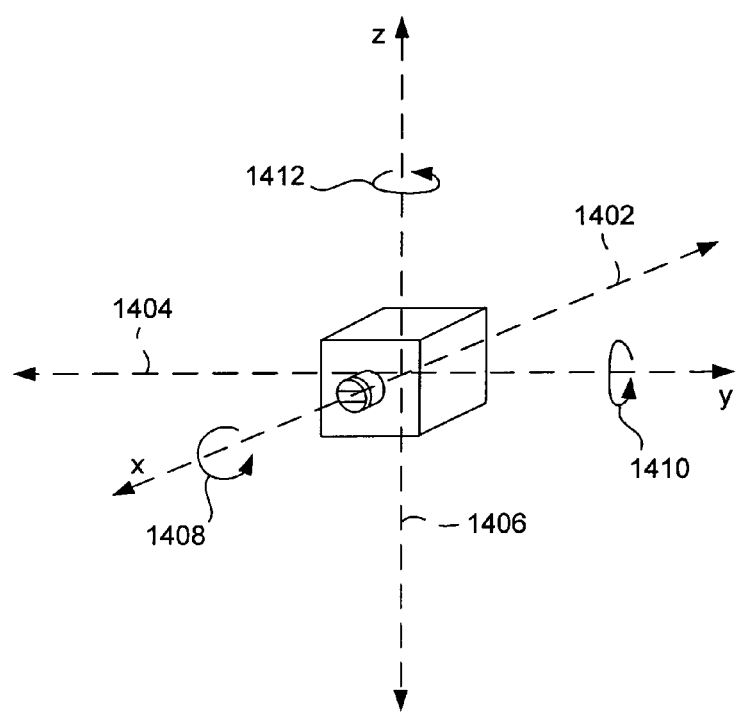
FIG. 14 is a diagram for illustrating degrees of freedom associated with an exemplary 3-D virtual space.

FIG. 14 illustrates various degrees of freedom which are associated with a virtual camera in a 3-D coordinate space 1400. X-axis 1402 is associated with forward and backward movement in the environment; y-axis 1404 with left and right; and z-axis 1406 with up and down. In addition, each axis has a rotational degree of freedom associated therewith, roll 1408, pitch 1410, and yaw 1412, respectively. Zooming in and out can be thought of as an additional degree of freedom or merely as a subset of the motion along the x-axis. It will be understood that the degrees of freedom with a different type of coordinate system, e.g., polar or spherical, will be different but are still within the scope of the invention.

According to various embodiments, examples of which will be described below, navigation within a 3-D gaming environment may be constrained by restricting or inhibiting any subset of the degrees of freedom associated with the particular coordinate space in which the environment is implemented. For example, when navigating through a virtual casino environment, the roll degree of freedom may be completely inhibited because it is not particularly useful to simulate the movement of a human through such an environment. On the other hand, the roll degree of freedom may be extremely important in another context such as, for example, a flight simulator.

Another example relates to the pitch degree of freedom. In the virtual casino, some level of rotation around the y-axis may be desirable to allow the game player to look up and down. To simulate the movement of a human the limits placed on this degree of freedom might be 90 degrees up and 90 degrees down, allowing the game player to look straight up "overhead" and down at one's "feet." On the other hand, tighter constraints, e.g., 45 degrees up and down, might be more suitable. By contrast, the context of the flight simulator would likely demand full mobility in this degree of freedom.

According to some embodiments, the manner in which the degrees of freedom are constrained may change according to the context in which the game player is located. For example, if there is nothing "of interest" to either side in a hallway in a virtual casino, the yaw and/or right/left degrees of freedom may be inhibited in some manner to keep the game player moving in a desired direction. What is "of interest" may be decided in advance by the provider of the gaming machine to encourage certain behaviors by the game player.

In another example, the degrees of freedom may be constrained in a particular way when the game player has selected and begun to play a game of chance. That is, the game player may have been subject to one set of constraints while navigating through a virtual casino, but once he has selected a game to play, a different set of constraints which are more suitable for facilitating game play may be used. Such a set of constraints might, for example, only allow movement which keeps the game being played on the display. As will be understood with reference to the examples described herein, the particular set of constraints which are suitable for a given context may be determined with reference to that context as well as a variety of other factors which include the business goals of the gaming machine provider.

In addition to limiting navigational degrees of freedom, embodiments of the invention also place limits on the extent to which the game player may modify the environment or manipulate objects in the environment. For example, the game player may only be allowed to "pick up," e.g., with a virtual reality glove, certain objects which relate to a game being played. In another example, the game player may be allowed to alter or interact with only certain objects, e.g., targets in a shooting gallery game.

Examples of how degrees of freedom and player actions may be constrained according to some exemplary embodiments of the invention will now be discussed with reference to a plurality of exemplary 3-D gaming environments. It will be understood, however, that the present invention is not limited to the examples discussed.

Figure 15:
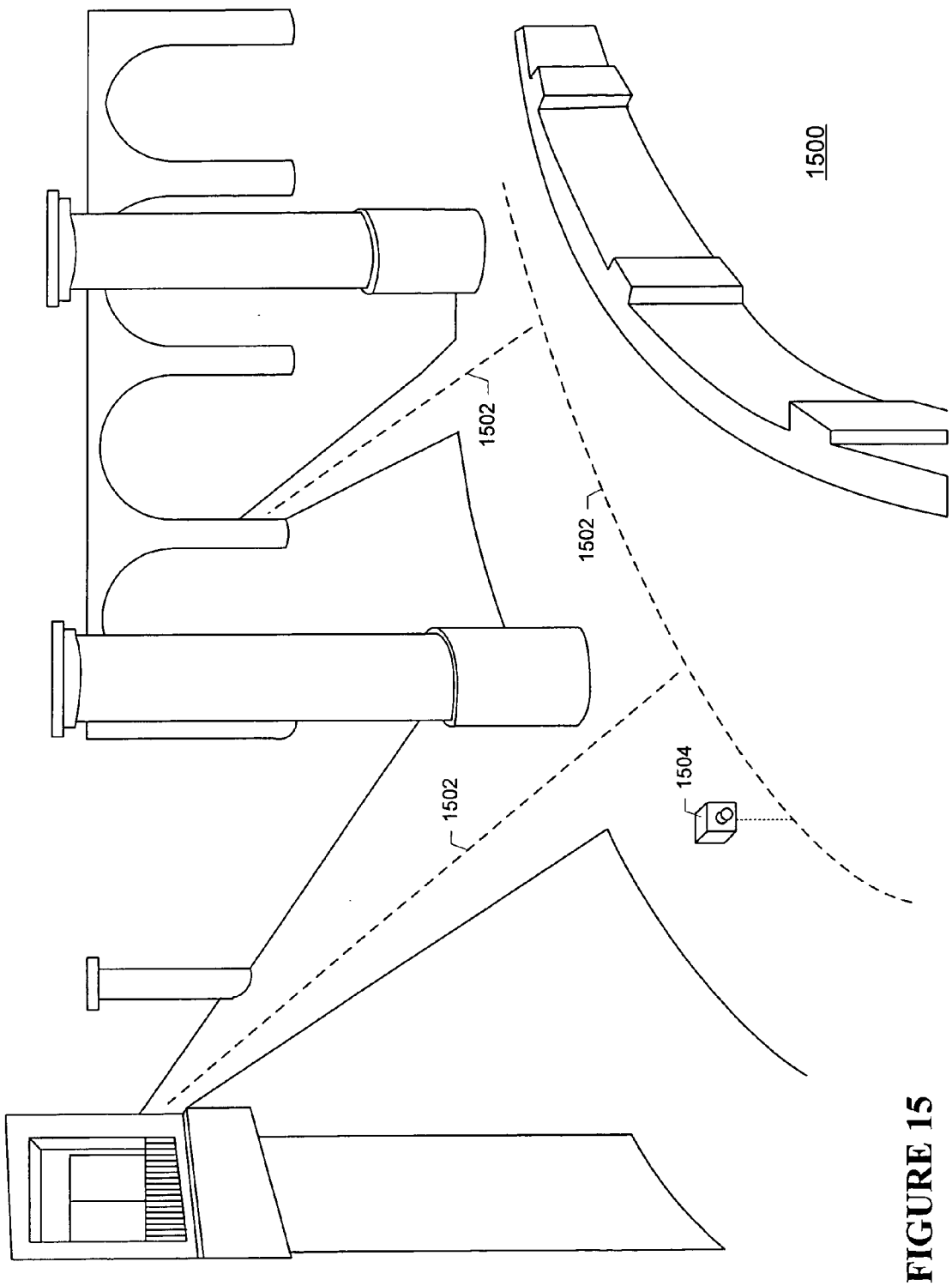
FIG. 15 is a drawing of a 3-D gaming environment emulating a virtual casino according to a specific embodiment of the invention.

Referring back to the example of the virtual casino (e.g., casino 400 of FIG. 4), one way in which navigation within the virtual casino may be constrained is to limit the positions which may be occupied by the virtual camera within the environment. That is, the degrees of freedom may be constrained such that the game player may only follow a predetermined path or set of paths in the casino. An example of such a set of paths is shown in the simplified virtual casino environment 1500 of FIG. 15.

Paths 1502 limit the positions to which the game player may move within the casino (as represented by virtual camera 1504) and may be set up by the gaming machine provider to encourage any number of desirable behaviors by the game player. For example, the paths may be configured to allow the game player to access specific services or games being promoted by the real casino. In addition, the services or games made available to the game player may be selected with reference to the player tracking information associated with the player. For example, a frequent visitor to the casino may have access to "restricted" areas within the 3-D gaming environment in which special services or games may be enjoyed by the casino's best customers.

Other degrees of freedom may also be limited in some way according to various implementations. For example, as discussed above, the extent to which the game player may rotate the point of view about the z-axis may be limited such that only certain directions of navigation within the 3-D environment are apparent. Similarly, virtual "gravity" may be simulated by limiting the "height" of the virtual camera to a fixed distance from the virtual floor of the casino. As will be understood, there are myriad ways in which navigation in such an environment may be constrained to effect the goals of the invention. In general, therefore, any limitation of one or more degrees of freedom within a 3-D gaming environment is within the scope of the invention.

Figure 16:
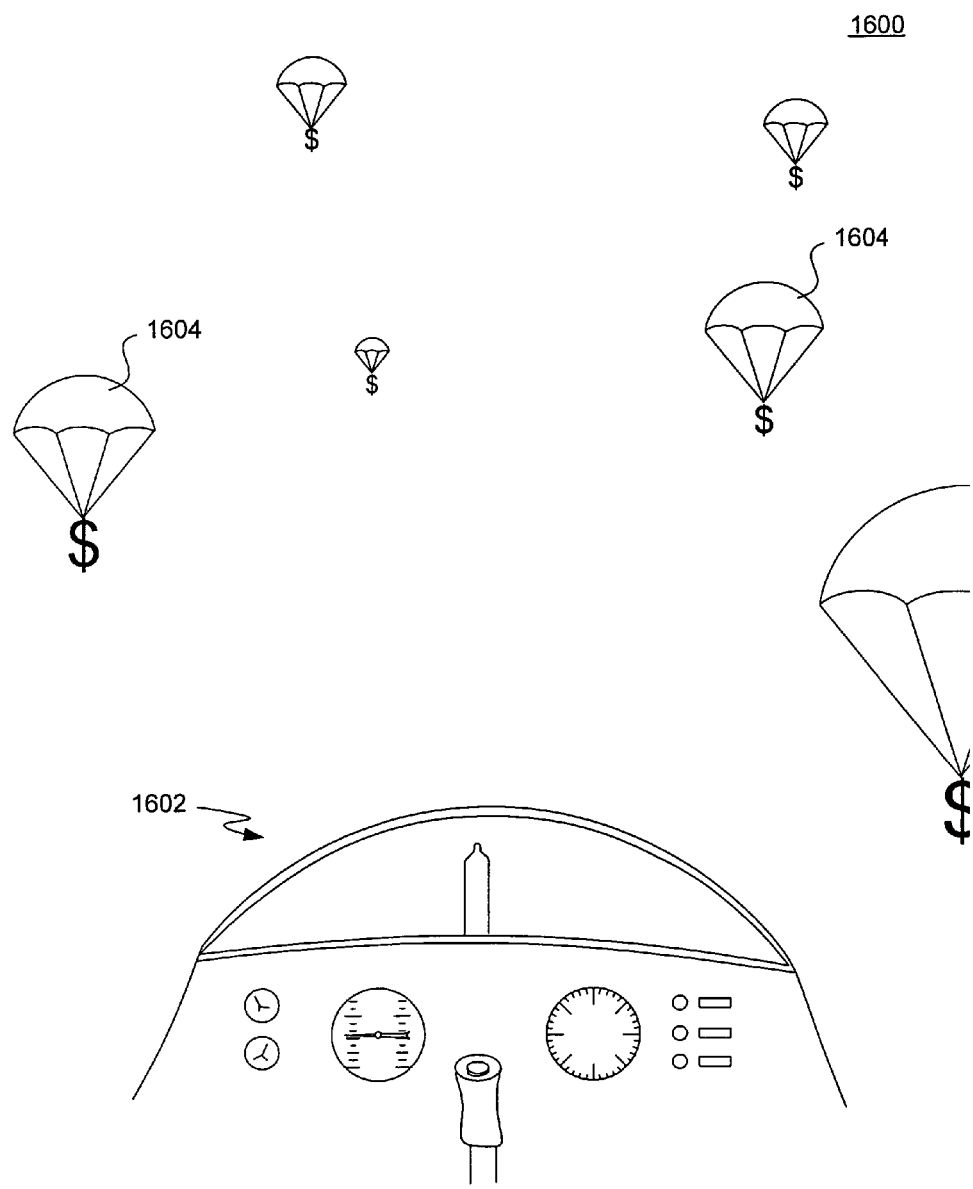
FIG. 16 is an illustration of another 3-D gaming environment according to another embodiment of the invention.

Another exemplary 3-D environment in which embodiments of the invention may be illustrated is shown in FIG. 16. In the interactive bonusing game depicted, an airplane 1602 may be guided by the game player within the 3-D air space 1600 to target and shoot various bonusing options represented by parachutes 1604. in such an embodiment, it might be useful to allow the game player to change the point of view, i.e., the virtual camera position, only in limited ways to achieve the desired level of player success.

For example, forward movement through the parachutes (i.e., along the x-axis) could be at a fixed speed or between some fixed minimum and maximum speeds. In addition, if all of the parachutes are at the same "altitude," vertical movement (i.e., along the z-axis) could be inhibited. And unlike a flight simulator in which the rotational degrees of freedom are typically desirable, roll and pitch may not be desirable in this context and could therefore be restricted. On the other hand, some degree of yaw (i.e., rotation around the z-axis) might be useful for targeting objects to the left or right.

Regardless of the manner in which degrees of freedom or player actions are constrained according to the various embodiments of the present invention, there are a wide variety of technologies by which a game player may interact with the 3-D gaming environments described herein which are within the scope of the invention. For example, a conventional personal computer input device such as, for example, a keypad or keyboard, a joystick, a mouse, a trackball, or a touchpad may be employed. Simple video game controls (e.g., buttons, steering wheels, joysticks) may also be used. Alternatively, more sophisticated game controllers similar to those for use with current video game systems may be employed.

The interface and control devices which may be employed to facilitate game player interaction with the 3-D gaming environments of the present invention may generate simple on/off signals (e.g., a button) to facilitate the interaction. Alternatively, they may generate a range of outputs (e.g., a pressure sensitive device) which may be employed to exercise a greater degree of precision over the action being directed by the player. Such devices may also be implemented using a wide range of mechanical, electronic, optical, thermal, and inertial elements, and any combination thereof.

Touchscreen technology may also be employed in a variety of ways. That is, virtual objects may be presented on the display which, when activated by the player touching the screen, facilitates interaction with and manipulation of the 3-D environment. For example, the game player may change his perspective within the 3-D environment by simply pointing to a location in the 3-D environment and thereby causing the virtual camera to move to that position.

Alternatively, the objects which the game player selects via a touchscreen may represent controls of some type which relate to the degrees of freedom with which the player is allowed to navigate. For example, arrows may be presented at the edges of the display or window which, when selected, cause the virtual camera to rotate or move in the indicated direction. Alternatively, slide bars or wheels may be presented which are operated by the player sliding his finger or a pointing device of some kind across the surface of the display to cause some result. For example, a slide bar may be employed to control camera zooming, the speed and/or direction of movement through the virtual space, the movement or rotation of objects in the virtual space, or audio or video settings.

Still more sophisticated interface technologies may be employed with the present invention. For example, there is a class of interface systems which translate inertial signals from a game player's motion into electronic signals which guide corresponding actions on a display. Such technologies come in the form of virtual reality helmets, gloves, and even body suits which effect the translation. Other virtual reality interface systems which may be used with embodiments of the present invention employ electromechanical systems to translate inertial and other information into the virtual domain. For example, the game player may interact with devices which resemble a wide variety of recreational equipment (e.g., skis, snowboards, skateboards, etc.), or a wide variety of vehicles (e.g., cars, trucks, motorcycles, watercraft, etc.) to generate the kinds of input signals which may be used with various embodiments of the invention.

Voice recognitions systems are yet another category of sophisticated interface technology which may be employed with specific embodiments of the invention. And the list could go on. Generally speaking, any interface technology by which a human may interact with a 3-D virtual space is included within the scope of the invention.

The 3-D gaming environments and the techniques for facilitating interaction therewith provided by the present invention may be used to great advantage with regard to facilitating the simultaneous play of multiple games of chance. Conventional gaming machine display techniques place limits on the number of game outcomes which can be simultaneously displayed and on the manner in which the outcomes are arranged. At present, for example, multi-hand poker on a 2-D display is typically limited to about 100 hands due to the resolution of the screen and the player's ability to recognize the numbers and suits on the cards.

By contrast, the 3-D gaming environments and the navigation and interaction techniques of the present invention enable game outcomes to be arranged in a variety of configurations, and reviewed from a variety of perspectives. As will be described, in some cases, this facilitates the simultaneous play and or viewing of many more games of chance than is currently possible with conventional techniques. It should be noted that the following description assumes that any of the user interface techniques described above may be employed to interact with the 3-D gaming environment. Therefore, the nature of the navigation or manipulation capabilities are described with reference to the results within the 3-D gaming environment without referring to the actions of the player.

Figure 17:
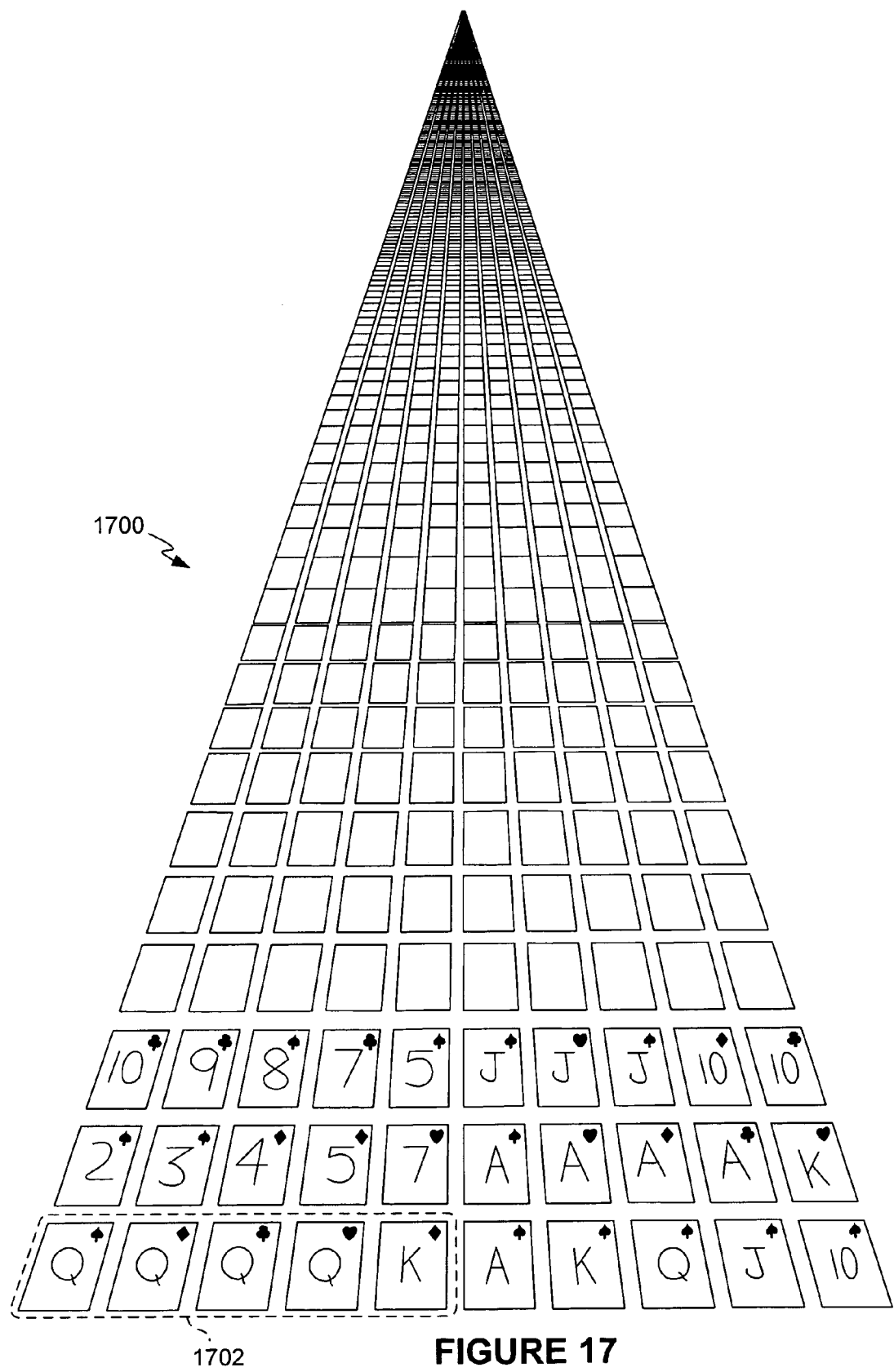
FIG. 17 is an illustration of a 3-D gaming environment in which a plurality of game outcomes are presented according to a specific embodiment of the invention.

FIG. 17 shows an exemplary arrangement of game outcomes according to a specific embodiment of the invention. In this embodiment, multi-hand poker outcomes 1702 are arranged in a two-dimensional array 1700 which recedes toward a point at the back of the 3-D gaming environment. When the "distance" between the viewpoint and a particular outcome is beyond a certain threshold, the details of the outcome will not typically be discernible by the game player. However, because the game player is able to change the viewpoint (i.e., navigate in the 3-D environment by moving the virtual camera position), any outcome in the array may be inspected from a variety of perspectives.

And because the game player is able to navigate in this way, the details of all of the outcomes need not be simultaneously presented on the display. This eliminates the limit on the number of simultaneous hands which may be played previously imposed by the resolution of the typical display. That is, because of the interactions with the 3-D gaming environment made possible by the present invention, the number of games of chance which may be played simultaneously and the number of outcomes which may be displayed is theoretically limitless. Of course, there are some practical limits. However, the present invention makes it possible to increase the number of simultaneous games of chance, e.g., hands of poker, by one or more orders of magnitude relative to previous gaming machines.

Navigation among the outcomes of FIG. 17 may be facilitated in a variety of ways. For example, the virtual camera viewpoint may "fly" above the array to review any of the outcomes. According to various embodiments, the degrees of freedom associated with the virtual camera may also be constrained in a variety of ways. For example, according to one embodiment, movement of the virtual camera may be restricted to a plane parallel to the plane of the array by allowing movement along the x and y-axes while restricting movement along the z-axis. In addition, full rotation around the z-axis (yaw) may be combined with limited pitch such that the virtual camera may rotate around and look down toward the array of outcomes. Zooming in and out may also be provided.

According to other embodiments, some freedom in the z-axis might be provided. For example, the game player can maneuver the virtual camera to different "heights" to provide different perspectives on the array of outcomes. According to some embodiments, the virtual camera may be allowed to move above and below the array, with the details of the outcome being visible from below (e.g., reverse image of card value and suit). It will be understood that, depending on the goal of the game provider, a variety of constraints may be useful. Thus, any combination of constraints on the various degrees of freedom should be considered to be within the scope of the invention.

It should also be noted that the array of outcomes depicted in FIG. 17 is not the only type of array in which the outcomes may be configured. For example, outcomes may be arranged in 2-D arrays having different shapes and on surfaces other than planar surfaces. Outcomes may also be configured in 3-D arrays having any of a wide variety of shapes. Outcomes may also be deployed on the surface(s) of an object such as a sphere or polyhedron as shown in FIG. 18.

Figure 18:
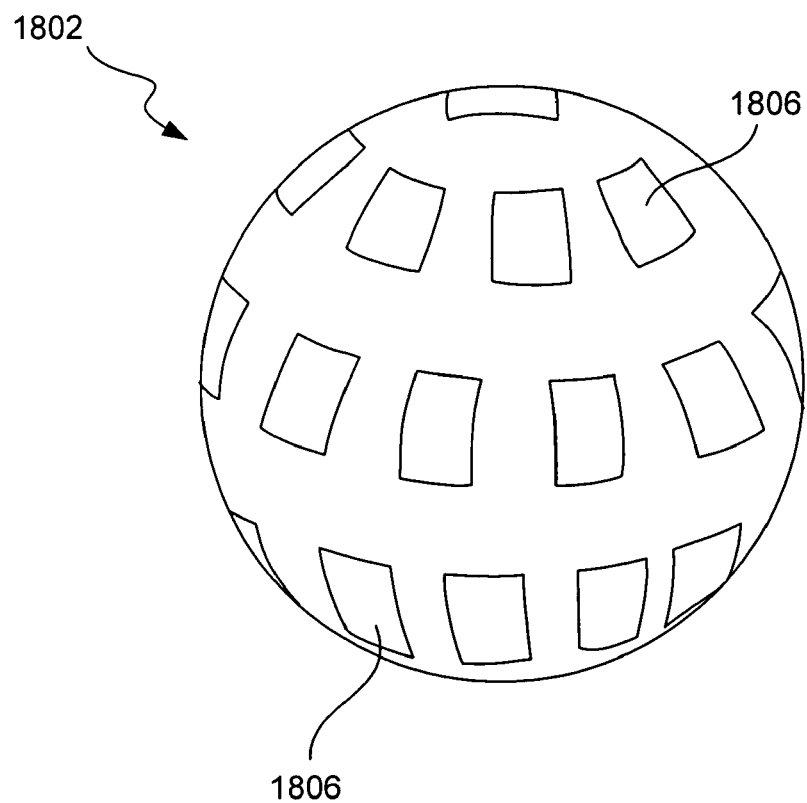
FIG. 18 is an illustration of a 3-D gaming environment in which a plurality of game outcomes are presented according to another specific embodiment of the invention.
Figure 18:
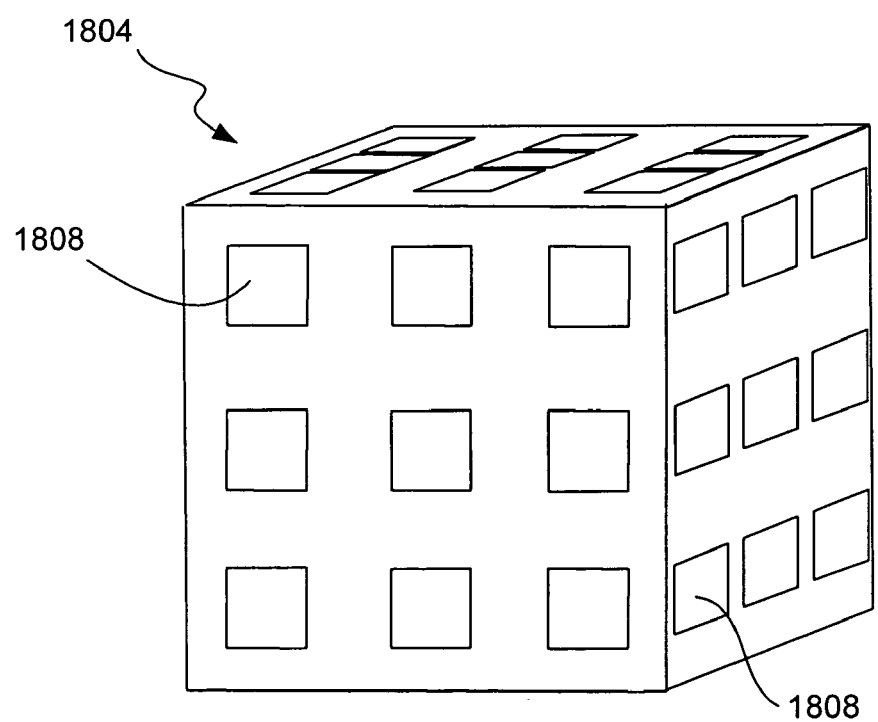

FIG. 18 shows a sphere 1802 and a cube 1804 in a 3-D gaming environment 1800. A plurality of game outcomes 1806 and 1808 are distributed on the outer surfaces of the objects and the virtual camera is located outside the objects. Alternatively, the game outcomes might be deployed on the inner surfaces of such objects with the virtual camera viewpoint being inside the objects. In either case, viewing of the various outcomes may be accomplished by facilitating movement of the virtual camera viewpoint around or inside the objects. Alternatively, the game player may be allowed to manipulate the objects themselves, e.g., turn them around, to view the various outcomes.

Again, the degrees of freedom with which the game player may interact with environment 1800 may be constrained with respect to the arrangement of the outcomes and/or to achieve particular goals, e.g., the efficient viewing of the outcomes. For example, if the outcomes are arranged on the outer surface of a sphere, the virtual camera position could be restricted to a predetermined radius from the center of the sphere with the viewpoint always normal to the surface of the sphere. This would allow the game player to move around the outside surface of the sphere while always viewing some subset of the outcomes from an optimal "distance." It will be understood that this may be accomplished using a spherical coordinate system and holding the position on the radial axis constant.

Alternatively, if the outcomes were arranged on the inner surface of a sphere or polyhedron, the position of the camera may be fixed to the geometric center of the object while allowing some degree of rotation of the camera or the object around one or more axes.

Figure 19:
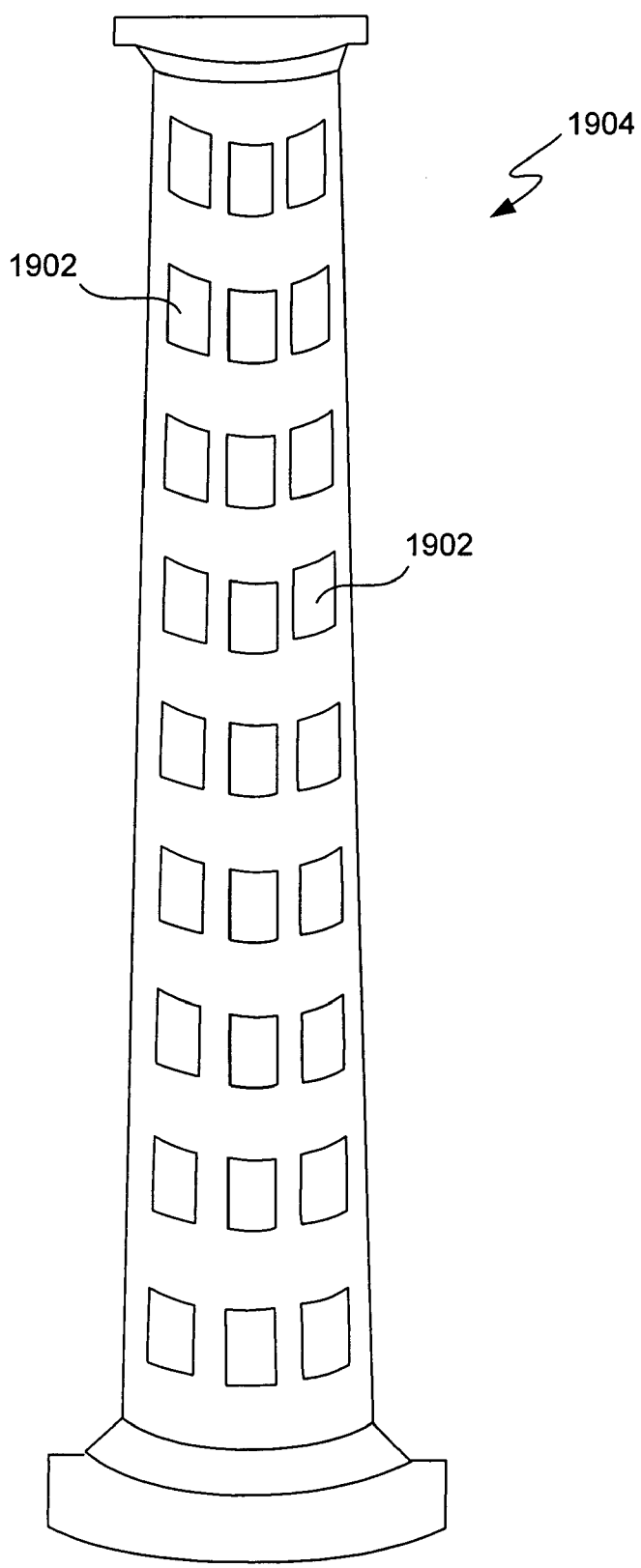
FIG. 19 is an illustration of a 3-D gaming environment in which a plurality of game outcomes are presented according to yet another specific embodiment of the invention.

Yet another configuration of game outcomes is shown in FIG. 19 in which the outcomes 1902 are distributed on the outer surface of a cylinder 1904 (or surfaces if the cylinder's cross section is not circular, e.g., a regular polygon). Cylinder 1904 may be, for example, a structural element (e.g., a column) in a virtual building such as, for example, a virtual casino. And as discussed above with reference to the arrangements of FIG. 18, the outcomes could just as easily be arranged on the inner surface(s) of the cylinder.

As with previous examples, the degrees of freedom with which the game player may be allowed to interact with the 3-D environment may be constrained in a variety of ways to facilitate viewing of the outcomes on cylinder 1904. If, for example, the outcomes are distributed on the outer surface(s) of the cylinder as shown in the figure, the position of the virtual camera in the 3-D environment could be restricted to a cylinder with a greater radius than cylinder 1904 with the viewpoint always being normal to the surface(s) of cylinder 1904. It will be understood that this may be achieved using a polar coordinate system in which the position of the virtual camera on the radial axis is held constant. The various outcomes may then be viewed by allowing the game player to move the virtual camera around and up and down the outer cylinder. Alternatively, the game player may be allowed to "spin" the cylinder and/or move it up and down.

Alternatively, if the outcomes are distributed on the inner surface(s) of a cylinder, the position of the virtual camera may be restricted to the longitudinal axis of the cylinder while up/down and rotational movement is allowed.

According to another embodiment, the plurality of outcomes may be configured on virtual slot machine reels as shown in and described above with reference to FIG. 2. In addition to the virtual pay lines which may be created (e.g., using virtual cameras 220, 222, and 224), one or more virtual cameras may facilitate manipulation of and/or navigation around the reels. That is, the game player may move the virtual camera position relative to the reels to view information from a variety of perspectives, e.g., behind, above, below. Alternatively, the game player may be enabled to actually turn one or more of the reels around within the 3-D gaming environment for the same purpose (as opposed or in addition to seeing reel positions through a translucent reel as described above).

According to some embodiments, virtual pay lines may still be indicated using a number of virtual camera views as described above with reference to FIG. 2. Alternatively, virtual pay lines may be indicated on the reels themselves by, for example, highlighting reel positions (e.g., by color coding) on the different reels which make up a particular pay line. As will be understood, reel positions may be highlighted in any of a variety of ways. In addition, particular positions may be highlighted simultaneously in multiple ways such that the positions so highlighted could be part of multiple pay lines.

And as with other embodiments, the degrees of freedom with which the game player may be allowed to interact with the environment which includes such virtual reels and the reels themselves may be constrained in a number of ways. For example, the player may only be allowed to rotate all of the reels together rather than one individually. In another example, the player may only be allowed to view the reels from a small number of perspectives.

While the invention has been particularly shown and described with reference to specific embodiments thereof, it will be understood by those skilled in the art that changes in the form and details of the disclosed embodiments may be made without departing from the spirit or scope of the invention. For example, embodiments have been described in which specific arrangements of game outcomes have been assumed. These exemplary arrangements should not be used to limit the invention. In addition, embodiments have been described in which player interaction with a 3-D gaming environment is constrained with respect to one or more degrees of freedom. The specific degrees of freedom so constrained and the manner in which such degrees of freedom should likewise not be used to limited the invention.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A gaming machine, comprising:
   a gaming controller operable, in response to at least one wager, to control a single game of chance including a plurality of game outcomes associated with the single game of chance or to simultaneously control a plurality of games of chance including a plurality of separate game outcomes associated, respectively, with each of the plurality of games of chance wherein the plurality of games of chance are played simultaneously by a user;
   an input mechanism for receiving cash or an indicia of credit used to make the at least one wager;
   memory operable to store 3-D data corresponding to a 3-D gaming environment;
   a display operable to display the plurality of game outcomes or the plurality of separate game outcomes;
   gaming logic operable to generate the plurality of game outcomes or the plurality of separate game outcomes in the 3-D gaming environment wherein said game outcomes or said separate game outcomes are generated as a plurality of vertices specified in a 3-D coordinate system associated with the 3-D gaming environment, said plurality of vertices defining a plurality of surfaces in the 3-D gaming environment on which textures are applied;
   gaming logic operable to render a plurality of images of the 3-D gaming environment for presentation on the display wherein only a portion of the plurality of game outcomes or only a portion of the plurality of separate game outcomes are viewable on the display at one time and wherein the portion of the plurality of game outcomes or the portion of the plurality of separate game outcomes that are viewable on the display is determined based upon at least a position of a virtual camera specified using the 3-D coordinate system of the 3-D gaming environment wherein the position of the virtual camera in the 3-D gaming environment determines a portion of the plurality of surfaces in the 3-D gaming environment that are visible in each of the plurality of images rendered from the 3-D gaming environment, said rendering including projecting the surfaces defined in the 3-D coordinate system to a two-dimensional projection surface;
   gaming logic operable to render the plurality of images of the 3-D gaming environment for presentation on the display, the images depicting manipulation of one or more aspects of the 3-D gaming environment by the user including manipulations that allow the user to view different portions of the plurality of game outcomes or the plurality of separate game outcomes;
   a user interface operable to provide user input to facilitate the manipulation of the one or more aspects of the 3-D gaming environment by the user; and
   a housing configured to enclose the gaming controller, said housing coupled to the input mechanism, the display and the user interface.

2. The gaming machine of claim 1 wherein manipulation of the one or more aspects of the 3-D gaming environment comprises any of changing a viewpoint perspective within the 3-D gaming environment, changing a position within the 3-D gaming environment, moving an object, reshaping an object, eliminating an object, creating an object, and causing objects to interact.

3. The gaming machine of claim 1 wherein the user interface comprises any of a touchscreen, a trackball, one or more buttons, a joystick, a body-tracking device, a positional sensor, one or more inertial sensors, a wand, a mouse, a touchpad, a pressure sensitive device, a discrete device, a voice recognition system, thermal sensors, optical sensors, or any combination thereof.

4. The gaming machine of claim 1 wherein the gaming logic is further operable to render the plurality of images to depict a plurality of game outcomes or the plurality of separate games outcomes in an arrangement.

5. The gaming machine of claim 4 wherein the gaming logic is operable to render at least one of the images which presents all of the game outcomes or all of the separate game outcomes simultaneously from at least one perspective.

6. The gaming machine of claim 4 wherein the gaming logic is operable to render at least one of the images which presents less than all of the game outcomes or all the separate game outcomes simultaneously from at least one perspective.

7. The gaming machine of claim 4 wherein the manipulation of the one or more aspects of the 3-D gaming environment comprises changing a viewpoint perspective within the 3-D gaming environment such that the plurality of game outcomes or the plurality of separate game outcomes are viewable from a plurality of different perspectives.

8. The gaming machine of claim 7 wherein gaming logic is operable to constrain the changing of the viewpoint perspective with reference to the arrangement.

9. The gaming machine of claim 8 wherein the gaming logic is operable to constrain the changing of the viewpoint perspective by employing only degrees of freedom which result in each of the images showing at least a portion of the arrangement of the plurality of game outcomes or the plurality of separate game outcomes.

10. The gaming machine of claim 4 wherein the arrangement comprises any of a 2-D planar array, a 2-D planar array receding to a point within the 3-D gaming environment, a 2-D array on a curved surface, a 3-D array, a pillar configuration on one or more surfaces of a cylinder, a reel configuration on surfaces of a plurality of reels, a polyhedral configuration on surfaces of a polyhedron, a boundary configuration on surfaces bounding the 3-D gaming environment, and a room configuration in a plurality of sub-spaces within the 3-D gaming environment.

11. The gaming machine of claim 1 wherein the gaming logic is operable to render the plurality of images such that the manipulation of the one or more aspects of the 3-D gaming environment is constrained in at least one of a plurality of degrees of freedom associated with the 3-D gaming environment.

12. The gaming machine of claim 11 wherein the manipulation of the one or more aspects of the 3-D gaming environment comprises changing a viewpoint perspective within the 3-D gaming environment thereby simulating navigation within the 3-D gaming environment.

13. The gaming machine of claim 12 wherein changing the viewpoint perspective comprises allowing the viewpoint perspective to change in only one of the degrees of freedom.

14. The gaming machine of claim 12 wherein changing the viewpoint perspective comprises allowing the viewpoint perspective to change only in fewer than all of the degrees of freedom.

15. The gaming machine of claim 12 wherein the navigation is constrained to a predetermined path within the 3-D gaming environment.

16. The gaming machine of claim 11 wherein the degrees of freedom comprise up/down, forward/reverse, left/right, roll, pitch, yaw, and zoom in/zoom out.

17. The gaming machine of claim 11 wherein the degrees of freedom correspond to any of a Cartesian coordinate system, a polar coordinate system, and a spherical coordinate system.

18. The gaming machine of claim 1 wherein the gaming logic is further operable to provide sound effects corresponding to the manipulation of the one or more aspects of the 3-D gaming environment.

19. The gaming machine of claim 18 wherein the sound effects simulate location and motion.

20. A gaming machine, comprising:
a gaming controller operable, in response to at least one wager, to control a single game of chance including a plurality of game outcomes associated with the single game of chance or to simultaneously control a plurality of games of chance including a plurality of separate game outcomes associated, respectively, with each of the plurality of games of chance wherein the plurality of games of chance are played simultaneously by the user;
memory operable to store 3-D data corresponding to a 3-D gaming environment;
an input mechanism for receiving cash or an indicia of credit used to make the at least one wager;
a display operable to display the plurality of game outcomes or the plurality of separate game outcomes;
gaming logic operable to generate the plurality of game outcomes or the plurality of separate game outcomes in the 3-D gaming environment wherein said game outcomes or said separate game outcomes are generated as a plurality of vertices specified in a 3-D coordinate system associated with the 3-D gaming environment, said plurality of vertices defining a plurality of surfaces in the 3-D gaming environment on which textures are applied;
gaming logic operable to render a plurality of images of the 3-D gaming environment for presentation on the display, each of the images depicting fewer than all of the plurality of game outcomes or fewer than all of the plurality of separate game outcomes, successive ones of the images facilitating navigation among all of the game outcomes or among all of the separate game outcomes wherein a portion of the plurality of game outcomes or a portion of the plurality of separate game outcomes that are viewable on the display is determined based upon at least a position of a virtual camera specified using the 3-D coordinate system of the 3-D gaming environment wherein the position of the virtual camera in the 3-D gaming environment determines a portion of the plurality of surfaces in the 3-D gaming environment that are visible in each of the plurality of images rendered from the 3-D gaming environment, said rendering including projecting the surfaces defined in the 3-D coordinate system to a two-dimensional projection surface; and
a housing configured to enclose the gaming controller, said housing coupled to the input mechanism, the display and the user interface.

21. The gaming machine of claim 20 wherein the plurality of game outcomes or the plurality of separate game outcomes is configured in an arrangement comprising any of a 2-D planar array, a 2-D planar array receding to a point within the 3-D gaming environment, a 2-D array on a curved surface, a 3-D array, a pillar configuration on one or more surfaces of a cylinder, a reel configuration on surfaces of a plurality of reels, a polyhedral configuration on surfaces of a polyhedron, a boundary configuration on surfaces bounding the 3-D gaming environment, and a room configuration in a plurality of sub-spaces within the 3-D gaming environment.

22. The gaming machine of claim 20 wherein the gaming logic is operable to render the images such that the game outcomes or the separate game outcomes are viewable from a plurality of perspectives within the 3-D gaming environment.

23. The gaming machine of claim 22 wherein the game outcomes or the separate game outcomes are presented in an arrangement within the 3-D gaming environment, the gaming logic being operable to constrain the plurality of perspectives from which the game outcomes or the separate game outcomes are viewable with reference to the arrangement.

24. The gaming machine of claim 23 wherein the arrangement comprises a virtual planar array of the outcomes or the separate game outcomes, and wherein the gaming logic is operable to constrain the plurality of perspectives to a portion of the 3-D gaming environment above the array.

25. The gaming machine of claim 23 wherein the arrangement comprises an array of the game outcomes or the separate game outcomes on a substantially cylindrical surface, and wherein the gaming logic is operable to constrain the plurality of perspectives such that the game outcomes or the separate game outcomes may only be viewed normal to the cylindrical surface from a fixed distance.

26. The gaming machine of claim 23 wherein the arrangement comprises pay lines on a plurality of virtual slot machine reels, and wherein the gaming logic is operable to constrain the plurality of perspectives to viewing of the pay lines.

27. The gaming machine of claim 23 wherein the gaming logic is operable to constrain the plurality of perspectives by restricting at least one of a plurality of degrees of freedom.

28. The gaming machine of claim 27 wherein the degrees of freedom comprise up/down, forward/reverse, left/right, roll, pitch, yaw, and zoom in/zoom out.

29. The gaming machine of claim 27 wherein the degrees of freedom correspond to any of a Cartesian coordinate system, a polar coordinate system, and a spherical coordinate system.

30. The gaming machine of claim 20 further comprising a user interface operable to provide user input to facilitate the navigation among the outcomes.

31. The gaming machine of claim 30 wherein the user interface comprises any of a touchscreen, a trackball, one or more buttons, a joystick, a body-tracking device, a positional sensor, one or more inertial sensors, a wand, a mouse, a touchpad, a pressure sensitive device, a discrete device, a voice recognition system, thermal sensors, optical sensors, or any combination thereof.

32. A method for facilitating manipulation of at least some aspects of a 3-D gaming environment presented on a display of a gaming machine, the gaming machine being operable to facilitate play of one or more games of chance, the method comprising in response to at least one wager, controlling a single game of chance including a plurality of game outcomes associated with the single game of chance or controlling simultaneously a plurality of games of chance including a plurality of separate game outcomes associated, respectively, with each of the plurality of games of chance wherein the plurality of games of chance are played simultaneously by the user;

generating the plurality of game outcomes or the plurality of separate game outcomes in the 3-D gaming environment wherein said game outcomes or said separate game outcomes are generated as a plurality of vertices specified in a 3-D coordinate system associated with the 3-D gaming environment, said plurality of vertices defining a plurality a surfaces in the 3-D gaming environment on which textures are applied; and rendering a plurality of images of the 3-D gaming environment for presentation on the display wherein a only portion of the plurality of game outcomes or only a portion of the plurality of separate game outcomes are viewable on the display at one time and wherein the portion of the plurality of game outcomes or the portion of the plurality of separate game outcomes that are viewable on the display is determined based upon at least a position of a virtual camera specified using the 3-D coordinate system of the 3-D gaming environment wherein the position of the virtual camera in the 3-D gaming environment determines a portion of the plurality of surfaces in the 3-D gaming environment that are visible in each of the plurality of images rendered from the 3-D gaming environment, said rendering including projecting the surfaces defined in the 3-D coordinate system to a two-dimensional projection surface;

the images depicting manipulation of the one or more aspects of the 3-D gaming environment by a user using a user interface.

33. The method of claim 32 wherein manipulation of the one or more aspects of the 3-D gaming environment comprises any of changing a viewpoint perspective within the 3-D gaming environment, changing a position within the 3-D gaming environment, moving an object, reshaping an object, eliminating an object, creating an object, and causing objects to interact.

34. The method of claim 32 wherein the user interface comprises any of a touchscreen, a trackball, one or more buttons, a joystick, a body-tracking device, a positional sensor, one or more inertial sensors, a wand, a mouse, a touchpad, a pressure sensitive device, a discrete device, a voice recognition system, thermal sensors, optical sensors, or any combination thereof.

35. The method of claim 32 wherein the plurality of game outcomes or the plurality of separate game outcomes are configured in an arrangement.

36. The method of claim 35 wherein at least one of the images presents all of the plurality of game outcomes or all of the plurality of separate game outcomes simultaneously from at least one perspective.

37. The method of claim 35 wherein at least one of the images presents less than all of plurality of game outcomes or all of the plurality of separate game outcomes simultaneously from at least one perspective.

38. The method of claim 35 wherein the manipulation of the one or more aspects of the 3-D gaming environment comprises changing a viewpoint perspective within the 3-D gaming environment such that the plurality of game outcomes or the plurality of separate game outcomes are viewable from a plurality of different perspectives.

39. The method of claim 38 wherein the changing of the viewpoint perspective is constrained with reference to the arrangement.

40. The method of claim 39 wherein the changing of the viewpoint perspective is constrained by employing only degrees of freedom which result in each of the images showing at least a portion of the arrangement of the plurality of game outcomes or the arrangement of the plurality of separate game outcomes.

41. The method of claim 35 wherein the arrangement comprises any of a 2-D planar array, a 2-D planar array receding to a point within the 3-D gaming environment, a 2-D array on a curved surface, a 3-D array, a pillar configuration on one or more surfaces of a cylinder, a reel configuration on surfaces of a plurality of reels, a polyhedral configuration on surfaces of a polyhedron, a boundary configuration on surfaces bounding the 3-D gaming environment, and a room configuration in a plurality of sub-spaces within the 3-D gaming environment.

42. The method of claim 32 wherein the manipulation of the one or more aspects of the 3-D gaming environment is constrained in at least one of a plurality of degrees of freedom associated with the 3-D gaming environment.

43. The method of 42 wherein the manipulation of the one or more aspects of the 3-D gaming environment comprises changing a viewpoint perspective within the 3-D gaming environment thereby simulating navigation within the 3-D gaming environment.

44. The method of 43 wherein changing the viewpoint perspective comprises allowing the viewpoint perspective to change in only one of the degrees of freedom.

45. The method of claim 43 wherein changing the viewpoint perspective comprises allowing the viewpoint perspective to change only in fewer than all of the degrees of freedom.

46. The method of claim 43 wherein the navigation is constrained to a predetermined path within the 3-D gaming environment.

47. The method of claim 42 wherein the degrees of freedom comprise up/down, forward/reverse, left/right, roll, pitch, yaw, and zoom in/zoom out.

48. The method of claim 42 wherein the degrees of freedom correspond to any of a Cartesian coordinate system, a polar coordinate system, and a spherical coordinate system.

49. The method of claim 32 further comprising providing sound effects corresponding to the manipulation of the one or more aspects of the 3-D gaming environment.

50. The method of claim 49 wherein the sound effects simulate location and motion.

51. A method for presenting a plurality of separate game outcomes of a plurality of games of chance or a plurality of game outcomes for a single game of chance on a display of a gaming machine, the method comprising:
  in response to at least one wager, controlling the single game of chance including the plurality of game outcomes associated with the single game of chance or controlling simultaneously the plurality of games of chance including the plurality of separate game outcomes associated, respectively, with each of the plurality of games of chance wherein the plurality of games of chance are played simultaneously by the user;
  generating the plurality of game outcomes or the plurality of separate game outcomes in the 3-D gaming environment wherein said game outcomes or said separate game outcomes are generated as a plurality of vertices specified in a 3-D coordinate system associated with the 3-D gaming environment, said plurality of vertices defining a plurality of surfaces in the 3-D gaming environment on which textures are applied;
  rendering a plurality of images of a 3-D gaming environment for presentation on the display, each of the images depicting fewer than all of the plurality of game outcomes or fewer than all of the plurality of separate game outcomes, successive ones of the images facilitating navigation among all of the plurality of game outcomes or the plurality of separate game outcomes within the 3-D gaming environment wherein a portion of the plurality of game outcomes or a portion of the plurality of separate game outcomes that are viewable on the display is determined based upon at least a position of a virtual camera specified using the 3-D coordinate system of the 3-D gaming environment wherein the position of the virtual camera in the 3-D gaming environment determines a portion of the plurality of surfaces in the 3-D gaming environment that are visible in each of the plurality of images rendered from the 3-D gaming environment, said rendering including projecting the surfaces defined in the 3-D coordinate system to a two-dimensional projection surface.

52. The method of claim 51 wherein the plurality of game outcomes or the plurality of separate game outcomes are configured in an arrangement comprising any of a 2-D planar array, a 2-D planar array receding to a point within the 3-D gaming environment, a 2-D array on a curved surface, a 3-D array, a pillar configuration on one or more surfaces of a cylinder, a reel configuration on surfaces of a plurality of reels, a polyhedral configuration on surfaces of a polyhedron, a boundary configuration on surfaces bounding the 3-D gaming environment, and a room configuration in a plurality of sub-spaces within the 3-D gaming environment.

53. The method of claim 51 wherein the images depict the plurality of game outcomes or the plurality of separate game outcomes from a plurality of perspectives within the 3-D gaming environment.

54. The method of claim 53 wherein the plurality of game outcomes or the plurality of separate game outcomes are presented in an arrangement within the 3-D gaming environment, and wherein the plurality of perspectives from which the plurality of game outcomes or the plurality of separate game outcomes may be viewed is constrained with reference to the arrangement.

55. The method of claim 54 wherein the arrangement comprises a virtual planar array of the plurality of game outcomes or the plurality of separate game outcomes, and wherein the plurality of perspectives is constrained to a portion of the 3-D gaming environment above the array.

56. The method of claim 54 wherein the arrangement comprises an array of the plurality of game outcomes or the plurality of separate game outcomes on a substantially cylindrical surface, and wherein the plurality of perspectives is constrained such that the plurality of game outcomes or the plurality of separate game outcomes is only viewable normal to the cylindrical surface from a fixed distance.

57. The method of claim 54 wherein the arrangement comprises pay lines on a plurality of virtual slot machine reels, and wherein the plurality of perspectives is constrained to viewing of the pay lines.

58. The method of claim 54 wherein the plurality of perspectives is constrained by restricting at least one of a plurality of degrees of freedom.

59. The method of claim 58 wherein the degrees of freedom comprise up/down, forward/reverse, left/right, roll, pitch, yaw, and zoom in/zoom out.

60. The method of claim 58 wherein the degrees of freedom correspond to any of a Cartesian coordinate system, a polar coordinate system, and a spherical coordinate system.

* * * * *